June 2, 1964 R. E. MILLER ETAL 3,135,946

ERROR CORRECTION DEVICE

Filed July 29, 1960 87 Sheets-Sheet 1

*INVENTORS.*
RAYMOND E. MILLER
JOHN PAUL ROTH

*BY*

*Thomas & Crickenberger*

June 2, 1964 R. E. MILLER ETAL 3,135,946

ERROR CORRECTION DEVICE

Filed July 29, 1960 87 Sheets-Sheet 3

June 2, 1964 R. E. MILLER ETAL 3,135,946

ERROR CORRECTION DEVICE

Filed July 29, 1960 87 Sheets-Sheet 6

June 2, 1964 R. E. MILLER ETAL 3,135,946

ERROR CORRECTION DEVICE

Filed July 29, 1960 87 Sheets-Sheet 7

June 2, 1964 R. E. MILLER ETAL 3,135,946

ERROR CORRECTION DEVICE

Filed July 29, 1960 87 Sheets-Sheet 10

June 2, 1964 R. E. MILLER ETAL 3,135,946

ERROR CORRECTION DEVICE

Filed July 29, 1960 87 Sheets-Sheet 12

June 2, 1964 R. E. MILLER ETAL 3,135,946

ERROR CORRECTION DEVICE

Filed July 29, 1960 87 Sheets-Sheet 13

June 2, 1964 R. E. MILLER ET AL 3,135,946

ERROR CORRECTION DEVICE

Filed July 29, 1960 87 Sheets-Sheet 15

June 2, 1964 R. E. MILLER ETAL 3,135,946

ERROR CORRECTION DEVICE

Filed July 29, 1960 87 Sheets-Sheet 16

June 2, 1964    R. E. MILLER ETAL    3,135,946

ERROR CORRECTION DEVICE

Filed July 29, 1960    87 Sheets-Sheet 17

June 2, 1964 R. E. MILLER ETAL 3,135,946

ERROR CORRECTION DEVICE

Filed July 29, 1960 87 Sheets-Sheet 18

June 2, 1964 R. E. MILLER ETAL 3,135,946

ERROR CORRECTION DEVICE

Filed July 29, 1960 87 Sheets-Sheet 19

June 2, 1964 R. E. MILLER ETAL 3,135,946

ERROR CORRECTION DEVICE

Filed July 29, 1960 87 Sheets-Sheet 20

June 2, 1964 R. E. MILLER ETAL 3,135,946

ERROR CORRECTION DEVICE

Filed July 29, 1960 87 Sheets-Sheet 23

June 2, 1964 R. E. MILLER ETAL 3,135,946

ERROR CORRECTION DEVICE

Filed July 29, 1960

87 Sheets-Sheet 26

June 2, 1964 R. E. MILLER ETAL 3,135,946

ERROR CORRECTION DEVICE

Filed July 29, 1960 87 Sheets-Sheet 27

June 2, 1964 R. E. MILLER ETAL 3,135,946

ERROR CORRECTION DEVICE

Filed July 29, 1960 87 Sheets-Sheet 30

June 2, 1964 R. E. MILLER ETAL 3,135,946

ERROR CORRECTION DEVICE

Filed July 29, 1960 87 Sheets-Sheet 33

June 2, 1964 R. E. MILLER ETAL 3,135,946

ERROR CORRECTION DEVICE

Filed July 29, 1960 87 Sheets-Sheet 35

June 2, 1964 R. E. MILLER ETAL 3,135,946

ERROR CORRECTION DEVICE

Filed July 29, 1960 87 Sheets-Sheet 36

June 2, 1964 R. E. MILLER ETAL 3,135,946

ERROR CORRECTION DEVICE

Filed July 29, 1960 87 Sheets-Sheet 39

June 2, 1964 R. E. MILLER ETAL 3,135,946

ERROR CORRECTION DEVICE

Filed July 29, 1960 87 Sheets-Sheet 41

June 2, 1964 R. E. MILLER ETAL 3,135,946

ERROR CORRECTION DEVICE

Filed July 29, 1960 87 Sheets-Sheet 42

June 2, 1964 R. E. MILLER ETAL 3,135,946

ERROR CORRECTION DEVICE

Filed July 29, 1960 87 Sheets-Sheet 44

June 2, 1964 R. E. MILLER ETAL 3,135,946

ERROR CORRECTION DEVICE

Filed July 29, 1960 87 Sheets-Sheet 46

June 2, 1964 R. E. MILLER ETAL 3,135,946

ERROR CORRECTION DEVICE

Filed July 29, 1960 87 Sheets-Sheet 47

June 2, 1964

R. E. MILLER ETAL 3,135,946

ERROR CORRECTION DEVICE

Filed July 29, 1960

87 Sheets-Sheet 49

June 2, 1964 R. E. MILLER ETAL 3,135,946

ERROR CORRECTION DEVICE

Filed July 29, 1960

87 Sheets-Sheet 50

June 2, 1964 R. E. MILLER ETAL 3,135,946

ERROR CORRECTION DEVICE

Filed July 29, 1960 87 Sheets-Sheet 51

June 2, 1964 R. E. MILLER ETAL 3,135,946

ERROR CORRECTION DEVICE

Filed July 29, 1960 87 Sheets-Sheet 53

June 2, 1964 R. E. MILLER ETAL 3,135,946

ERROR CORRECTION DEVICE

Filed July 29, 1960 87 Sheets-Sheet 55

June 2, 1964 R. E. MILLER ET AL 3,135,946

ERROR CORRECTION DEVICE

Filed July 29, 1960 87 Sheets-Sheet 56

June 2, 1964 R. E. MILLER ETAL 3,135,946

ERROR CORRECTION DEVICE

Filed July 29, 1960 87 Sheets-Sheet 60

June 2, 1964 R. E. MILLER ETAL 3,135,946

ERROR CORRECTION DEVICE

Filed July 29, 1960 87 Sheets-Sheet 63

June 2, 1964 R. E. MILLER ETAL 3,135,946

ERROR CORRECTION DEVICE

Filed July 29, 1960 87 Sheets-Sheet 69

June 2, 1964 R. E. MILLER ETAL 3,135,946

ERROR CORRECTION DEVICE

Filed July 29, 1960 87 Sheets-Sheet 71

June 2, 1964 R. E. MILLER ETAL 3,135,946

ERROR CORRECTION DEVICE

Filed July 29, 1960 87 Sheets-Sheet 74

June 2, 1964 R. E. MILLER ETAL 3,135,946

ERROR CORRECTION DEVICE

Filed July 29, 1960 87 Sheets-Sheet 76

June 2, 1964 R. E. MILLER ETAL 3,135,946

ERROR CORRECTION DEVICE

Filed July 29, 1960 87 Sheets-Sheet 77

June 2, 1964 R. E. MILLER ETAL 3,135,946

ERROR CORRECTION DEVICE

Filed July 29, 1960 87 Sheets-Sheet 78

June 2, 1964 R. E. MILLER ETAL 3,135,946

ERROR CORRECTION DEVICE

Filed July 29, 1960 87 Sheets-Sheet 81

June 2, 1964 R. E. MILLER ETAL 3,135,946

ERROR CORRECTION DEVICE

Filed July 29, 1960 87 Sheets-Sheet 83

June 2, 1964 R. E. MILLER ETAL 3,135,946

ERROR CORRECTION DEVICE

Filed July 29, 1960 87 Sheets-Sheet 84

June 2, 1964 R. E. MILLER ETAL 3,135,946

ERROR CORRECTION DEVICE

Filed July 29, 1960 87 Sheets-Sheet 86

June 2, 1964 R. E. MILLER ETAL 3,135,946
ERROR CORRECTION DEVICE
Filed July 29, 1960 87 Sheets-Sheet 87

3,135,946
ERROR CORRECTION DEVICE

Raymond E. Miller, Yorktown Heights, and John Paul Roth, Ossining, N.Y., assignors to International Business Machines Corporation, New York, N.Y., a corporation of New York Filed July 29, 1960, Ser. No. 46,264
11 Claims. (Cl. 340—147)

This invention relates to data handling equipment and more particularly to such equipment in which error correction devices are utilized to enhance the reliability of operation.

In equipment designed to process data through certain logical operations many component parts such as AND circuits, OR circuits, flip-flops and the like are employed in the construction. A convenient way of synthesizing these component circuits is by means of inhibitor logic embodied in rectangular array circuitry. The reactangular array configuration is particularly desirable because of the ease to which it lends itself in test and correction procedures. A convenient way of constructing the rectangular arrays in such equipment is by printed circuit or vapor deposition techniques. A circuit so constructed includes a dielectric substrate or base carrying the inhibitor logic arrays on a surface. The connecting leads run to the edge of the substrate, and from there interconnections between the circuits may be accomplished.

In cryogenic devices which operate at very low temperatures and require submersion in liquefied gas baths the problems arising because of broken lines and components can be serious. In order to repair or replace defective lines or components by conventional methods, it is required that the defective circuitry be removed from the liquefied bath for repair. Defects which require repairing may occur during the manufacturing processes or during installation in the liquefield bath in which an extreme temperature change occurs.

A unique system which corrects defective cryogenic components without removal from the liquefied bath is disclosed in copending application Serial No. 18,601, filed March 30, 1960, for Error Correction Device by James H. Griesmer et al. and is assigned to the assignee of the present invention. The technique disclosed in this copending application is the provision of special purpose spare components to be substituted selectively for the associated original component. In such a system the special purpose spares are redundant components, but they are not employed until it is determined that the original component is defective. Thus, for each component which might become defective, it is necessary to provide at least one additional redundant component for substitution purposes in case of a defect.

A feature of the present invention is the provision of a general purpose spare component which may be substituted for any one of a number of defective system components including other defective spare components. Therefore, it is not necessary to provide redundant components for every original component which might become defective and the overall reliability of the system can remain at a high figure while the circuit hardware is kept at a minimum.

Another feature of this invention is the flexible switching arrangement which permits a general purpose spare component to be set up and substituted selectively for any defective component in the circuit. The basic arrays with which the general purpose spares are employed comprise an array of conductive wires assembled with one set of lines corresponding to the mathematical variables in the Boolean function realized, and a second set of crossing lines corresponding to the terms in the Boolean function. At selected crossover points of the lines in the rectangular array thus constructed, inhibitor elements are disposed in accordance with the particular Boolean functions being synthesized. A complete description of the synthesis of these arrays may be found in copending application Serial No. 18,692, filed March 30, 1963, for Inhibitor Logic Arrays by Raymond E. Miller et al. which is assigned to the assignee of the present invention.

When a given one or ones of the conductive lines with the inhibitors disposed therealong becomes defective, it is necessary to replace this line. This is done by switching in a general purpose spare which has been made to conform electrically to the defective line which it replaces. By means of the unique switching and spare control circuitry the replacement is accomplished so that the general purpose spare becomes an exact electrical duplicate of the defective line.

In cryogenic circuits a short circuit defect can be critical to the operation of the remainder of the circuitry since it may cause faulty operation of the remaining circuitry when a short-circuit exists. It is therefore very desirable that provision be made for removing short-circuited components from the remaining circuitry. Another feature of the invention is a unique method for biasing off the components which have short-circuit defects so as to remove them from the remaining circuitry. This prevents the short-circuit from affecting the currents in the remaining portions of the array and allows the general purpose spare to function as an exact duplicate of the defective component which it replaces.

In one arrangement according to this invention a data handling system includes rectangular array inhibitor devices for the performance of logical and storage operations. Each is made up of two sets of wires arranged to cross each other and form non-conductive intersections. Inhibitors are placed selectively at the intersections in accordance with the function being realized. Spare wires are provided for each of the two sets of crossing wires. Each spare wire is made up of a plurality of serially connected cells. Each cell includes parallel conductive paths, one path of which contains an inhibitor element. Control circuitry is provided for switching the spares in and out of the array, and for diverting selectively the current in each spare such that the inhibitor in each cell is either bypassed or included in the current path. By appropriate control signals a spare wire can be selected and set up to simulate any given inhibitor pattern on a defective wire in the array.

These and other features of the invention may be appreciated more fully from the description to follow and from the drawings in which:

FIGS. 1*a* and *b* are equivalent showings of an inhibitor logic symbol and a cryotron, respectively;

FIGS. 2*a* and *b* are illustrations of a spare cell without control circuitry and with control circuitry, respectively;

Figure 1:
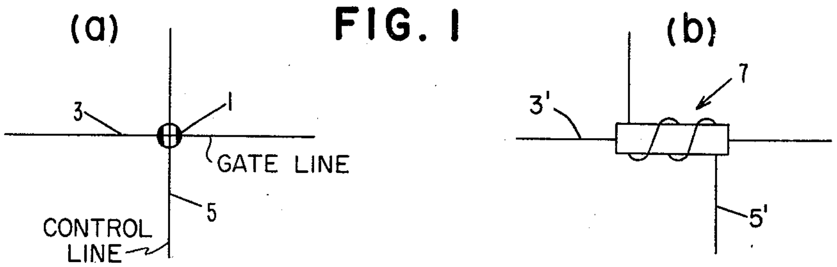

In FIG. 1*a* of the drawings the numeral 1 denotes a basic inhibitor element. The inhibitor element 1 has a pair of conductive lines 3 and 5 passing therethrough. The inhibitor 1 is located at the crossover or intersection point of these two lines. The lines are not conductively connected at the point of intersection, but the physical spacing is such that the electromagnetic field in either of these lines when a current exists will act upon the other line. In the arrangement shown, a signal on line 5 will inhibit a signal from appearing on line 3. If there is a signal on line 3, then this signal will remain until line 3 is inhibited by a signal appearing on line 5. The particular form of the inhibitor in the illustration has no physical significance and is used as a logic symbol only.

FIG. 1*b* shows a cryotron device device which may be employed as the inhibitor element 1 of FIG. 1*a*. The cryotron 7 has a control winding 5' and a gate line 3'. The gate line of the cryotron is constructed of a material which is in a superconductive state at the operating temperature of the cryotron in the absence of a magnetic field. The gate line is driven resistive (non-superconducting or normal condition) by a magnetic field produced when a current greater than a predetermined minimum exists in its control winding 5'. Thus, the cryotron utilizes the fact that the superconductive transition of the material depends upon both temperature and the applied electromagnetic field. The inherent characteristics of such a device enable it to perform switching and inhibiting functions which are readily adaptable to computer applications.

The cryotron 7 may be constructed of any suitable material having the required operating characteristics. The gate line must have the property of transferring from its superconductive to its normal state under the influence of a magnetic field, and the material tin has been found satisfactory for this application. The control winding 5' and the connections between the various components of associated circuitry (not shown) must be fabricated from a superconductor material which remains in its superconductive state under all conditions of circuit operation. An example of such a material is lead. The construction of the cryotron, together with the types of materials employed, may be understood more readily by referring to the article by Dudley A. Buck, "The Cryotron—A Superconductive Computer Component," Proceedings of the IRE, pages 482 to 493, April 1956.

The use of inhibitor logic is particularly applicable to cryogenic circuits, and, therefore, the cryotron has been suggested as a suitable inhibitor device because the cryotron is a basic superconductive element. It will be understood, however, that other equivalent devices may be used as the inhibitor elements in the circuits constructed in accordance with the present invention.

Figure 2:
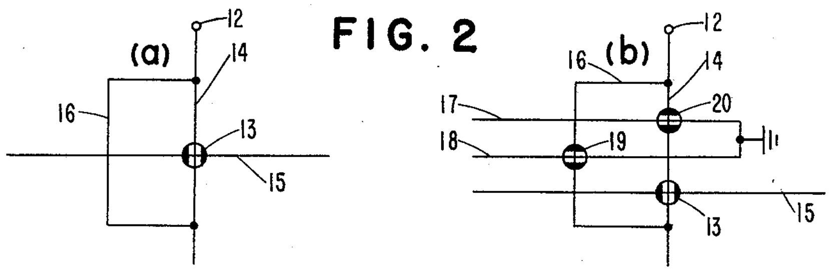

FIG. 2 shows an inhibitor element 13 having lines 14 and 15 passing therethrough similar to the inhibitor element 1 shown in FIG. 1*a*. As explained previously, a current in line 14 will inhibit a current signal in line 15; however, in this arrangement a bypass conductor 16 has been arranged so that a current applied at terminal 12 may pass through conductor 16 and avoid activating inhibitor 13.

FIG. 2*b* is similar to FIG. 2*a* except that control wires 17 and 18 have been added, along with inhibitor elements 19 and 20 to control the current applied at terminal 12 through either conductor 16 or conductor 14 to activate inhibitor element 13. In accordance with the principles of this invention the wires shown are superconductors, and a current in line 14 may exist also in either line 16 or the portion of line 14 passing through inhibitor 13, but not both. Inhibitor elements 19 and 20 are placed as control elements to allow the proper selection of current path. When it is desired that current pass through inhibitor element 13, a signal is applied to line 18 to activate inhibitor 19 which prevents current from flowing in line 16. Consequently, current must flow through inhibitor element 13. When it is desired to bypass inhibitor element 13, a signal is applied to line 17 to activate inhibitor 20 and cause the current in line 14 to be diverted through line 16 and around the inhibitor element 13. Thus, it will be seen that by appropriately controlling the lines 17 and 18, inhibitor element 13 may be inserted into or removed from the circuit as desired.

Figure 3:
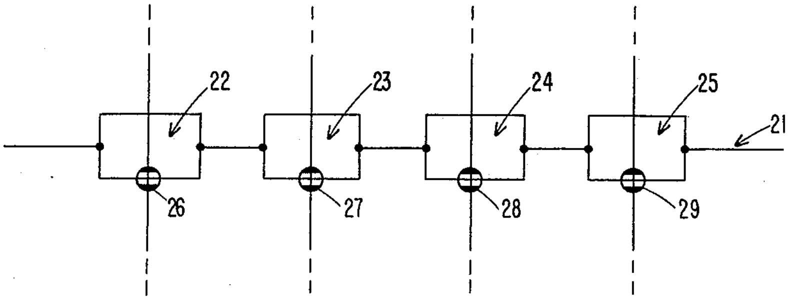
FIG. 3 is an illustration of a spare wire showing the serial arrangement of spare cells.

FIG. 3 illustrates a general purpose spare wire 21 having a plurality of cells generally indicated by the numerals 22 through 25. Each of these cells contains an inhibitor element designated by the numerals 26 through 29. For the sake of simplicity the control wires and inhibitors shown in FIG. 2*b* have been eliminated. Any number of cells may be provided in a general purpose spare, and the number is determined by the array in which the spare is to be used.

Figure 4:
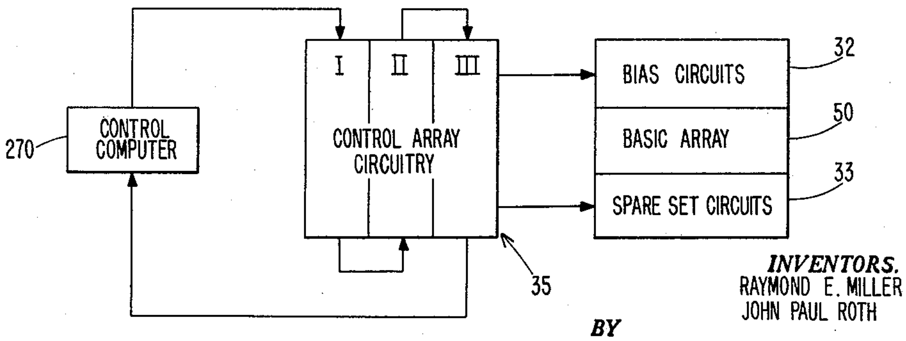
FIG. 4 is a block diagram of a system embodying rectangular array logic circuits with associated general purpose spares and the control circuits therefor.

FIG. 4 is a block diagram of a portion of a data handling system constructed in accordance with the principles of this invention. A basic array 50 is provided with bias circuits 32 and spare set circuits 33 to effect the selection and substitution of a general purpose spare wire for any defective wire in the array. The bias circuits 32 and spare set circuits 33 are controlled by a three column array of control circuitry generally indicated by the numeral 35. This control circuitry 35 is activated by signals from a control computer 270. The construction and operation of the system will now be explained in detail.

Figure 90:
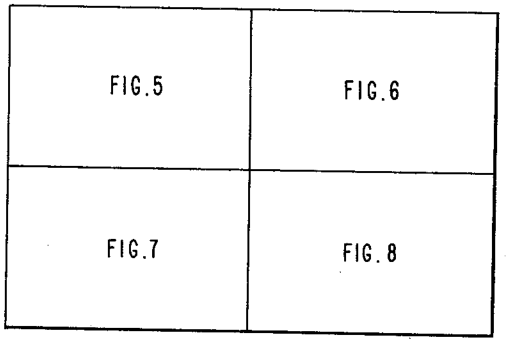
FIG. 90 is a block diagram showing how FIGS. 5 through 8 should be placed.
Figure 91:
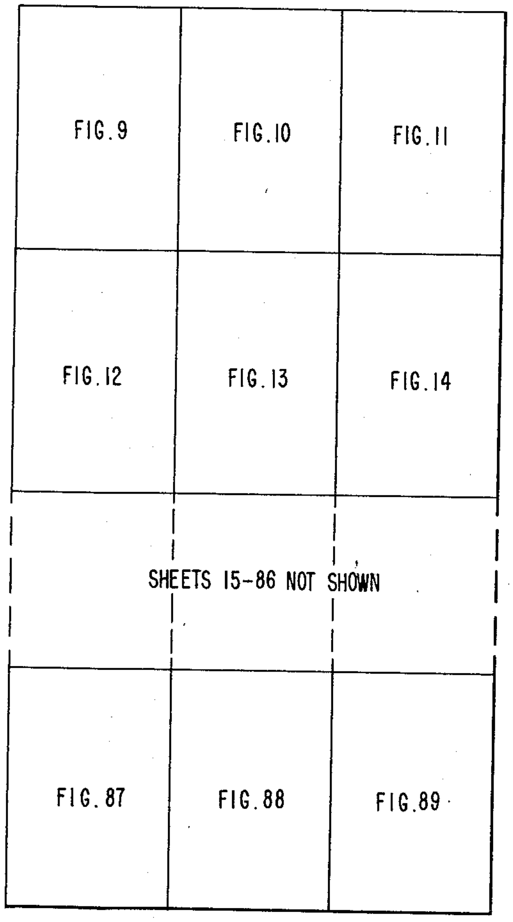
FIG. 91 is a bolck diagram showing how FIGS. 9 through 71 should be arranged.

Referring now to FIGS. 5 through 8, which are arranged with respect to each other in the manner shown in FIG. 90, the reference numeral 50 indicates the rectangular array inhibitor circuit of FIG. 4. This rectangular array may be employed for logical purposes in a data processing system. Array 50 is shown as a logical element having two functions which may be represented by the Boolean equations $f_1=a\bar{b}\vee\bar{a}b$ and $f_2=\overline{a}\overline{b}$. Since the array is superconductive and must have a complete current path at all times, the array must also provide current paths for signals representing the functions $\bar{f}_1$ and $\bar{f}_2$. Therefore, the array 50 also has alternate paths for signals represented by the equations $\bar{f}_1=ab\vee\overline{a}\overline{b}$, and $\bar{f}_2=a\vee b$, which are the negations of functions $f_1$ and $f_2$ expressed above.

In order to obtain the desired functional outputs the array 50 has four vertical input lines 52 to 55 and seven horizontal lines 58 through 64. Inhibitor elements are placed at selected crossings of the horizontal and vertical input lines to provide the desired outputs on lines 66, 68, 70 and 72. Input signals applied to terminals 52 through 55 represent the variable factors of the functional equations. These input lines are arranged in pairs, lines 52 and 53 serving to represent the variable *a* and lines 54 and 55 serving to represent the variable *b*. An input signal on line 52 indicates the value $a=0$ in the function being represented, while a signal on line 54 represents the value $b=0$. The value $a=1$ is represented by a signal on line 53, while the value $b=1$ is represented by a signal on line 55. Thus, lines 52 and 54 are labeled 0 while lines 53 and 55 are labeled 1. The horizontal, or function, lines 58 through 64 are connected in two groups. Lines 58 through 61 form the first group and represent the functions $f_1$ and $\bar{f}_1$, receiving their input signals from the $f_1$ driver through line 74. Lines 62 through 64 form the second group, receiving their input signals from the $f_2$ driver through line 76, and representing the functions $f_2$ and $\bar{f}_2$.

As indicated above, inhibitors are placed at the intersections of the horizontal and vertical lines, and are arranged so that output signals appear on selected ones of output lines 66, 68, 70 and 72 in accordance with the input signals applied to lines 52 through 55. Thus, inhibitor 78 is placed at the intersection of lines 52 and 58 so that when a signal is applied to line 52, line 58 will become resistive (non-superconductive) and inhibit current flow. Similarly, an inhibitor 80 is placed at the intersection of lines 55 and 58 so that the appearance of a signal on line 55 also will cause line 58 to become resistive. Signals applied to lines 53 and 54 will have no effect on line 58. However, signals applied to these lines will pass through inhibitors 82 and 84, respectively, which are placed at the intersection of lines 53 and 54 with line 59. Thus, a signal on either line 53 or line 54 will cause line 59 to become resistive to current from the $f_1$ driver. When either line 58 or line 59 remains in its superconductive state, an output will be obtained on line 66 which is representative of the function $f_1$.

The signals applied to lines 52 through 55, which signals are representative of the variables $a$ and $b$, determine whether either of lines 58 and 59 remain in their non-resistive or superconductive state. Thus, a signal applied to line 52 represents the value $a=0$, that is, represents $\bar{a}$, and makes line 58 resistive. This signal has no effect on line 59. A signal applied to line 53 represents the value $a=1$, that is, $a$, and inhibits line 59, having no effect on line 58. A signal on line 54 represents $\bar{b}$ and serves to inhibit line 59 while having no effect on line 58. Similarly, a signal on line 55 represents the variable $b$ and inhibits line 58, while having no effect on line 59. Since the function $f_1$ is equal to either $a\bar{b}$ or $\bar{a}b$, two conditions exist under which an $f_1$ output will be obtained on output line 66. The first condition is when signals appear on lines 53 and 54 and no signals appear on lines 52 and 55. The signals on lines 53 and 54 make line 59 resistive but leave line 58 in its superconductive state, allowing a signal from the $f_1$ driver to pass through line 74, through line 58 to line 66. The second condition is present when no signals are applied to lines 53 and 54 while signals are applied to lines 52 and 55. This condition results in current activating inhibitors 78 and 80, causing line 58 to become resistive. Current will then pass from the $f_1$ driver through line 74, line 59 and to the output line 66.

Should some combination of signals other than those representing the terms $a\bar{b}$ or $\bar{a}b$ appear on lines 52 through 55 during the time $f_1$ driver is applying a signal to line 74, some path besides those provided by lines 58 and 59 must be present, since these lines would be in their resistive states. Therefore, lines 60 and 61 are utilized as a path for the $\bar{f}_1$ functions. Line 60 provides for the $\bar{f}_1$ function $ab$ by having inhibitors 86 and 88 at the intersections of lines 52 and 54, respectively. Similarly, line 61 provides a path for the $\bar{f}_1$ function $\bar{a}\bar{b}$ by including inhibitors 90 and 92 at the intersections of lines 53 and 55. Thus, a pair of signals applied to lines 52 and 54 will cause line 60 to become resistive, but will allow current to flow from the $f_1$ driver through line 74 and 61 to the $\bar{f}_1$ output line 68. A pair of signals applied to lines 53 and 55 will activate inhibitors 90 and 92, respectively, and cause line 61 to become resistive. The $f_1$ driver will then supply current through lines 74 and 60 to the $\bar{f}_1$ output line 68. Thus, it may be seen that any combination of signals applied to the variable $a$ lines 52 and 53 or to the variable $b$ lines 54 and 55 will result in current flow through only one of lines 58 through 61 during the time a signal is being applied to line 74 from the $f_1$ driver.

The $f_2$ function of the array 30 is obtained on lines 62 through 64 when the $f_2$ driver is applying a signal to line 76. The $f_2$ function is dependent upon the combination of signals applied to the vertical lines 52 through 55 in the same manner as is the $f_1$ function. To accomplish this line 62 includes inhibitors 94 and 96 at the intersections of vertical lines 53 and 55, respectively, line 63 includes inhibitor 98 at the intersection with the vertical line 52, and line 64 includes inhibitor 100 at the intersection with the vertical line 54. The application of a pair of signals to lines 52 and 54 causes both horizontal lines 63 and 64 to become resistive, while horizontal line 62 remains in its superconductive state. Signals on these vertical lines represent the $f_2$ function $\bar{a}\bar{b}$, and allow a current to pass from the $f_2$ driver through lines 76 and 62 to the $f_2$ output line 70. A signal on either of the vertical lines 53 and 55 causes the horizontal line 62 to become resistive and allows current from the $f_2$ driver to pass through lines 76 and either line 63 or 64 to output line 72. This current will pass through lines 63 if inhibitor 100 is activated and will pass through line 64 if inhibitor 98 is activated.

Thus, it may be seen that certain combination of input signals to vertical lines 52 through 55 in combination with driver currents applied to the horizontal lines 74 and 76 will cause output signals to be obtained on lines 66, 68, 70 or 72 which represent the functions $f_1$, $\bar{f}_1$, $f_2$ and $\bar{f}_2$, respectively. However, because of the nature of the construction of rectangular array inhibitor devices such as that shown at 50, short or open circuit defects may appear in either the horizontal or vertical lines or both. These line faults may occur during construction of the array, during insertion of the array in the refrigerated operating bath, or during the operation of the system. In order to provide a system utilizing these devices with sufficient reliability to make it economically feasible, it is a feature of this invention to provide each such array with a number of extra horizontal and vertical lines, referred to as general purpose spares. Each vertical spare is accompanied by sufficient circuitry to enable it to be substituted for any one of the vertical lines of the array. This includes the circuitry necessary for placing inhibitors at the intersections of the spare with the horizontal lines of the array corresponding to the inhibitors of the original vertical line. Similarly, circuitry must be provided for the spare horizontal lines which will enable them to be substituted for any given original horizontal lines. These horizontal and vertical spares and the manner in which they may be operated will now be set forth.

Figure 7:
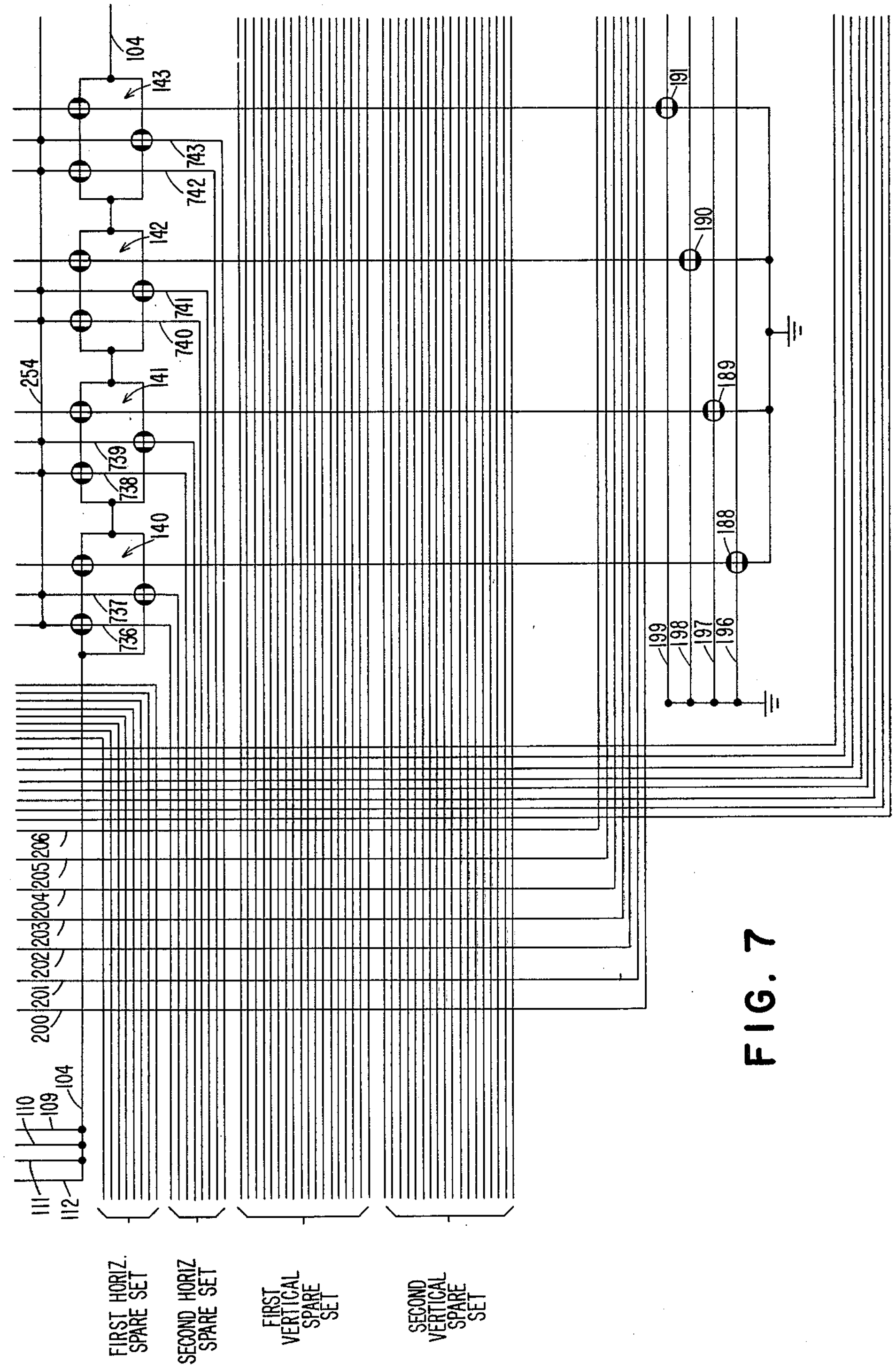
Figure 8:
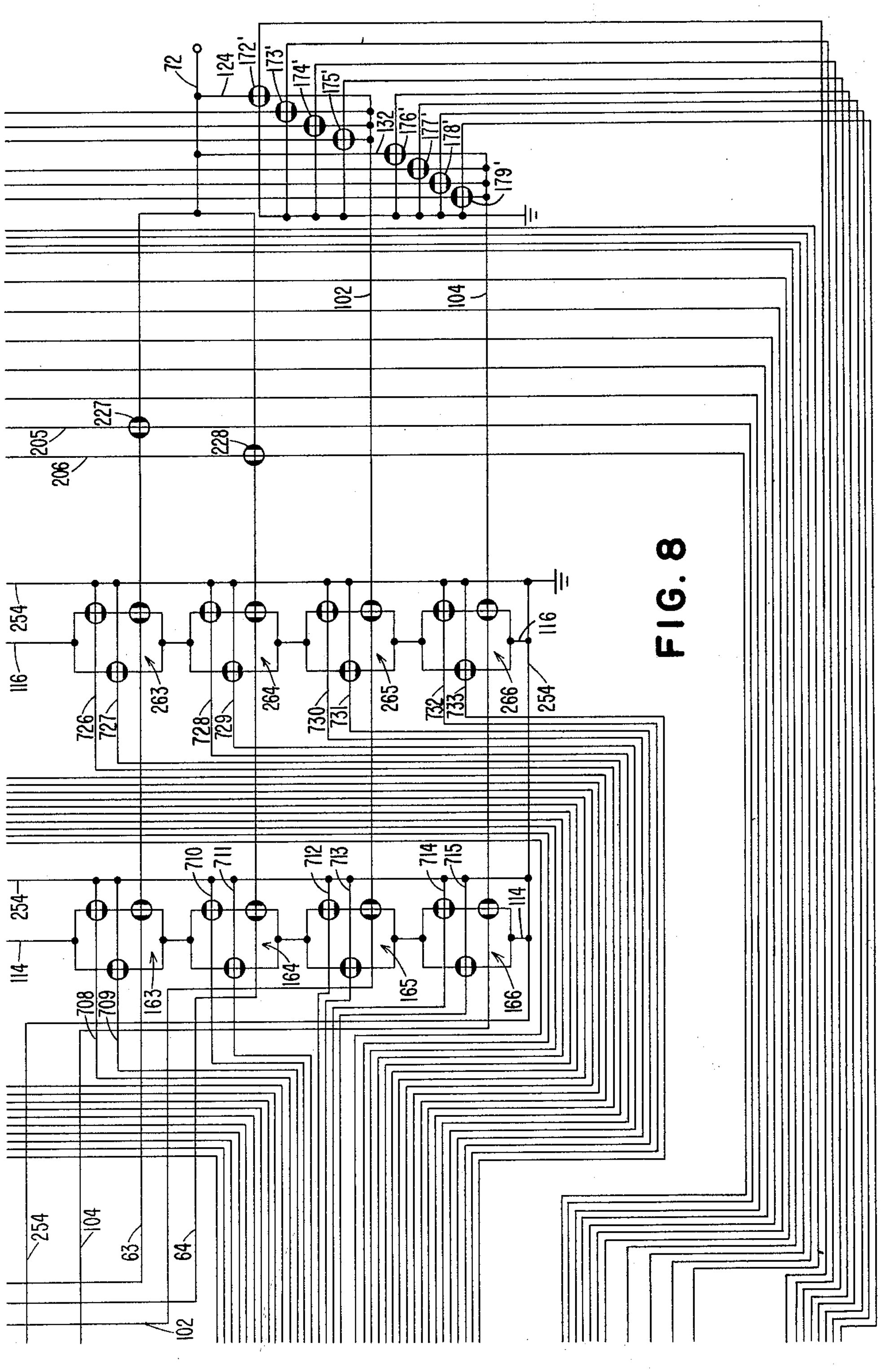

In the embodiment of the invention illuustrated in the accompanying drawings the array 50 is supplied with two horizontal and two vertical spares. The two horizontal spares are shown in FIGS. 5 ,6, 7 and 8 and are indicated by the reference numerals 102 and 104, respectively. The spare line 102 is connected to the $f_1$ driver through redundant connector lines 107 and 108 and to the $f_2$ driver through redundant connector lines 105 and 106. In a similar manner, the spare line 104 is connected to the $f_1$ driver through redundant connector lines 111 and 112 and to the $f_2$ driver through redundant connector lines 109 and 110. Each of the connector lines 105 through 112 contains one of the biasing inhibitors 172 through 179, respectively. The two horizontal spares 102 and 104 intersect each of the vertical lines 52 through 55 and each of the vertical spares 114 and 116. The output end of the first horizontal spare 102 is connected to each of the function output lines 66, 68, 70 and 72 by means of connector lines 118, 120, 122 and 124, respectively, while the output end of the second horizontal spare 104 is connected to the same function output lines through connector lines 126, 128, 130 and 132, respectively. Each of the connector lines 118, 120, 122, 124, 126, 128, 130 and 132 includes one of the biasing inhibitors 172' through 179', as shown in FIG. 8.

The first horizontal spare 102 splits into two parallel branches just prior to the intersection with vertical line 52. Each parallel branch contains a control inhibitor which may be activated by evternal control circuitry, while one branch contains an additional main inhibitor which may be activated by a signal appearing on line 52. Just beyond the junction with vertical line 52 the parallel branches are connected together. Such an arrangement of parallel branches at the intersection of a horizontal spare and a vertical input line or of a vertical spare and a horizontal function line is referred to as a cell. Such a cell is indicated by the numeral 134 (FIG. 5) at the junction of the first horizontal spare 102 and the vertical line 52. Similar cells appear at the intersections of spare 102 and vertical line 53, 54 and 55 and are indicated by the numerals 135, 136 and 137. The second horizontal spare 104 contains cells 140 through 143 at the intersections of spare 104 with lines 52 through 55, respectively.

Figure 6:
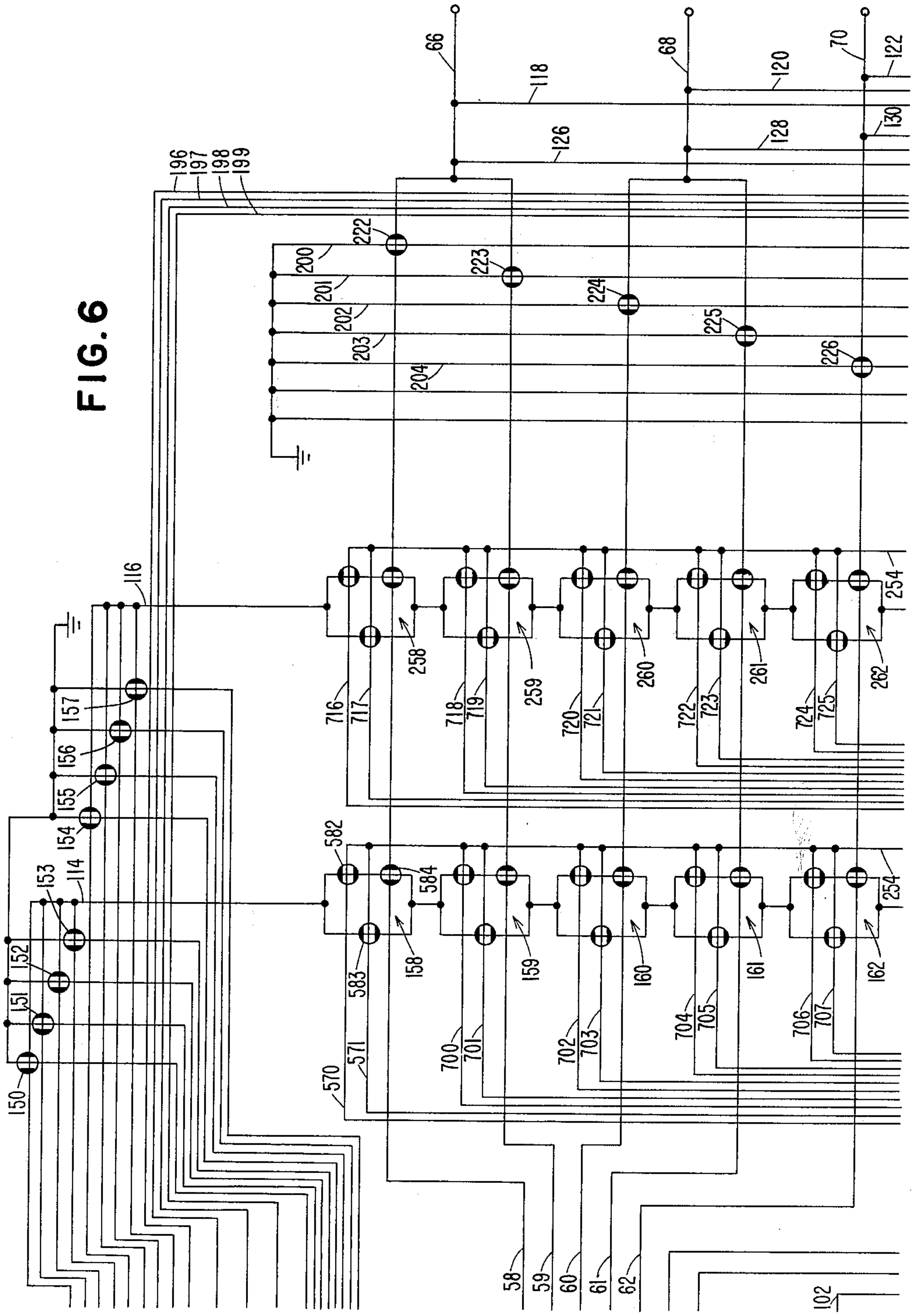

The first vertical spare line, indicated at 114 in FIGS. 6 and 8, is connected at its input end to each of the vertical lines 52 through 55 by way of connector lines 146 through 149, respectively. These connector lines include biasing inhibitors which enable the spare 114 to be selectively substituted for any of the vertical lines 52 through 55. The opposite end of spare 114 is connected to a common ground point.

The first vertical spare 114 includes cells 158 through 166, cells 158 through 164 appearing at the junctions of spare 114 with horizontal function lines 58 through 64, respectively, and cells 165 and 166 appearing at the junctions of vertical spare 114 with horizontal spares 102 and 104, respectively. Each of the cells 158 through 166 includes two parallel branches, each branch carrying a control inhibitor and one branch only carrying a main inhibitor. Each control inhibitor has a control circuit associated therewith to be described below. The main inhibitor of each cell is inserted in the line 114 or is removed therefrom in accordance with the control signals received by the control inhibitors. Thus, when a fault is detected in any one of the vertical lines 52 through 55 the vertical spare 114 may be substituted therefor, and the control inhibitors of each cell may then be properly activated so as to include those main inhibitors in spare 114 which correspond to inhibitors in the vertical line being replaced, and to exclude the remaining main inhibitors. In this manner, the vertical spare 114 can be made to correspond electrically to the vertical line which it replaces.

A second vertical spare, duplicating the first vertical spare 114, is indicated by the numeral 116 in FIGS. 6 and 8. The input end of this second vertical spare is connected to each of lines 52 through 55 by means of connector lines 168 through 171, respectively. Each connector line includes a biasing inhibitor to allow the vertical spare 116 to be selectively substituted for any one of the lines 52 through 55. The opposite end of spare 116 also is connected to a common ground point. The second vertical spare includes cells 258 through 266, cells 258 through 264 being placed at the junctions of line 116 with lines 58 through 64, respectively, and cells 265 and 266 being placed at the junctions of vertical spare 116 with horizontal spares 102 and 104, respectively. Spare 116 thus may be substituted for a defective one of the vertical lines 52 through 55 and by operation of the control inhibitors of the various cells may be made to correspond exactly thereto.

Figure 5:
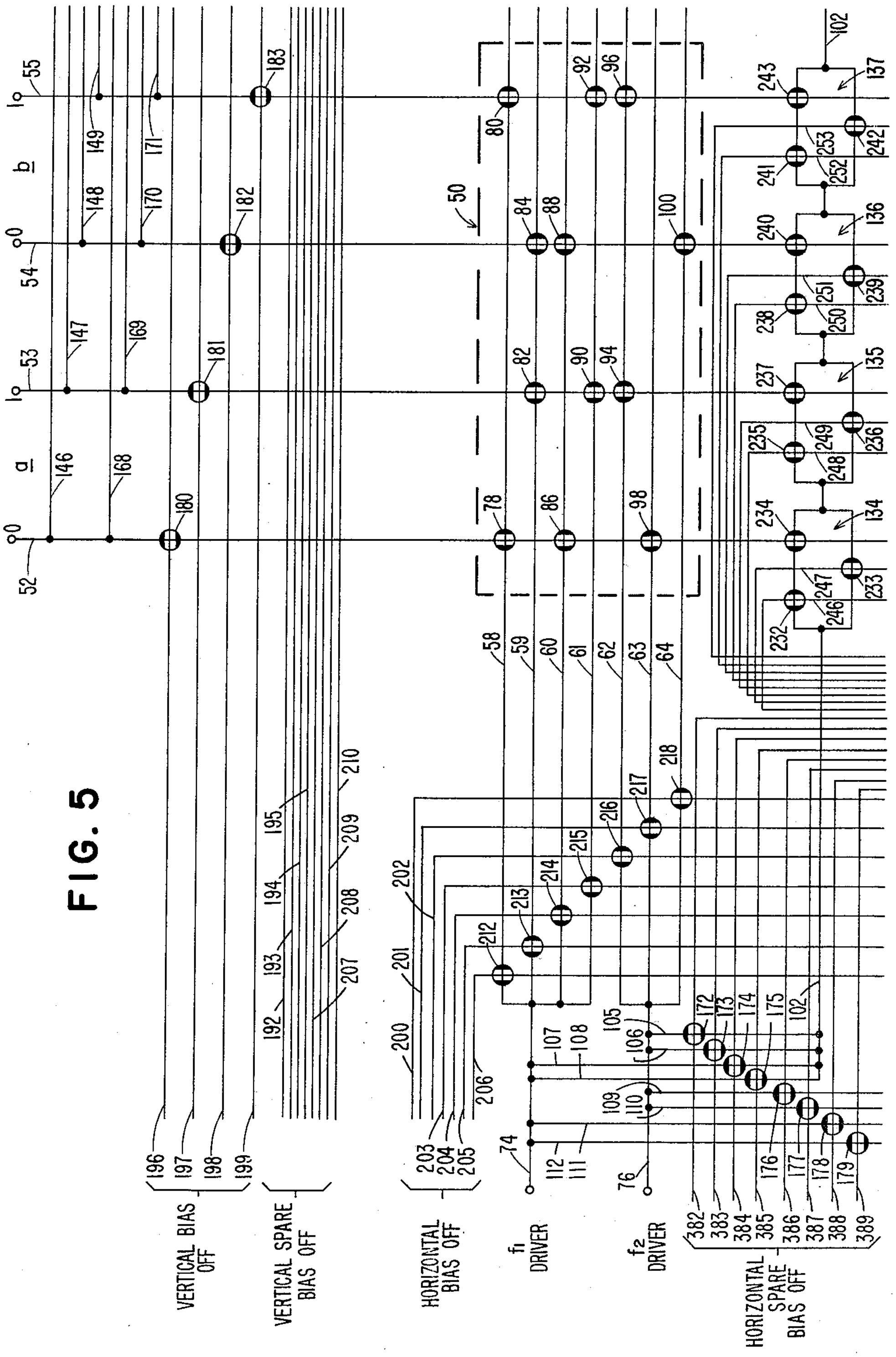
FIGS. 5 through 8 are detail illustrations of the basic array and associated bias and spare set circuits shown in FIG. 4.

In order to allow the vertical input lines 52 through 55 and the horizontal function line 58 through 64 to be replaced by vertical and horizontal spares, respectively, a system of biasing is provided which enables both the horizontal and vertical spares as well as any line which passes through the rectangular array 50 to be removed from the active circuit. The bias circuit for the vertical, or variable, input lines 52 through 55 comprises an inhibitor element at the input end of each of said vertical lines, and a further inhibitor element at the other end of each of the vertical lines. The biasing inhibitors at the input ends of the vertical lines are indicated in FIG. 5 by the numerals 180 through 183, while the biasing inhibitors at the opposite ends of the vertical lines are indicated in FIG. 7 by the numerals 188 through 191. It should be noted that the biasing inhibitors on lines 52 through 55 are placed on their respective lines between the array 50 and the points at which the vertical spares 114 and 116 are connected. For example, the biasing inhibitor 180 is placed on line 52 between the array 50 and the connecting point of connector lines 146 and 168. As has been mentioned above, the biasing circuit for the vertical spares 114 and 116 comprises biasing inhibitors on connector lines 146 through 149, indicated by the numerals 150 through 153, respectively, and biasing inhibitors on connector lines 168 through 171, indicated by the numerals 154 through 157, respectively.

When the array 50 and its accompanying circuitry is initially put into operation in a data processing system, the vertical lines 52 through 55 are utilized to provide the input signals representing the variables *a* and *b* of the functions $f_1$ and $f_2$. Since lines 52 through 55 are in the active circuit, the inhibitors 180 through 183 and 188 through 191 remain off so that the vertical lines will be in their superconductive states. Since lines 52 through 55 are utilized initially, the vertical spares 114 and 116 are not needed and therefore must be biased to a resistive or off condition. This is accomplished by the application of control signals to the vertical spare bias-off lines 192–195 and 207–210. The signals on lines 192–195 pass through inhibitors 150–153 (FIG. 6) and thence to a common ground point. The current passing through inhibitors 150–153 blocks current flow in the connector lines 146–149, thus effectively removing line 114 from the active circuit. Similarly, signals on lines 207–210 pass through inhibitors 154–157 to ground, causing these inhibitors to block current flow through line 116. If, now, it should be desirable to remove one of the input lines 52 through 55 from the active circuit, a signal is applied to the appropriate one of vertical bias-off lines 196 through 199. A signal applied to line 196 will turn on inhibitors 180 and 188, causing line 52 to become resistive to current flow. A signal applied to line 197 will pass through inhibitors 181 and 189 to cause line 53 to become resistive. Similarly, signals applied to lines 198 and 199 will cause vertical lines 54 and 55, respectively, to change from a state of superconductivity to a resistive state. To insert the spare 114 in place of one of the lines 52 through 55, it is only necessary to bias-off the line which is to be replaced and then to remove the biasing signal from the biasing inhibitor of the corresponding one of conductor lines 146 to 149. Similarly, the vertical spare 116 may be substituted for one of the lines 52 through 55 by biasing off the line which is to be replaced and then removing the biasing signal from the biasing inhibitor of the corresponding one of conductor lines 168 through 171.

The horizontal function lines 58 through 64 and the horizontal spares 102 and 104 also are provided with biasing circuits which enable the horizontal lines and the horizontal spares to be inserted in or removed from the active circuit. The biasing circuits for horizontal conductors 58 through 64 include, on the input side, an inhibitor element in each conductor between the array 50 and the points where the spares 102 and 104 are connected to the function drivers and, on the output side, a second inhibitor in each conductor positioned between the intersections with the vertical spares and the terminals to which the horizontal spares are connected. The inhibitor elements on the input side of function lines 58 through 64, respectively, are indicated in FIG. 5 by the numerals 212 through 218, while the inhibitor elements on the output end of these lines are indicated in FIGS. 6 and 8 by the numbers 222 through 228.

As has been mentioned above, the input and the output ends of the horizontal spares are biased by means of biasing inhibitors 172 through 179, and 172' through 179', respectively. To operate the inhibitors 212 through 218 which appear in lines 58 through 64, signals are applied to horizontal bias-off lines 200 through 206, respectively. The biasing inhibitors 172 through 179 and 172' through 179' are operated by means of signals applied to the horizontal spare bias-off lines 382 through 389, respectively, which lines intersect their respective biasing inhibitors.

As was the case with the vertical spares, the horizontal spares 102 and 104 are normally biased off when there are no defective horizontal lines, removing the spares from the active circuit. Thus, bias-off signals applied to lines 382 through 385 cause inhibitors 172 through 175 and 172' through 175' to block current flow through the horizontal spare 102. Similarly, signals applied to lines 386 to 389 cause inhibitors 176 to 179 and 176' through 179' to block current flow through horizontal spare 104. Application of a signal to the horizontal bias-off line 200 turns inhibitors 212 and 222 on, causing them to block current flow through line 58. A signal applied to line 201 causes inhibitors 213 and 223 to block current in conductor 59. In a similar manner a current applied to line 202 will cause conductor 60 to become resistive, a signal applied to line 203 will cause conductor 61 to become resistive, and so on. By applying a biasing signal to one of the horizontal bias-off lines 200 through 206, and by removing the biasing signal from the proper horizontal spare bias-off line, either one of the horizontal spares 102 or 104 may be substituted for a selected one of the horizontal lines 58 through 64. Since two spare lines are provided in the present system, two such substitutions may be made. It is apparent that if additional spares are provided, more substitutions may be made.

As has been indicated, the horizontal and vertical spares have been provided in order that the array 50 might continue to be used even if a fault should occur in one of its lines or should occur in a spare which has been used to replace a defective line. If, for example, a short circuit or a break should be detected in one of the horizontal function lines, that line can be biased off by the application of a biasing signal to the proper horizontal bias-off line. One of the horizontal spares may then be substituted for the biased-off line when the cells of the spare line have been set so that the main inhibitors of selected cells will be included in the path of the current flowing through the spare in the same pattern as in the defective line being replaced.

If, for example, a fault should appear in the horizontal line 58 of array 50 a biasing-off signal would be applied to line 200, which signal would cause inhibitors 212 and 222 to block current in line 58. The biasing signal would then be removed from the horizontal spare bias line 385, allowing the horizontal spare 102 to replace the line 58. In order to duplicate the inhibitors 78 and 80 which appear at the intersections of line 58 with vertical lines 52 and 55, the main inhibitors 234 and 243 of cells 134 and 137, respectively, must be inserted in the current path of spare 102. Since no inhibitors appear at the junction of lines 58 with lines 53 and 54, the main inhibitors 237 and 240 of cells 135 and 136, respectively, must be left out of the current paths of spare 102. To accomplish this control signals are applied to the first horizontal spare set lines (FIG. 7) to cause selected ones of the control inhibitors of cells 134 through 137 to direct the current in line 102 through the desired branches of the cells.

If a fault should now appear in any one of lines 59 through 64 the second horizontal spare 104 may be substituted for it in the same manner that spare 102 was substituted for line 58. The cells 140 through 143 of spare 104 are controlled by signals appearing on the second horizontal spare set lines shown in FIG. 7. The first and second vertical spares 114 and 116 may be used to replace any of vertical lines 52 through 55 by following a similar procedure. The main inhibitor in each of cells 158 through 166 of the first vertical spare 114 may be selectively included in the path followed by currents flowing in the spare 114 by the application of the proper signals to the first vertical spare set lines indicated in FIG. 7. The main inhibitor in each of cells 258 through 266 of the second vertical spare may be selectively included in the path of current flowing in line 116 by the application of the proper signals to the second vertical spare set lines which are also generally indicated in FIG. 7.

Once the cells of any given spare are set so that the spare replaces a specific line in the array 50, the cells remain in that condition so that the spare becomes in effect a permanent part of the array. However, if faults appear in a number of lines of the array that is greater than the number of spares available, it is necessary to remove the array from the system and replace it with a new array. When this is done the spares of the new array are again biased off until a fault is detected therein.

Figure 9:
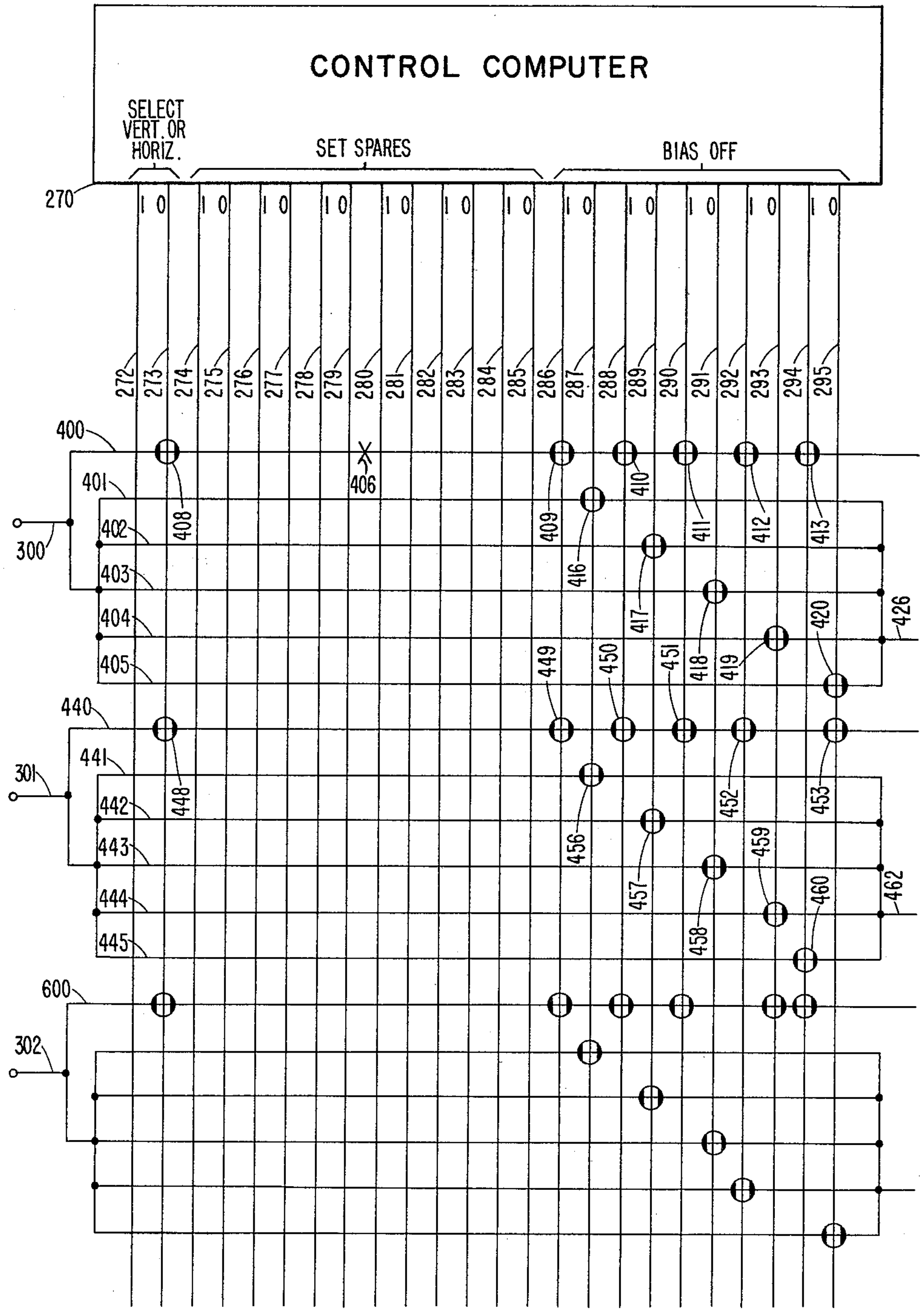
FIGS. 9 through 89 are detailed illustrations of the control array circuitry shown in block form in FIG. 4.
Figure 71:
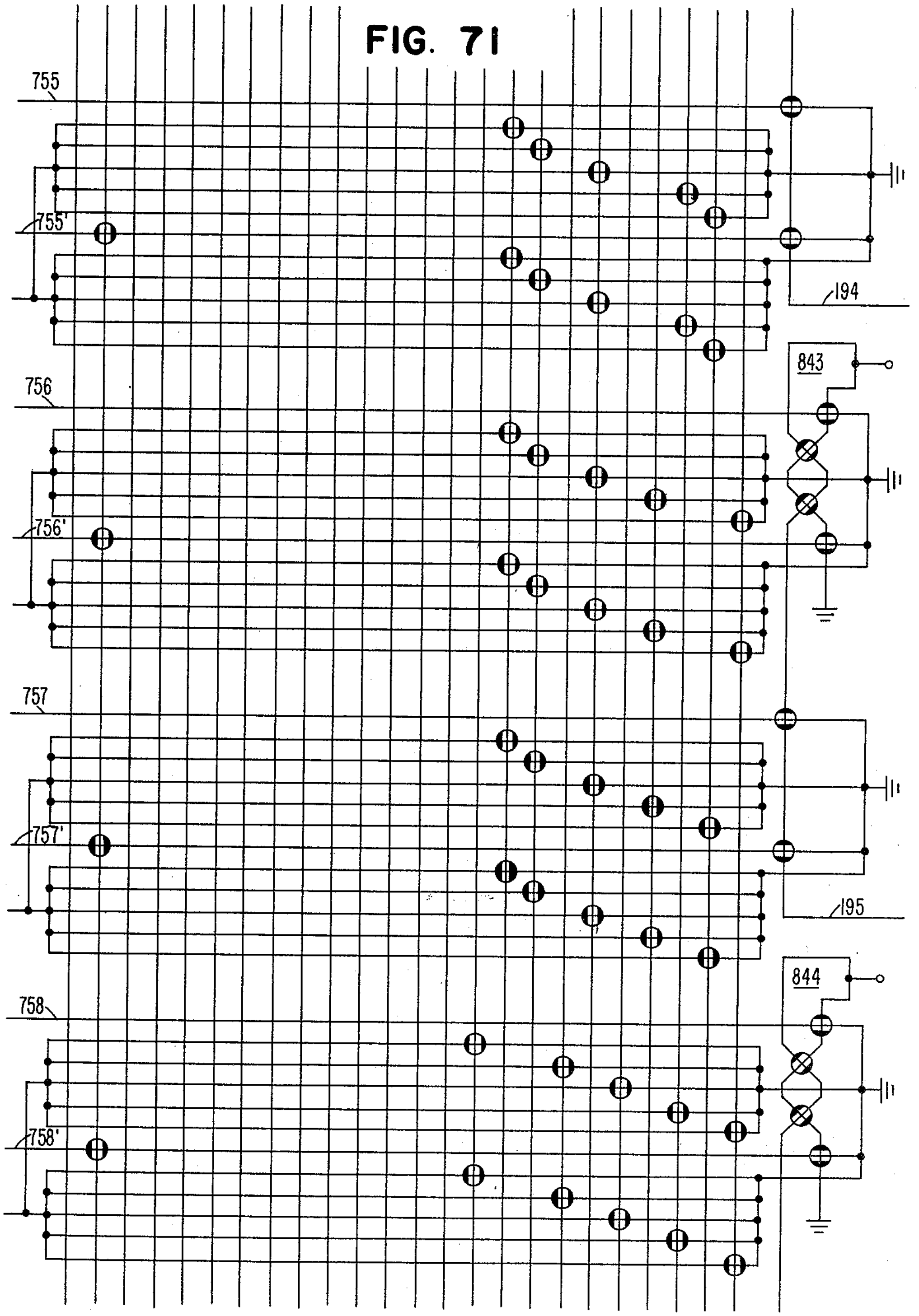
Figure 72:
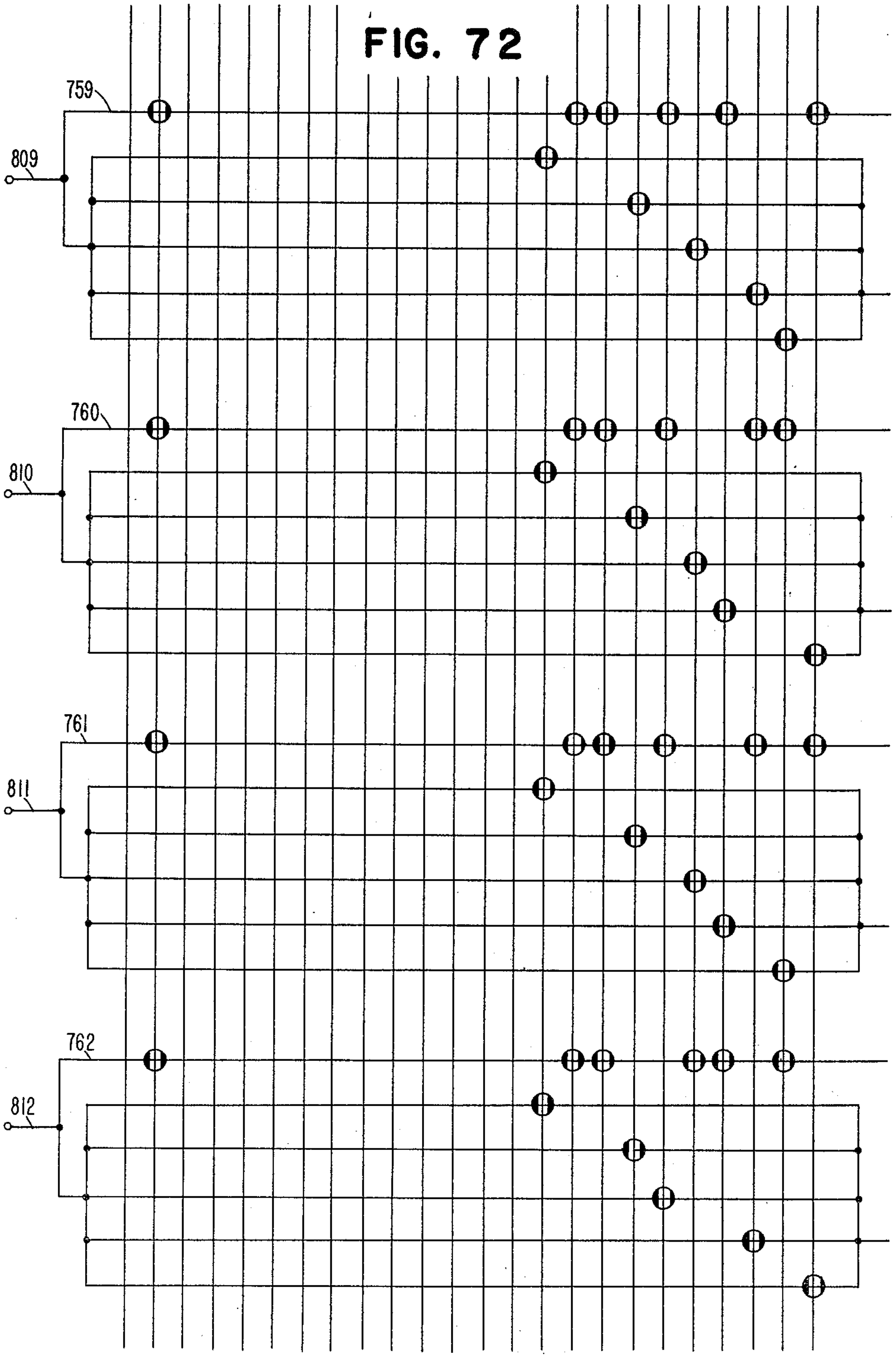
Figure 73:
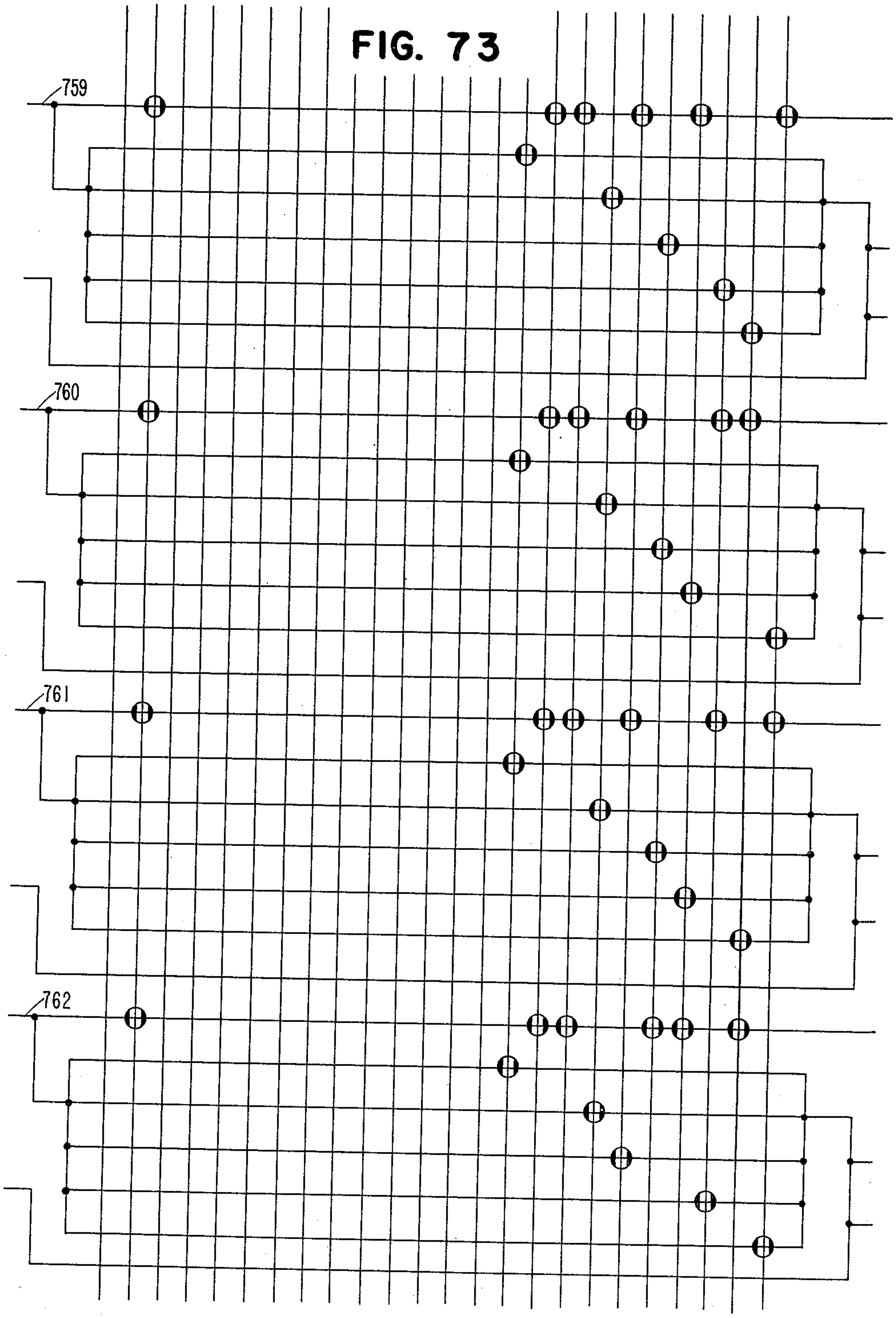
Figure 74:
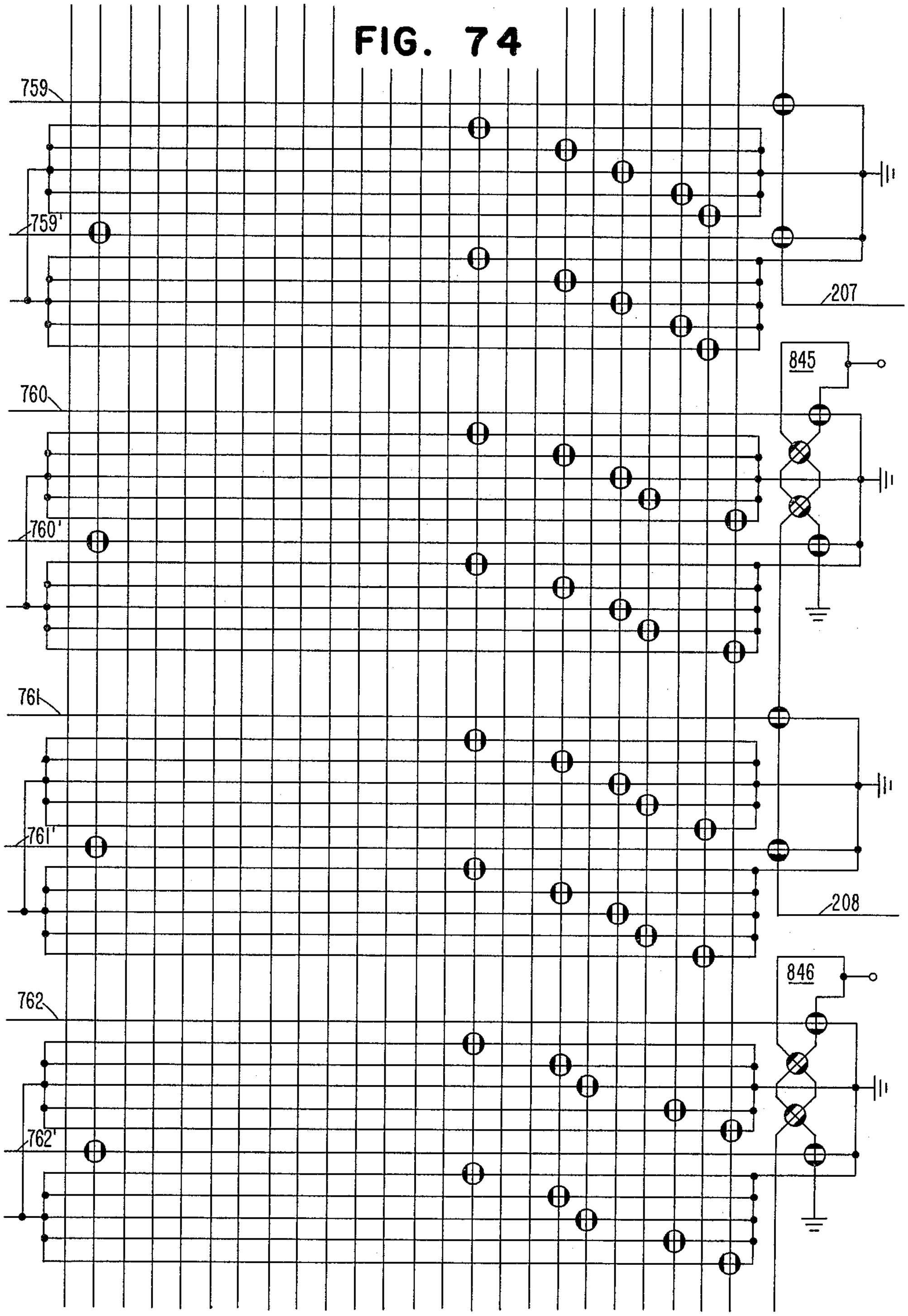
Figure 75:
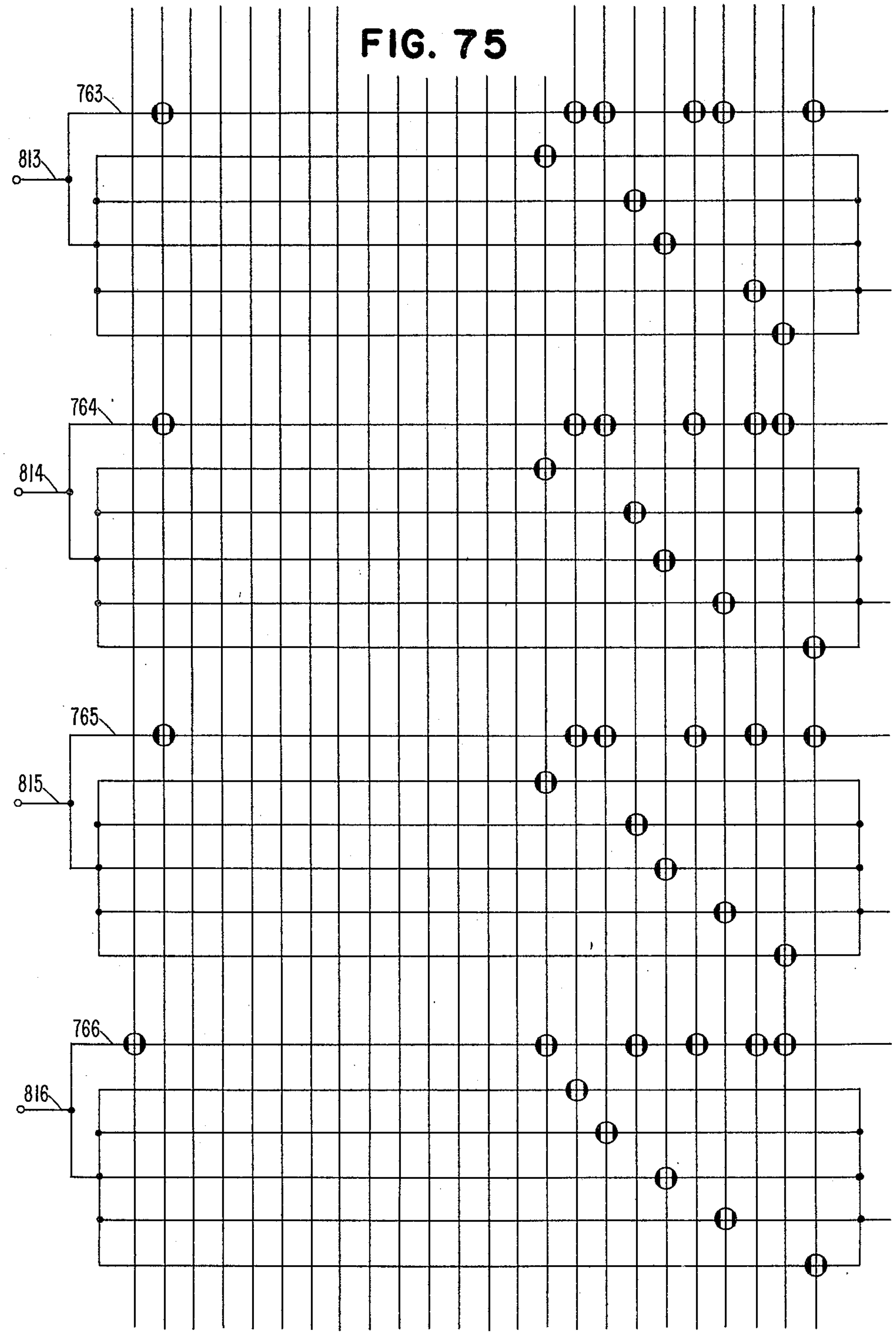
Figure 76:
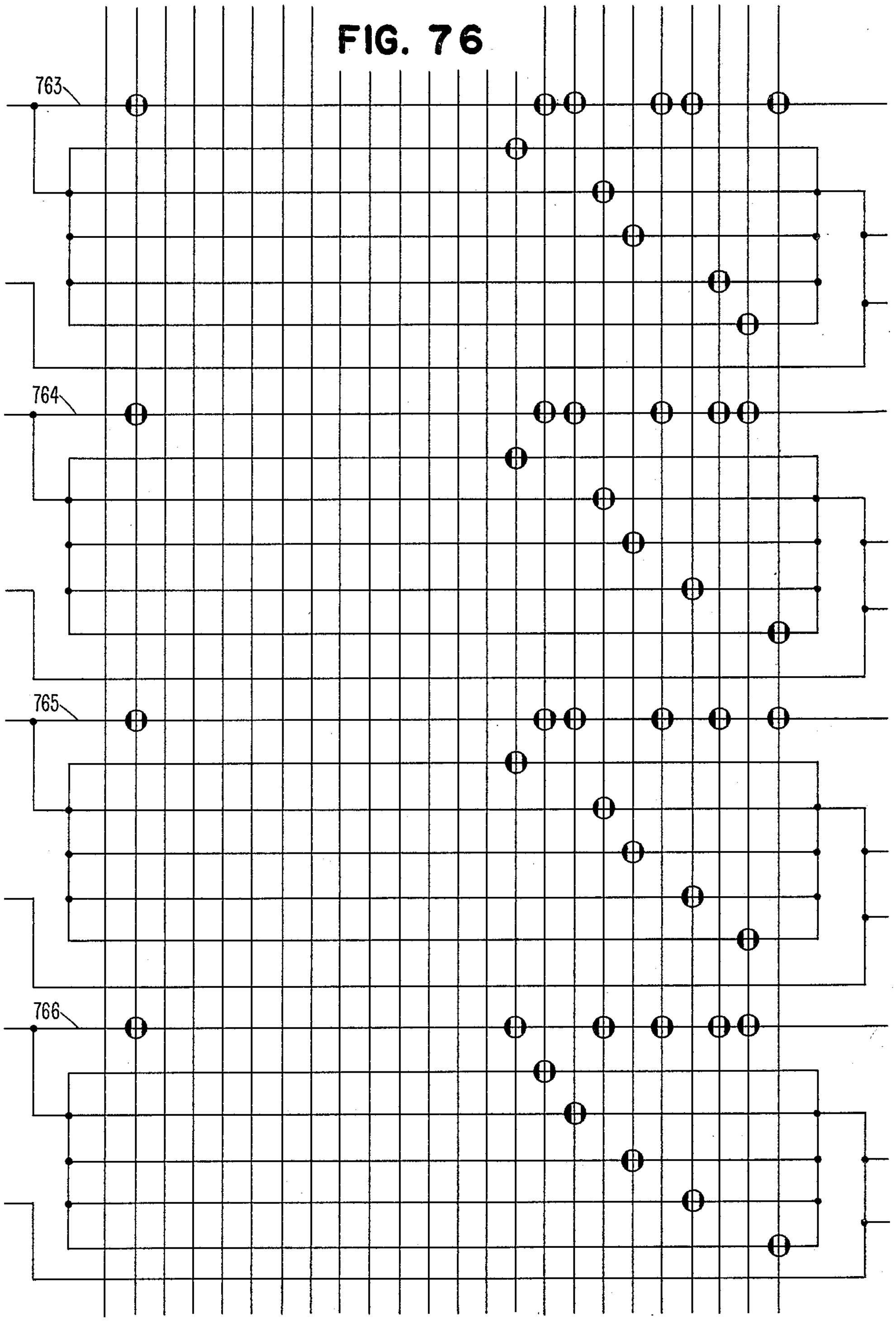
Figure 77:
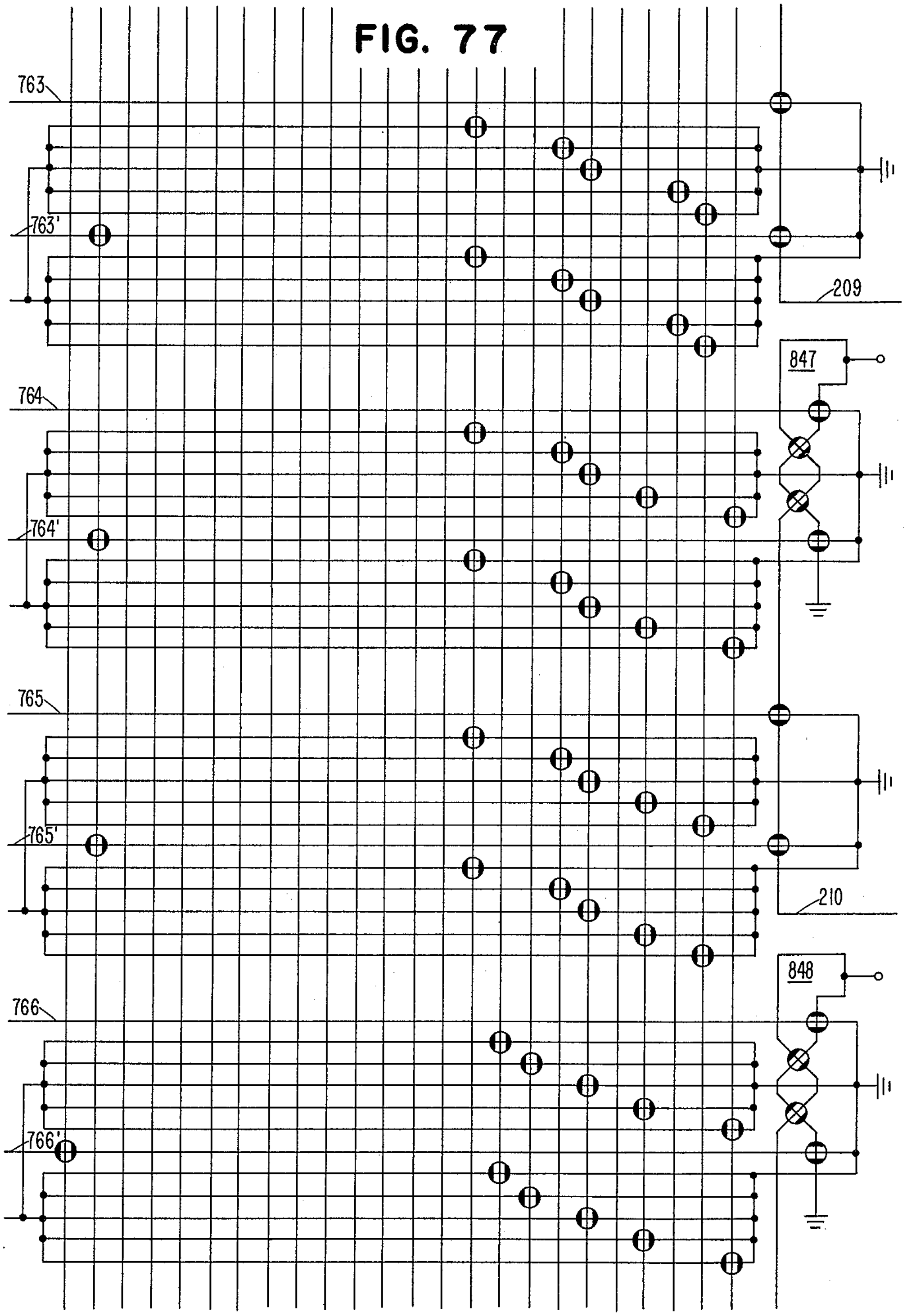
Figure 78:
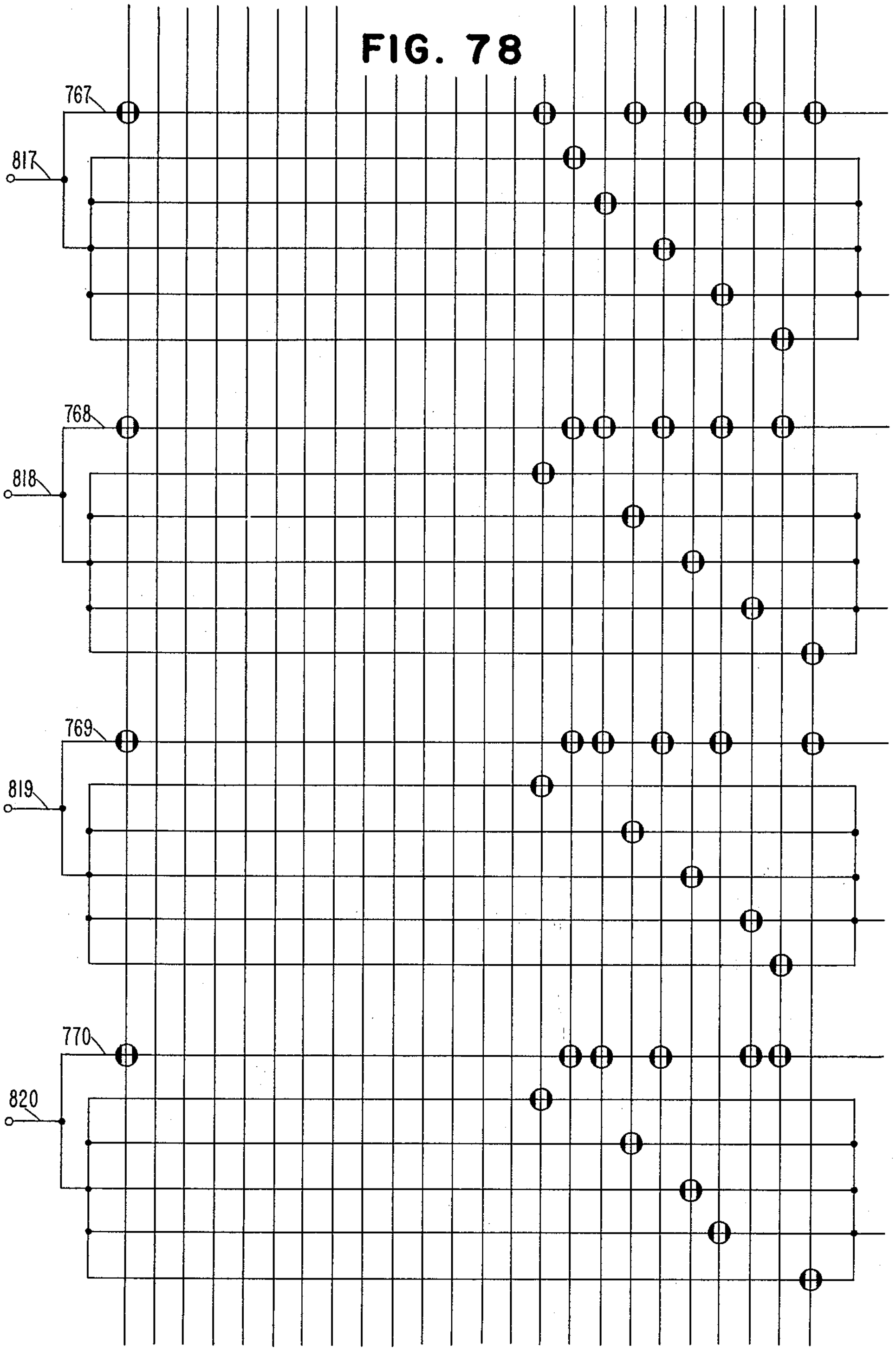
Figure 79:
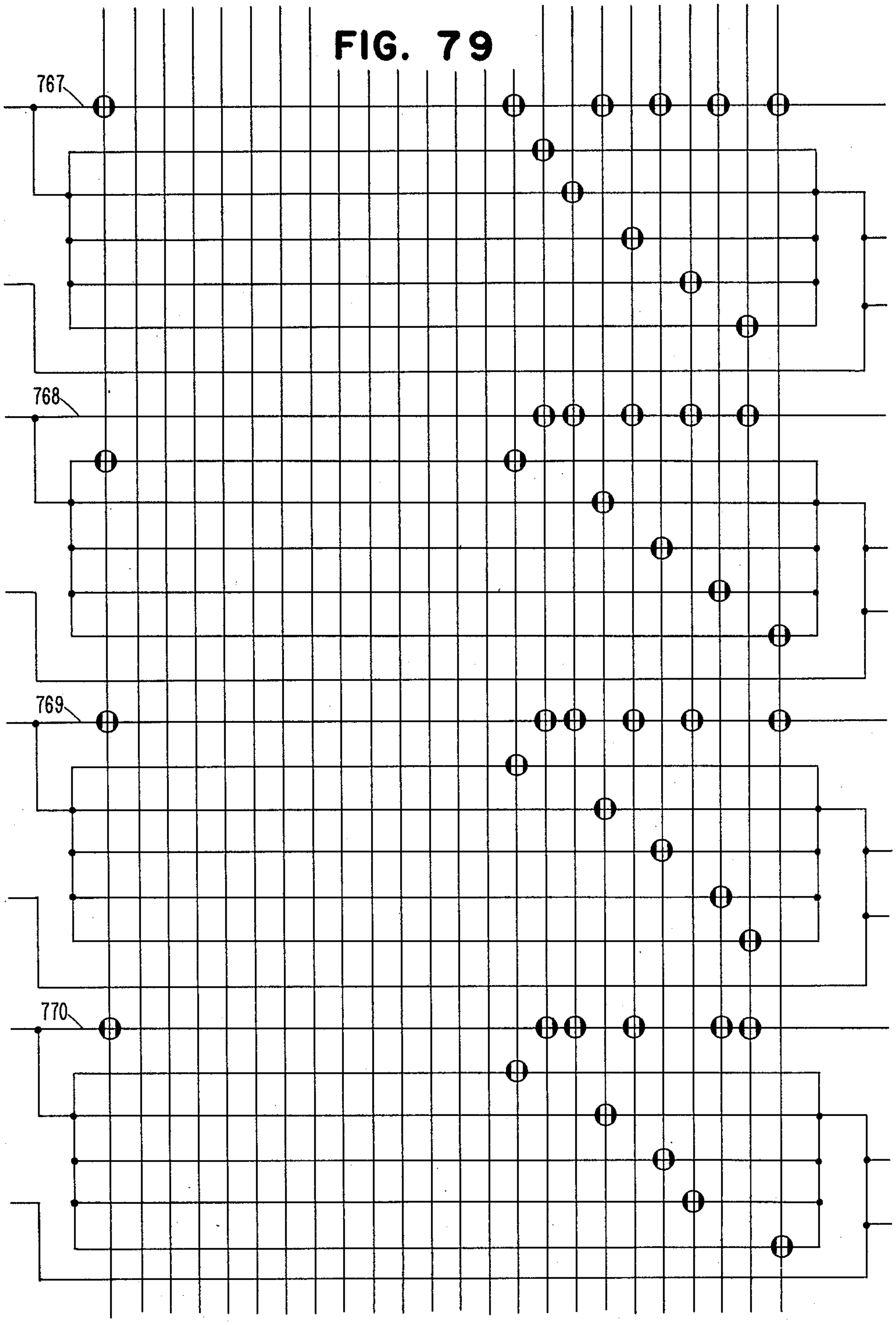
Figure 80:
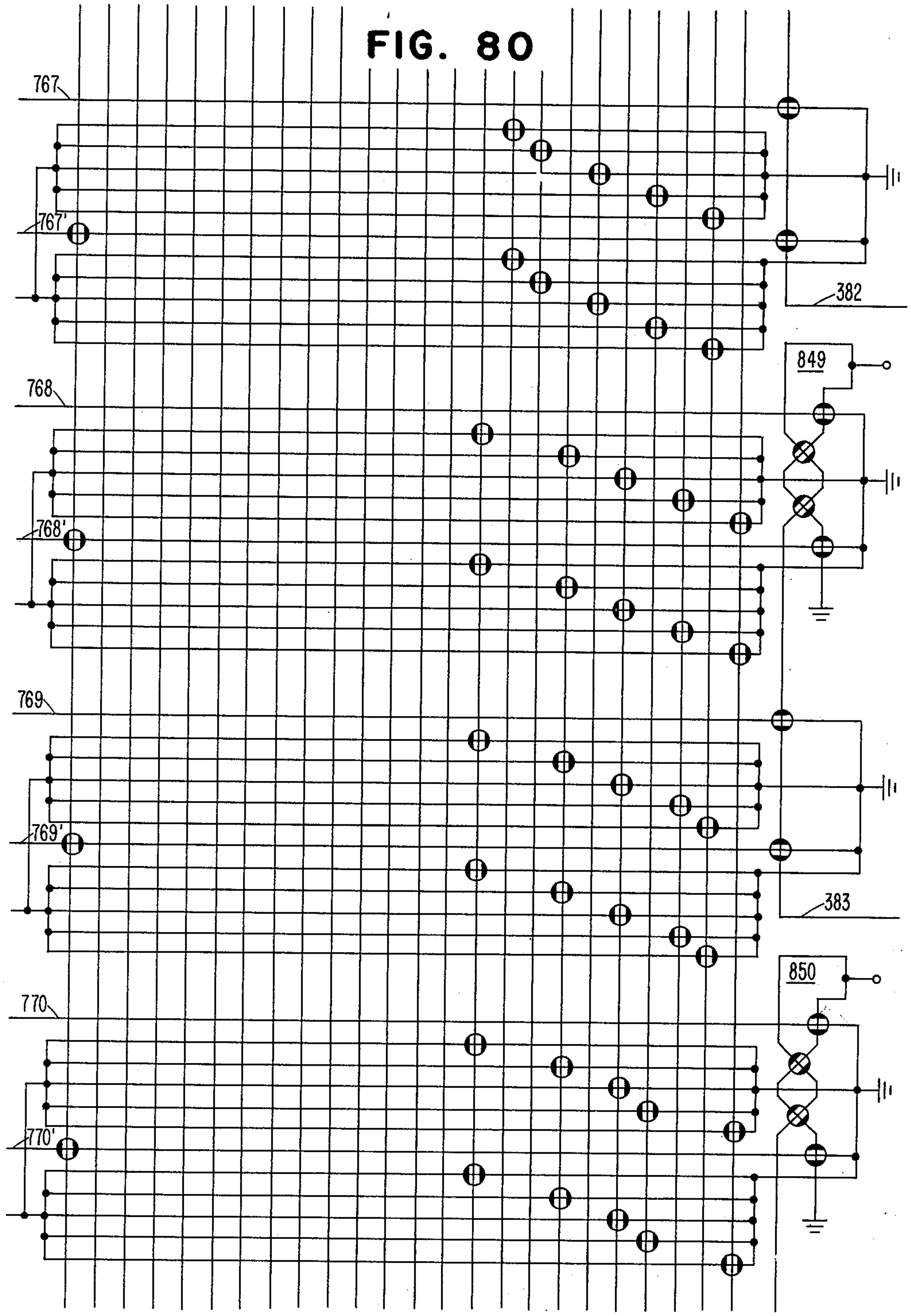
Figure 81:
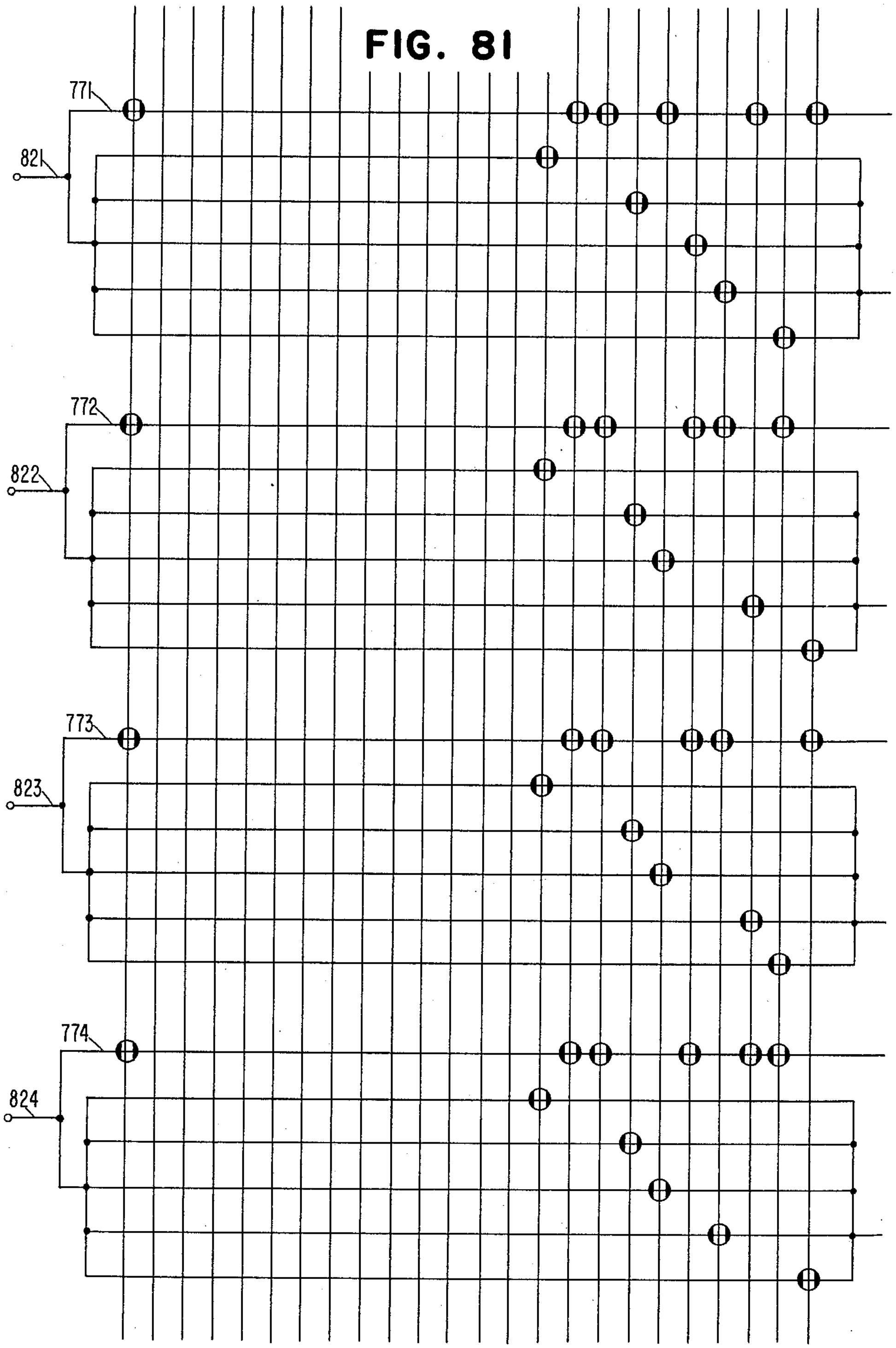
Figure 82:
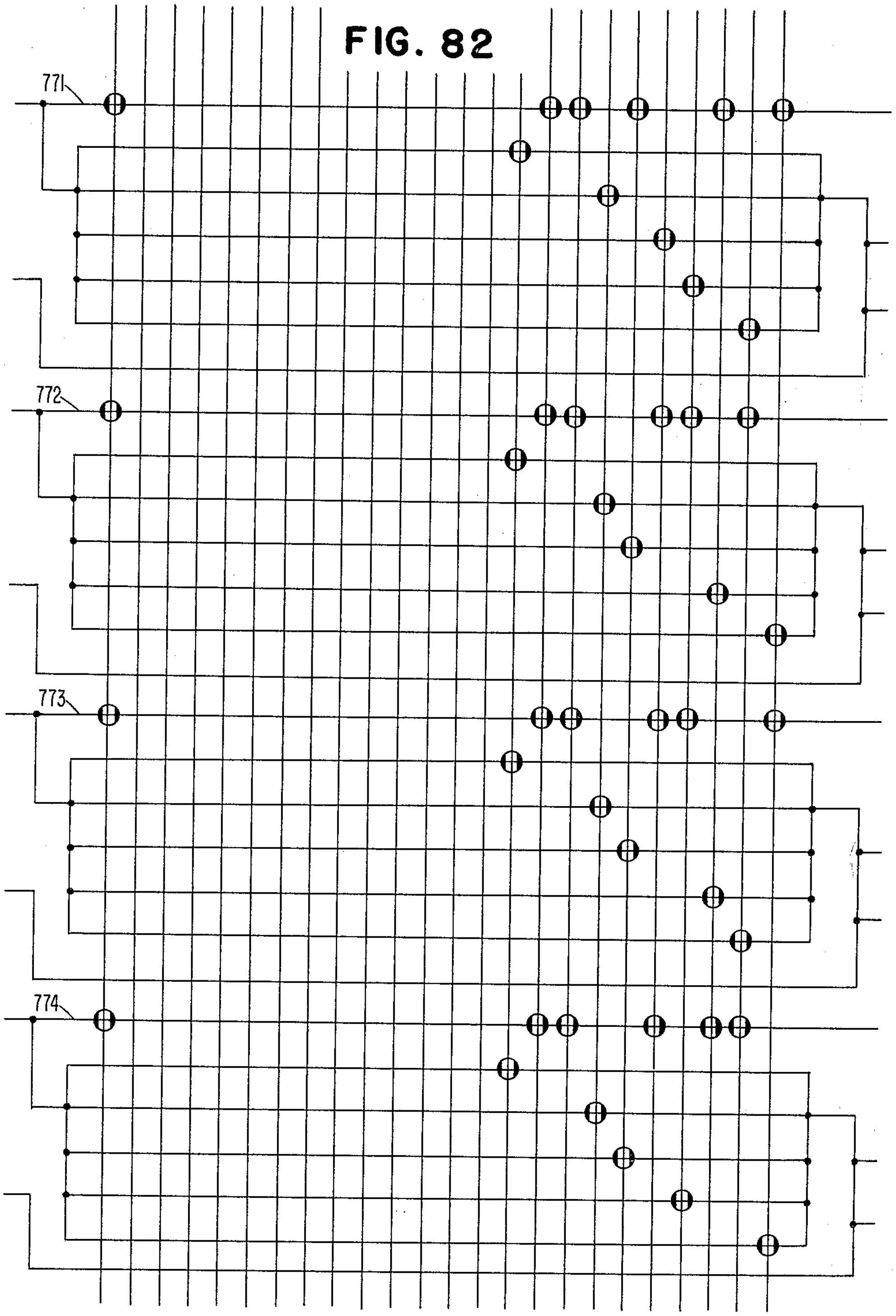
Figure 83:
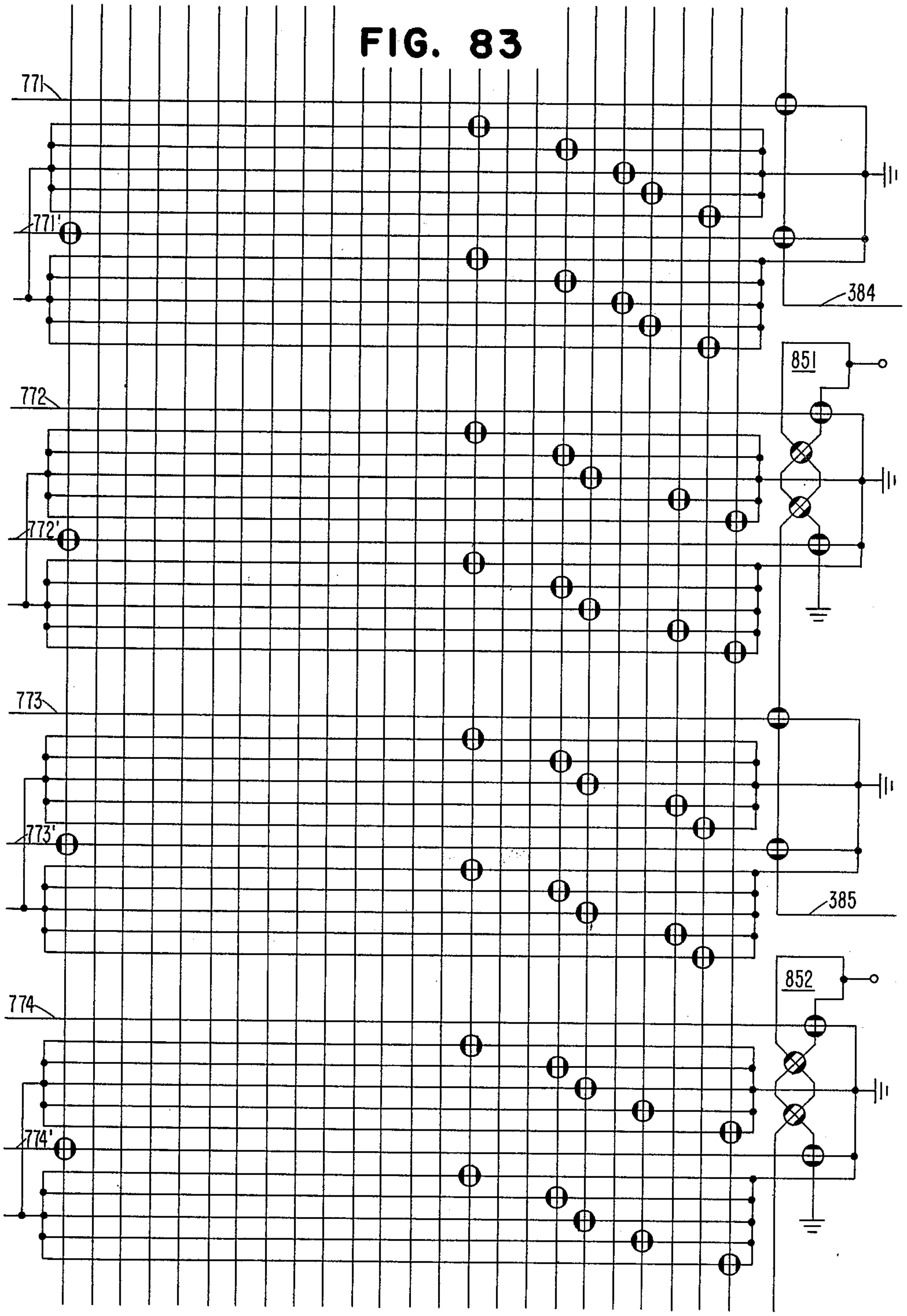
Figure 84:
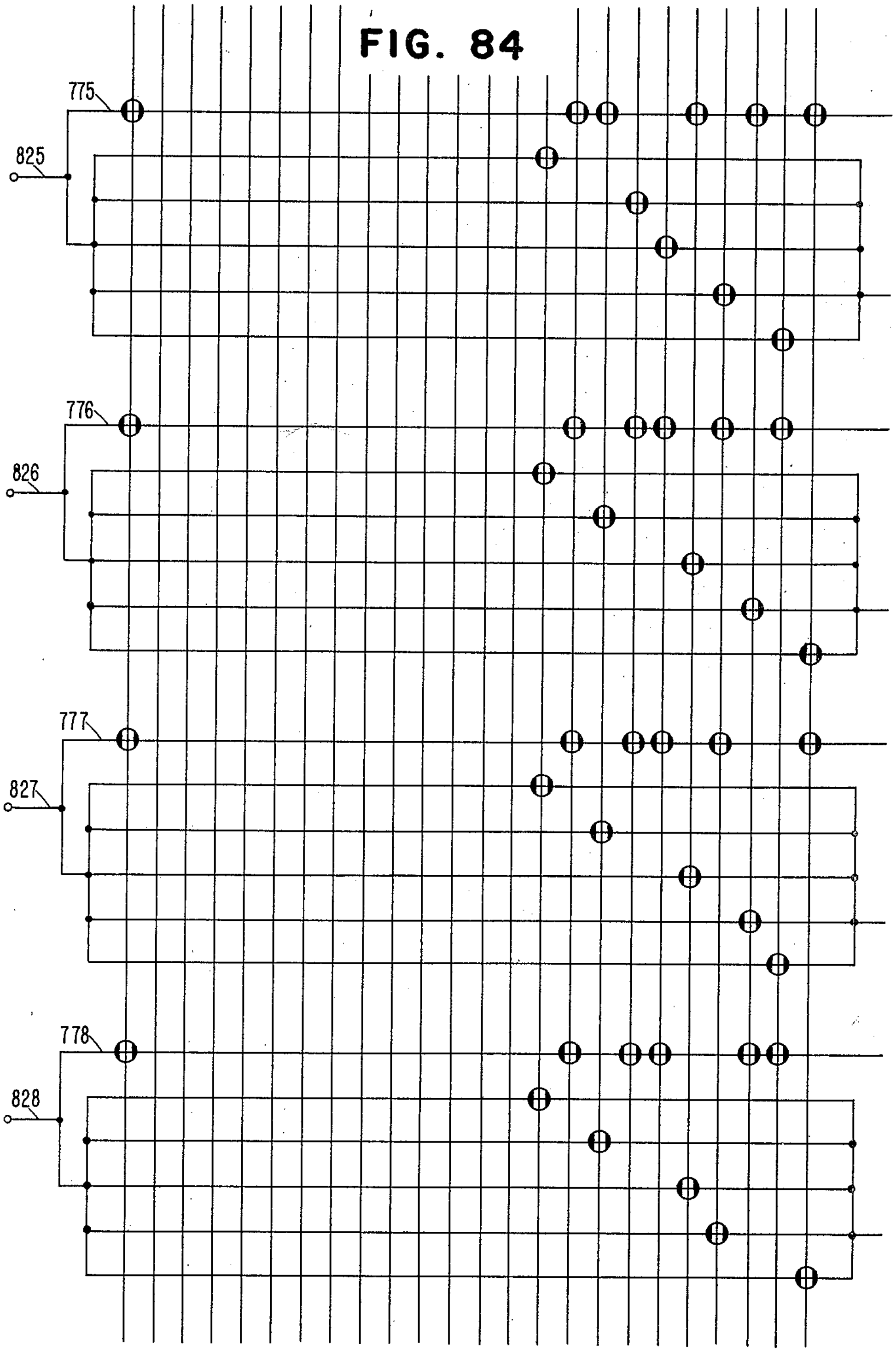
Figure 85:
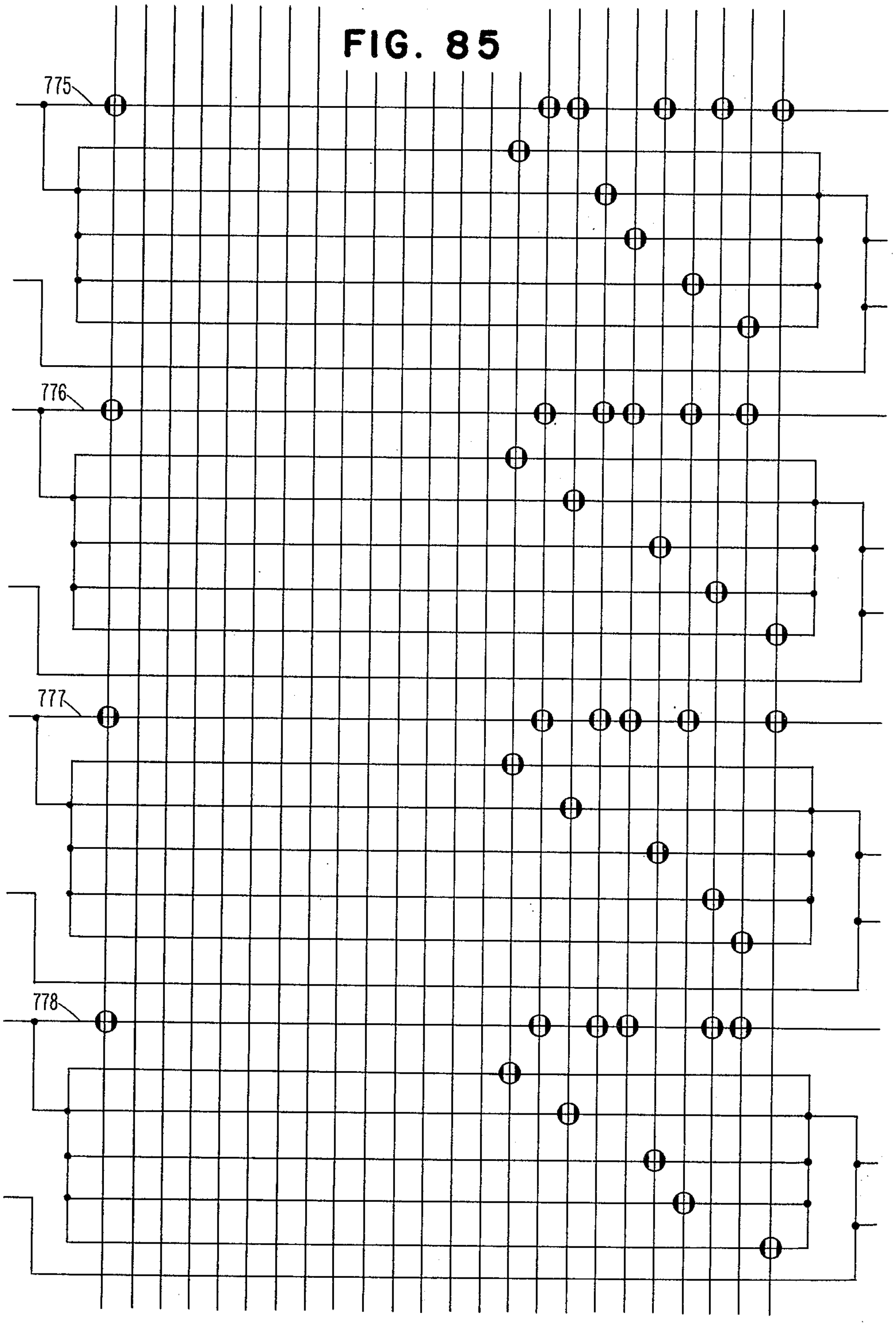
Figure 86:
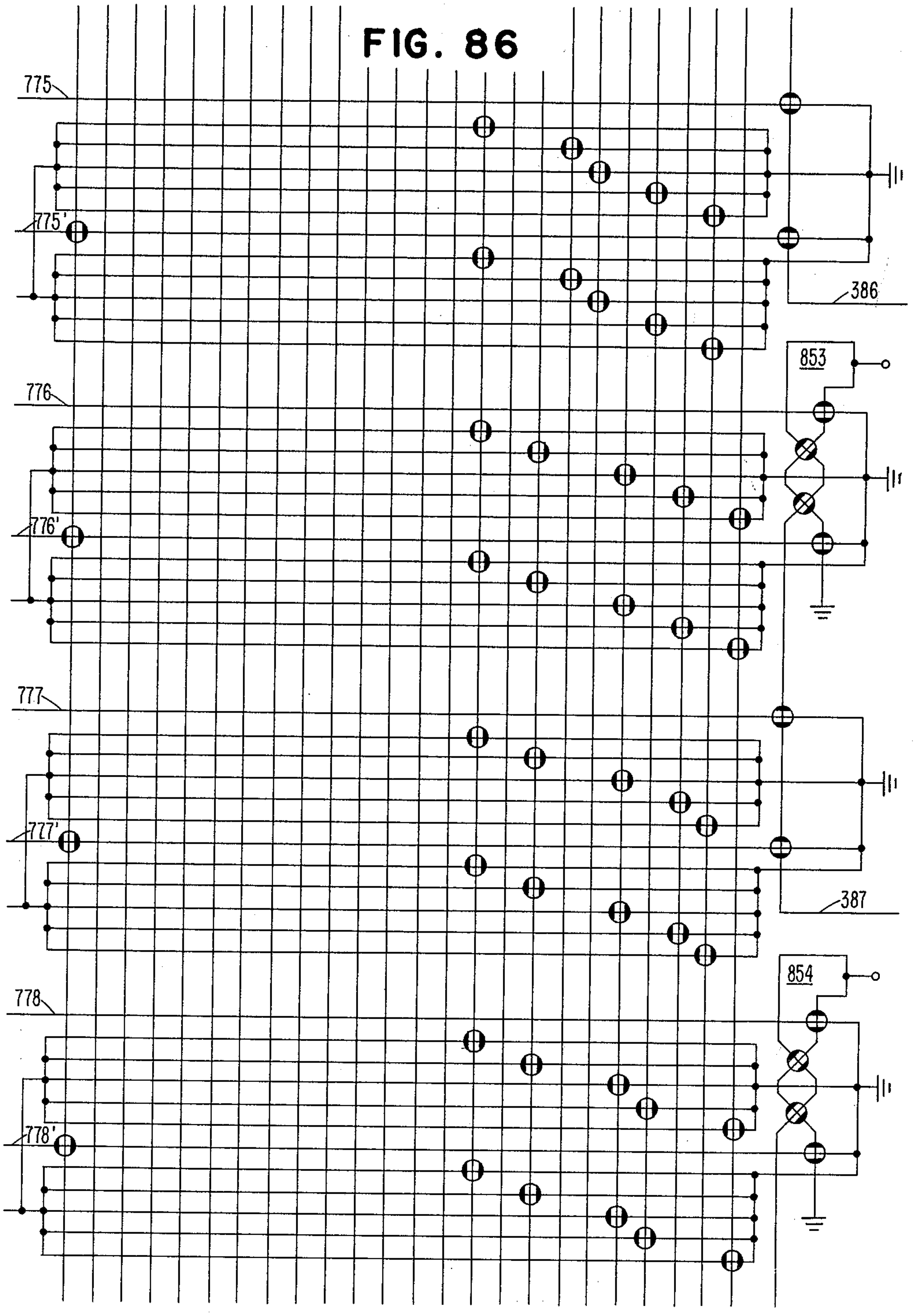
Figure 87:
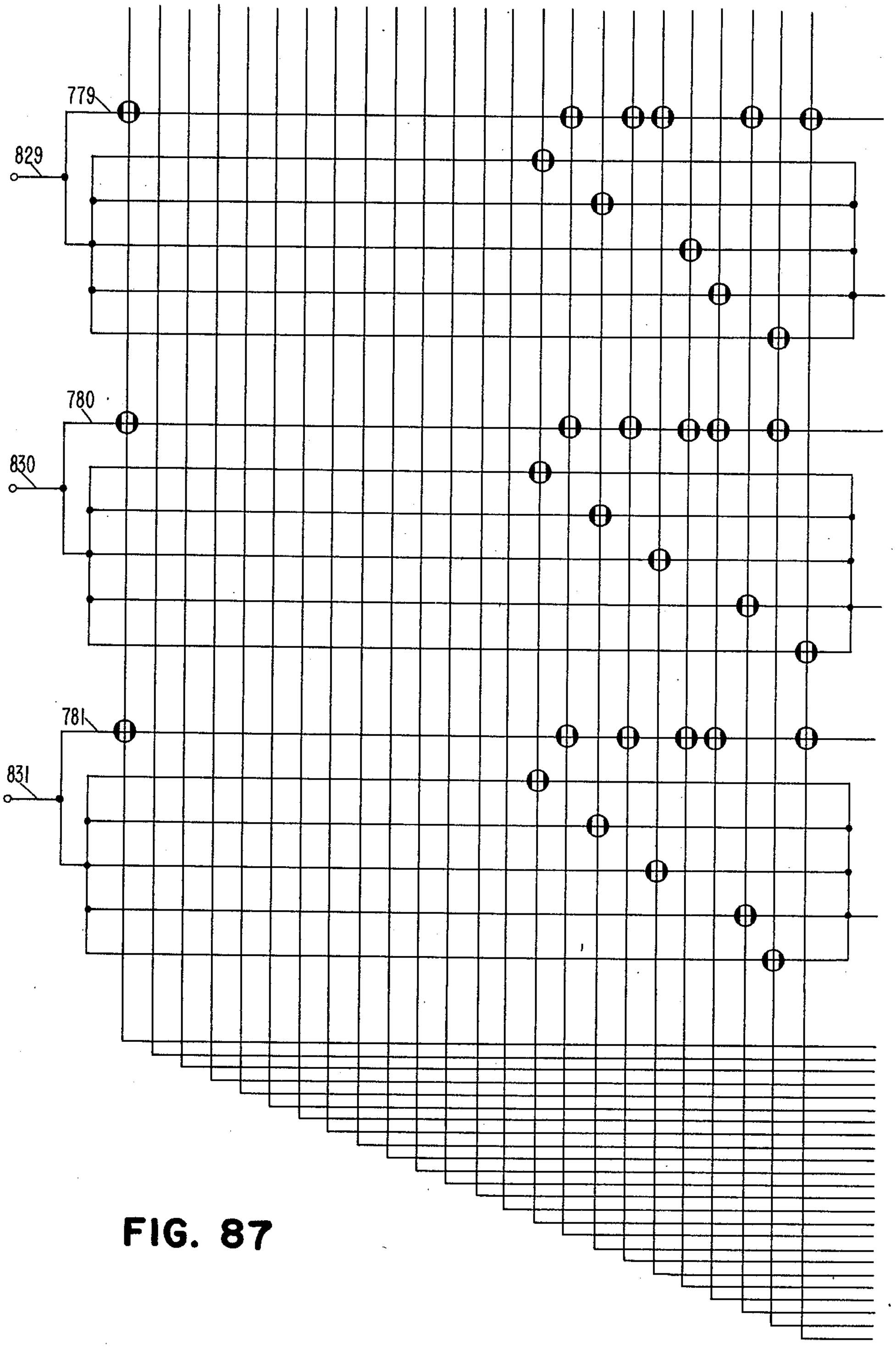
Figure 88:
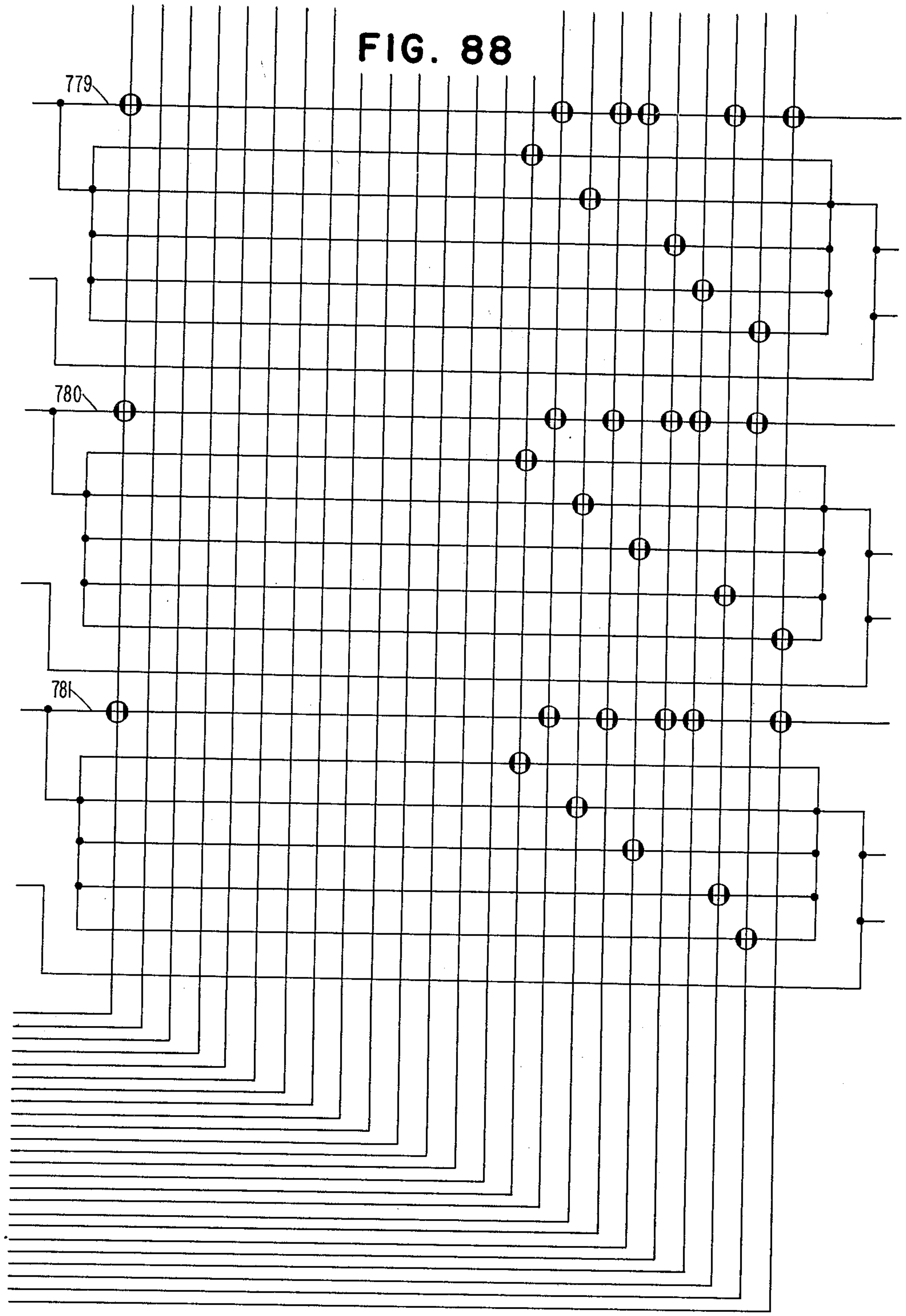
Figure 89:
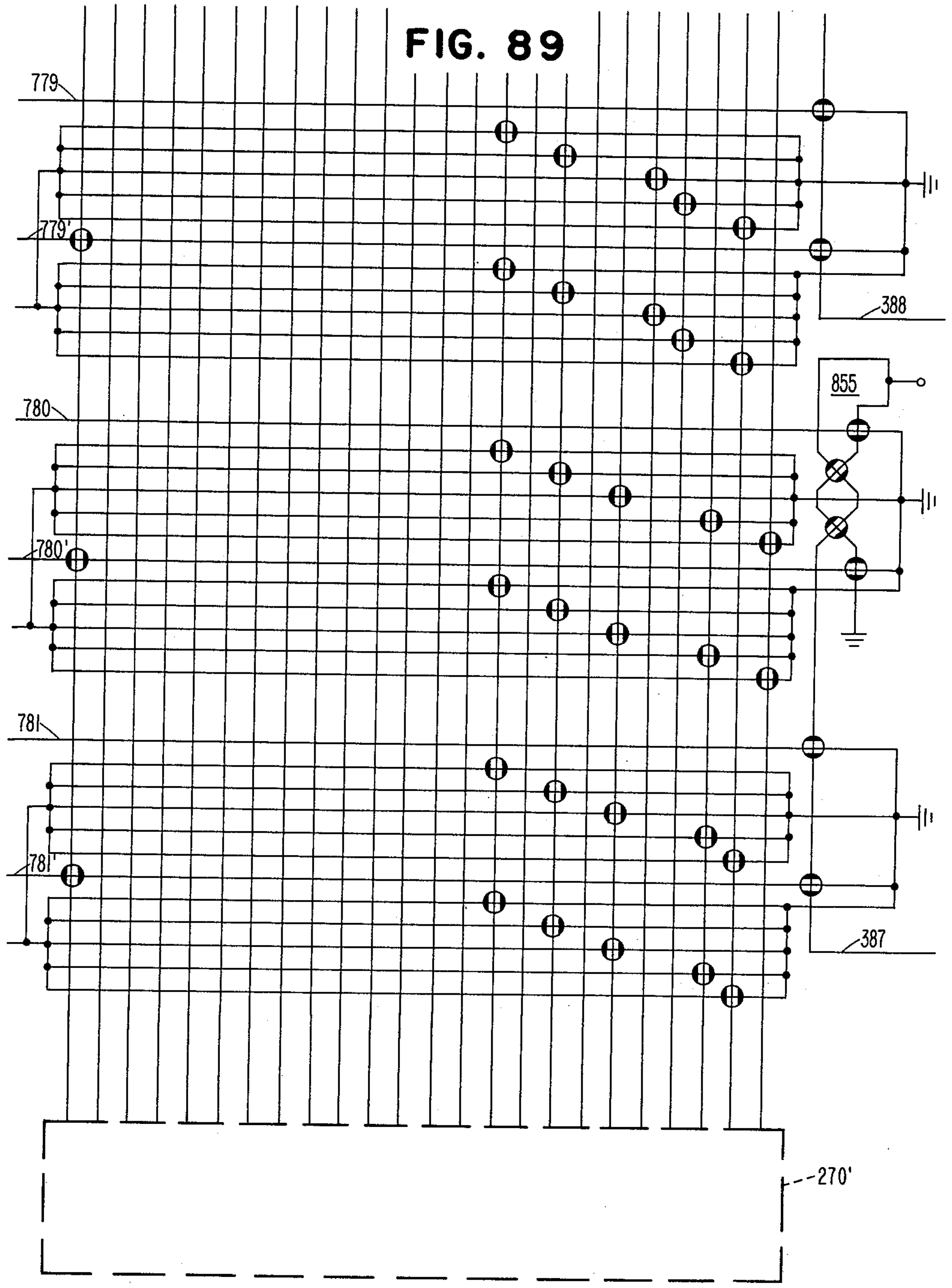

In order to obtain the desired operation of the system so far described, a control computer 270 is provided as shown in FIG. 9. This computer acts in response to information received from a testing system to furnish output signals in twelve pairs of lines, which output signals are utilized in the control system of FIGS. 9 through 71. The testing system mentioned above is used to detect faults in the various horizontal and vertical conductors of the array 50 and to indicate to the computer 270 where the fault is located when one occurs. Such a testing system is shown and described in the copending application Serial No. 46,263, filed July 29, 1960, which is assigned to the assignee of the present invention. The output signals provided by the control computer 270 are fed to the twelve pairs of output lines in binary form, a signal on the left-hand line of each pair representing a binary one and a signal appearing on the right-hand line of each pair representing a binary zero. The first pair of output lines, indicated at 272 and 273 of FIG. 9, are used to provide input signals to the control circuitry which will determine whether the horizontal or the vertical lines and spares of the array 50 are to be operated upon by the control circuitry. A signal on line 272 is provided by a binary one output from the computer and indicates the selection of the control circuitry for the vertical lines or vertical spares. A binary zero output on line 273 selects the control circuitry for the horizontal lines or horizontal spares.

The next six pairs of outputs from the computer 270 include lines 274 through 285. These pairs of lines carry signals to the control circuits for the spare set lines indicated in FIG. 7, the signals on lines 272 and 273 determining whether the horizontal or the vertical spare set lines are to be controlled. The lines 274 through 285 provide coded signals to the spare set control circuits. This code is set forth in Table I below, where each column represents a pair of lines and where a one (1) indicates a signal on the even numbered line of a pair and a zero (0) indicates a signal on the odd numbered line.

The last five pairs of output lines from the computer 270 include the lines 286 through 295 (FIG. 9), which lines provide coded signals to the control circuit of the biasing inhibitors included in vertical lines 52–55, horizontal conductors 58–64, vertical spare connector lines 146–149 and 168–171 and in horizontal spare connector lines 105–112, 118, 120, 122, 124, 126, 128, 130 and 132. The coded signals appearing on lines 286 through 295 determine which bias line control circuit is to be activated. The code used to select the various bias line control circuits is set forth in Table I below, where each column corresponds to a pair of lines and where a one (1) indicates a signal on an even numbered line and a zero (0) indicates a signal on an odd numbered line.

TABLE I

*Binary Codes for Control Circuit Function Lines*

SPARE SETTING CIRCUITS

| Cell No. | Function Line No. | | Computer Select Lines (272–273) | Computer (Set Spares) Lines (274–285) | | | | | |
|---|---|---|---|---|---|---|---|---|---|
| | Main Inhib. On | Main Inhib. Off | | | | | | | |
| 158 | 524 | | 1 | 0 | 0 | 0 | 0 | ---- | 0 |
| 158 | | 574 | 1 | 0 | 0 | 0 | 0 | 0 | 1 |
| 159 | 630 | | 1 | 0 | 0 | 0 | 0 | 1 | 0 |
| 159 | | 631 | 1 | 0 | 0 | 0 | 0 | 1 | 1 |
| 160 | 632 | | 1 | 0 | 0 | 0 | 1 | 0 | 0 |
| 160 | | 633 | 1 | 0 | 0 | 0 | 1 | 0 | 1 |
| 161 | 634 | | 1 | 0 | 0 | 0 | 1 | 1 | 0 |
| 161 | | 635 | 1 | 0 | 0 | 0 | 1 | 1 | 1 |
| 162 | 636 | | 1 | 0 | 0 | 1 | 0 | 0 | 0 |
| 162 | | 637 | 1 | 0 | 0 | 1 | 0 | 0 | 1 |
| 163 | 638 | | 1 | 0 | 0 | 1 | 0 | 1 | 0 |
| 163 | | 639 | 1 | 0 | 0 | 1 | 0 | 1 | 1 |
| 164 | 640 | | 1 | 0 | 0 | 1 | 1 | 0 | 0 |
| 164 | | 641 | 1 | 0 | 0 | 1 | 1 | 0 | 1 |
| 165 | 642 | | 1 | 0 | 0 | 1 | 1 | 1 | 0 |
| 165 | | 643 | 1 | 0 | 0 | 1 | 1 | 1 | 1 |
| 166 | 644 | | 1 | 0 | 1 | 0 | 0 | 0 | 0 |
| 166 | | 645 | 1 | 0 | 1 | 0 | 0 | 0 | 1 |
| 258 | 646 | | 1 | 0 | 1 | 0 | 0 | 1 | 0 |
| 258 | | 647 | 1 | 0 | 1 | 0 | 0 | 1 | 1 |
| 259 | 648 | | 1 | 0 | 1 | 0 | 1 | 0 | 0 |
| 259 | | 649 | 1 | 0 | 1 | 0 | 1 | 0 | 1 |
| 260 | 650 | | 1 | 0 | 1 | 0 | 1 | 1 | 0 |
| 260 | | 651 | 1 | 0 | 1 | 0 | 1 | 1 | 1 |
| 261 | 652 | | 1 | 0 | 1 | 1 | 0 | 0 | 0 |
| 261 | | 653 | 1 | 0 | 1 | 1 | 0 | 0 | 1 |
| 262 | 654 | | 1 | 0 | 1 | 1 | 0 | 1 | 0 |
| 262 | | 655 | 1 | 0 | 1 | 1 | 0 | 1 | 1 |
| 263 | 656 | | 1 | 0 | 1 | 1 | 1 | 0 | 0 |
| 263 | | 657 | 1 | 0 | 1 | 1 | 1 | 0 | 1 |
| 264 | 658 | | 1 | 0 | 1 | 1 | 1 | 1 | 0 |
| 264 | | 659 | 1 | 0 | 1 | 1 | 1 | 1 | 1 |
| 265 | 660 | | 1 | 1 | 0 | 0 | 0 | 0 | 0 |
| 265 | | 661 | 1 | 1 | 0 | 0 | 0 | 0 | 1 |
| 266 | 662 | | 1 | 1 | 0 | 0 | 0 | 1 | 0 |
| 266 | | 663 | 1 | 1 | 0 | 0 | 0 | 1 | 1 |
| 134 | 664 | | 0 | 1 | 0 | 0 | 1 | 0 | 0 |
| 134 | | 665 | 0 | 1 | 0 | 0 | 1 | 0 | 1 |
| 135 | 666 | | 0 | 1 | 0 | 0 | 1 | 1 | 0 |
| 135 | | 667 | 0 | 1 | 0 | 0 | 1 | 1 | 1 |
| 136 | 668 | | 0 | 1 | 0 | 1 | 0 | 0 | 0 |
| 136 | | 669 | 0 | 1 | 0 | 1 | 0 | 0 | 1 |
| 137 | 670 | | 0 | 1 | 0 | 1 | 0 | 1 | 0 |
| 137 | | 671 | 0 | 1 | 0 | 1 | 0 | 1 | 1 |
| 140 | 672 | | 0 | 1 | 0 | 1 | 1 | 0 | 0 |
| 140 | | 673 | 0 | 1 | 0 | 1 | 1 | 0 | 1 |
| 141 | 674 | | 0 | 1 | 0 | 1 | 1 | 1 | 0 |
| 141 | | 675 | 0 | 1 | 0 | 1 | 1 | 1 | 1 |
| 142 | 676 | | 0 | 1 | 1 | 0 | 0 | 0 | 0 |
| 142 | | 677 | 0 | 1 | 1 | 0 | 0 | 0 | 1 |
| 143 | 678 | | 0 | 1 | 1 | 0 | 0 | 1 | 0 |
| 143 | | 679 | 0 | 1 | 1 | 0 | 0 | 1 | 1 |

BIAS CIRCUITS

| Array Conductor | Function Line | | Computer Select Lines (272–273) | Computer Bias-Off Lines (286–295) | | | | |
|---|---|---|---|---|---|---|---|---|
| | On | Off | | | | | | |
| 52 | 400 | | 1 | 0 | 0 | 0 | 0 | 0 |
| 52 | | 440 | 1 | 0 | 0 | 0 | 0 | 1 |
| 53 | 600 | | 1 | 0 | 0 | 0 | 1 | 0 |
| 53 | | 601 | 1 | 0 | 0 | 0 | 1 | 1 |
| 54 | 602 | | 1 | 0 | 0 | 1 | 0 | 0 |
| 54 | | 603 | 1 | 0 | 0 | 1 | 0 | 1 |
| 55 | 604 | | 1 | 0 | 0 | 1 | 1 | 0 |
| 55 | | 605 | 1 | 0 | 0 | 1 | 1 | 1 |
| 58 | 610 | | 0 | 0 | 0 | 0 | 0 | 0 |
| 58 | | 611 | 0 | 0 | 0 | 0 | 0 | 1 |
| 59 | 612 | | 0 | 0 | 0 | 0 | 1 | 0 |
| 59 | | 613 | 0 | 0 | 0 | 0 | 1 | 1 |
| 60 | 614 | | 0 | 0 | 0 | 1 | 0 | 0 |
| 60 | | 615 | 0 | 0 | 0 | 1 | 0 | 1 |
| 61 | 616 | | 0 | 0 | 0 | 1 | 1 | 0 |
| 61 | | 617 | 0 | 0 | 0 | 1 | 1 | 1 |
| 62 | 618 | | 0 | 0 | 1 | 0 | 0 | 0 |
| 62 | | 619 | 0 | 0 | 1 | 0 | 0 | 1 |
| 63 | 620 | | 0 | 0 | 1 | 0 | 1 | 0 |
| 63 | | 621 | 0 | 0 | 1 | 0 | 1 | 1 |
| 64 | 622 | | 0 | 0 | 1 | 1 | 0 | 0 |
| 64 | | 623 | 0 | 0 | 1 | 1 | 0 | 1 |

SPARE WIRE BIAS CIRCUITS

| Spare Connector Line | Function Line | | Computer Select Lines (272–273) | Computer Bias-Off Lines (286–295) | | | | |
|---|---|---|---|---|---|---|---|---|
| | On | Off | | | | | | |
| 146 | 750 | | 1 | 0 | 1 | 0 | 0 | 0 |
| 146 | | 751 | 1 | 0 | 1 | 0 | 0 | 1 |
| 147 | 752 | | 1 | 0 | 1 | 0 | 1 | 0 |
| 147 | | 753 | 1 | 0 | 1 | 0 | 1 | 1 |
| 148 | 754 | | 1 | 0 | 1 | 1 | 0 | 0 |
| 148 | | 755 | 1 | 0 | 1 | 1 | 0 | 1 |
| 149 | 756 | | 1 | 0 | 1 | 1 | 1 | 0 |
| 149 | | 757 | 1 | 0 | 1 | 1 | 1 | 1 |
| 168 | 758 | | 1 | 1 | 0 | 0 | 0 | 0 |
| 168 | | 759 | 1 | 1 | 0 | 0 | 0 | 1 |
| 169 | 760 | | 1 | 1 | 0 | 0 | 1 | 0 |
| 169 | | 761 | 1 | 1 | 0 | 0 | 1 | 1 |
| 170 | 762 | | 1 | 1 | 0 | 1 | 0 | 0 |
| 170 | | 763 | 1 | 1 | 0 | 1 | 0 | 1 |
| 171 | 764 | | 1 | 1 | 0 | 1 | 1 | 0 |
| 171 | | 765 | 1 | 1 | 0 | 1 | 1 | 1 |
| 105 | 766 | | 0 | 0 | 1 | 1 | 1 | 0 |
| and 124 | | 767 | 0 | 0 | 1 | 1 | 1 | 1 |
| 106 | 768 | | 0 | 1 | 0 | 0 | 0 | 0 |
| and 122 | | 769 | 0 | 1 | 0 | 0 | 0 | 1 |
| 107 | 770 | | 0 | 1 | 0 | 0 | 1 | 0 |
| and 120 | | 771 | 0 | 1 | 0 | 0 | 1 | 1 |
| 108 | 772 | | 0 | 1 | 0 | 1 | 0 | 0 |
| and 118 | | 773 | 0 | 1 | 0 | 1 | 0 | 1 |
| 109 | 774 | | 0 | 1 | 0 | 1 | 1 | 0 |
| and 132 | | 775 | 0 | 1 | 0 | 1 | 1 | 1 |
| 110 | 776 | | 0 | 1 | 1 | 0 | 0 | 0 |
| and 130 | | 777 | 0 | 1 | 1 | 0 | 0 | 1 |
| 111 | 778 | | 0 | 1 | 1 | 0 | 1 | 0 |
| and 128 | | 779 | 0 | 1 | 1 | 0 | 1 | 1 |
| 112 | 780 | | 0 | 1 | 1 | 1 | 0 | 0 |
| and 126 | | 781 | 0 | 1 | 1 | 1 | 0 | 1 |

Referring now to the control circuitry associated with the array 50, the numerals 300 and 301 indicate the supply lines for the circuitry controlling the biasing-off of the vertical line 52 of array 50. This control is exercised by a signal which may be applied to line 196 shown in FIGS. 5 and 11. A driver current source (not shown) is connected to supply line 300. It is desirable that a superconductive path be provided for this current at all times and to this end a function path 400 and alternate paths 401 through 405 are provided. The function path 400 includes inhibitors 408 through 413 located at the intersections of lines 400 with code lines 273, 286, 288, 290, 292, and 294, respectively. The presence of a signal in any one of these code lines will result in the blockage of current flow in function line 400. Current from the supply line 300 will then be switched into an alternate path that is not inhibited. In order that current might pass through function line 400 uninhibited, the vertical or horizontal select signal must be a binary one, that is, must appear on line 272, and the bias-off signals must all be binary zeros, that is, must appear on lines 287, 289, 291, 293 and 295. When the bias-off signals are all binary zeros, current will pass through inhibitors 416, 417, 418, 419 and 420, located on the alternate paths 401 through 405, respectively. This will block current flow through the alternate paths and direct it all through the function line 400. A change in the bias-off code which results, for example, in the appearance of a signal on line 294 instead of on line 295 will result in the blocking of current flow through line 400 and the switching of this current to one of the alternate paths. If the signal is changed from line 295 to line 294, inhibitor 420 will no longer block current flow and the current from supply line 300 will flow through alternate path 405. More than one such alternate path may be provided as the bias-off code varies through the range indicated in Table I.

Figure 10:
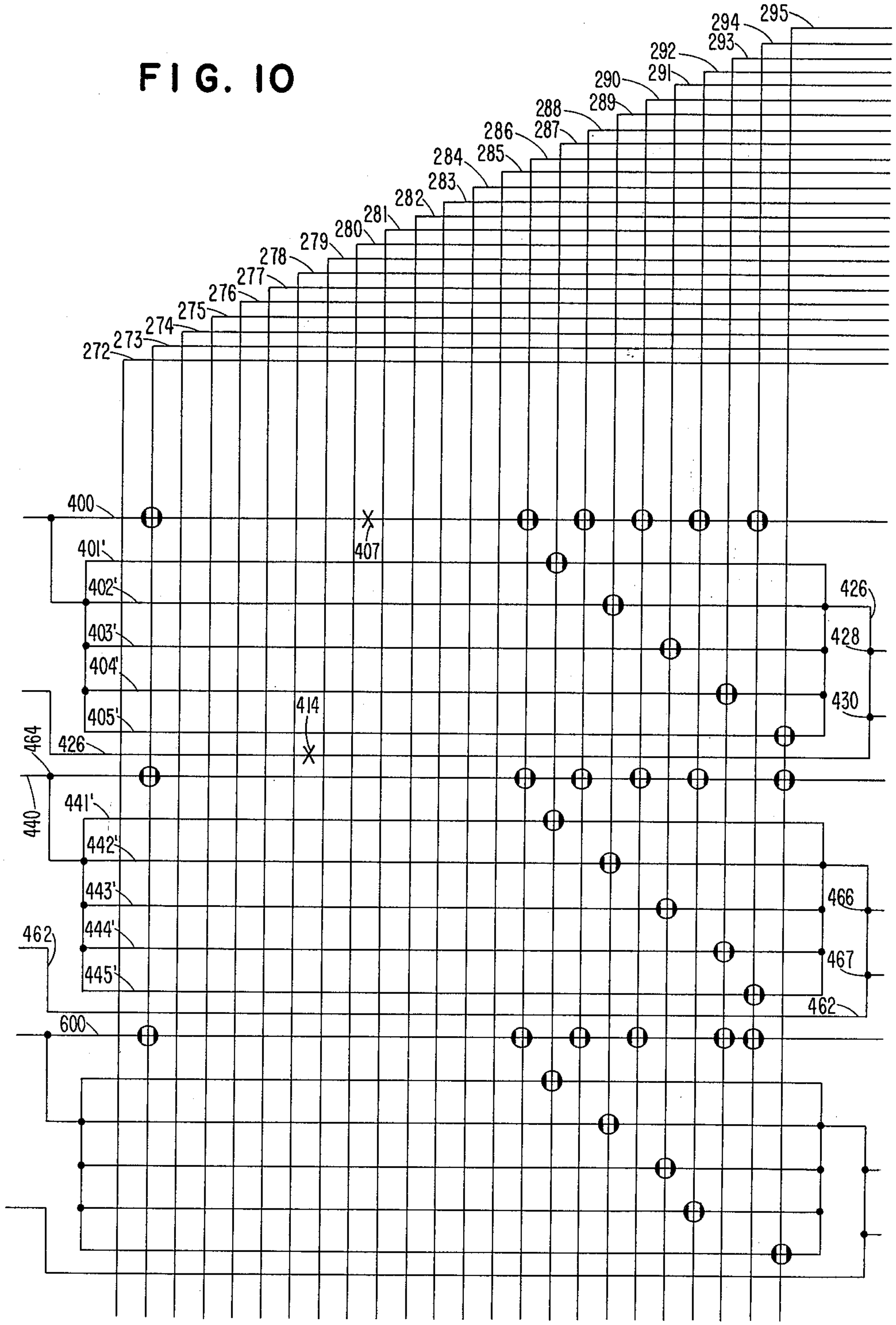
Figure 11:
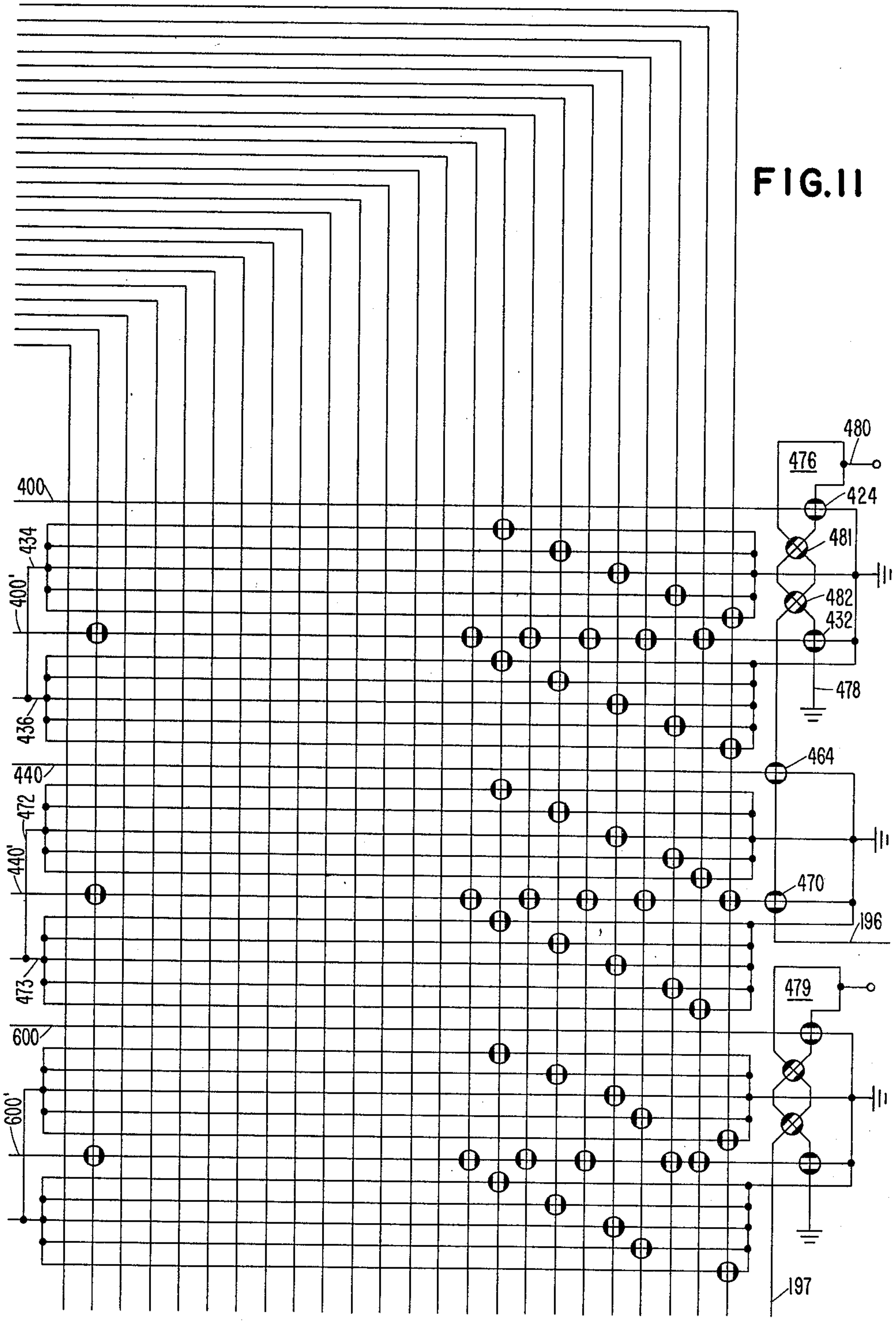

In the particular type of printed construction utilized in a preferred embodiment of the invention, the various current carrying wires are particularly susceptible to breakage and the occurrence of short-circuits. In order to provide the desired degree of reliability in the control circuitry, redundant components are provided. The redundant components for the function line 400 and the alternate paths 401 through 405 are shown in FIGS. 10 and 11. In order to supply the coded output signals from computer 270 to the redundant components of FIGS. 10 and 11, the code lines 272 through 295 are arranged to pass serially, column by column through all the control circuit components.

The function line 400, described with reference to FIG. 9, continues on to FIGS. 10 and 11, crossing code lines 272 through 295 for a second time in FIG. 10 and for a third time in FIG. 11. Inhibitors are again included in line 400 at its second intersection with code lines 273, 286, 288, 290, 292 and 294. Five alternate paths 401' through 405' are attached to function line 400 in FIG. 10, again furnishing alternate paths for any current flowing in line 400 if such current should be blocked. Alternate paths 401' through 405' are identical to the alternate paths 401 through 405 shown in FIG. 9, both sets of alternate paths having inhibitors at corresponding intersections with the code lines. In its third crossing of the code lines 272 through 295, shown in FIG. 11, the function line 400 includes no inhibitors. The code lines thus have no effect on the current flowing through this portion of function line 400. After crossing the code lines, function line 400 crosses an inhibitor 424 and is then terminated at a common ground point.

Referring again to FIG. 9, the alternate paths 401 through 405 are all connected to a common line 426 after crossing the code line 295 for the first time. Line 426 serves to connect the terminal end of the set of alternate lines 401 through 405 to the terminal end of alternate paths 401' through 405', which paths are also connected to a common point. Two lines are connected to line 426, one at terminal 428 and the other at terminal 430. The line connected to terminal 428 is a function line 400' which line is a duplicate of that portion of line 400 which is shown in FIG. 9, and thus includes inhibitor elements at its intersections with code lines 273, 286, 288, 290, 292 and 294. After crossing the code lines, function line 400' has an inhibitor element 432 disposed therealong and terminates at a common ground point. Connected to terminal 430 through lines 434 and 436, respectively, are two more sets of alternate paths, each set being identical to the set 401 through 405 shown in FIG. 9. Thus, both the set connected to line 434 and the set connected to line 436 include inhibitors at code lines 287, 289, 291, 293 and 295, each line of each set including one inhibitor. Both of these sets of alternate paths are terminated at a common ground point.

Referring again to FIG. 9, the supply line 301 furnishes current to a function line 440, which line is broken up into three portions, the first portion being shown in FIG. 9, the second in FIG. 10 and the third in FIG. 11. The first portion of function line 440 includes inhibitors 448 through 453 located at the intersections of line 440 with code lines 273, 286, 288, 290, 292 and 295, respectively. The second portion of line 440 is identical to the first, making a second crossing of the code lines 272 through 295 and including inhibitors at intersections corresponding to those of the first portion.

The third portion of function line 440 includes only one inhibitor, inhibitor 464 at the intersection of line 440 with line 196. The inhibitors on line 440 are arranged so as to block current flow in line 440 for all combinations of bias-off signals supplied to lines 286 through 295 except that combination where lines 287, 289, 291, 293 and 294 carry signals. When this is the case and when line 272 also carries a signal, current will flow through line 440. In the event that such a combination is not applied to code lines 286 through 295, current will not flow through line 440 but will be switched to one of the alternate paths 441 through 445 which are provided for this purpose. Alternate paths 441 through 445 include inhibitors 456 through 460, respectively, each inhibitor being located at the intersection of its respective alternate path with one of the code lines 287, 289, 291, 293 and 294.

It should be noted that the inhibitors included in the alternate paths are located only on those code lines which pass through no inhibitor on line 440; that is, the alternate paths in the control circuitry are coded in accordance with the negation of the associated function line. Alternate paths 441 through 445 terminate in a common line 462. The second portion of line 440, shown in FIG. 10, is provided with a set of alternate paths 441' through 445'. These alternate paths are connected to function line 440 at terminal 464. Each one of the paths 441' through 445' is identical to its corresponding path in the set 441 through 445. Alternate paths 441' through 445' all terminate at a common line which is connected directly to line 462. Line 462 includes two terminals which are indicated at 466 and 467 in FIG. 10. A function line 440' is connected to terminal 466 and traverses the third portion of the code lines 272 through 295. The function line 440' is identical to the first portion of line 440, including inhibitors at the intersections of code lines 273, 286, 288, 290, 292 and 295. This function line contains an inhibitor 470 and is terminated at a common ground point. Connected to terminal 467 by way of lines 472 and 473 are two sets of alternate paths, each set being identical to the set of alternate paths indicated by the numerals 441 through 445 in FIG. 9. Both the set of alternate paths connected to line 472 and the set connected to line 473 are terminated at a common ground point.

Supply lines 300 and 301 furnish current through the control circuitry described above, which current flows through the function lines or through the alternate paths of this circuitry to a flip-flop indicated in FIG. 11 by the numeral 476. This flip-flop has two parallel branches indicated by the numbers 196 and 478, respectively. Each branch includes two control inhibitors which are used to establish current flow through one of the branches. A continuous current is furnished to the parallel branches by a source (not shown) through the supply line 480. Branch 196 of the supply line crosses the holding inhibitors 481 and 482, and includes the control inhibitors 464 and 470. Branch 478 also crosses holding inhibitors 481 and 482 and includes control inhibitors 424 and 432. Activation of either inhibitor 424 or 432 will block current from flowing in branch 478, causing all the current from supply line 480 to flow through branch 196. Similarly, activation of either inhibitor 464 or inhibitor 470 will block current from flowing in line 196 and will divert it to line 478. If current is initially established in line 196, inhibitor 482 will be activated to maintain line 478 in a blocked off condition. Similarly, if current is initially established in line 478 the inhibitor 481 will block current flow in line 196. In this manner, once it is established in a given branch, current will continue to flow therein even after the control signals which established the current are removed from the control inhibitors.

The control signals which operate the control inhibitors 424 and 432 are derived from function lines 400 and 400', respectively, while the control signals for control inhibitors 464 and 470 are obtained from the function lines 440 and 440', respectively. Branch 478 of flip-flop 476 terminates at ground, while branch 196 is a vertical bias-off line for one of the conductors of the array 50. By proper selection of the coded output from the control computer 270 the current from either supply line 300 or 301 may be selected to pass through its corresponding function line and to control the flip-flop 476.

If the current from supply line 300 is selected to pass along the function line 400, the inhibitor 424 will be activated, blocking current flow in branch 478 of the flip-flop and thus initiating current flow in branch 196. This current will provide a bias-off signal to the vertical input line 52 (FIG. 5) and will remove that line from the active circuit of array 50. If, on the other hand, current from the supply line 301 is selected to flow through function line 440 to the inhibitor 464, current will be established in line 478 of the flip-flop 476. Since this current passes to ground through inhibitor 481 its only effect on the array 50 will be to prevent current from flowing in line 196. Therefore, current flowing from supply line 300 through its associated function line 400 controls flip-flop 476 which in turn activates inhibitors 180 and 188; that is, it turns them on. Similarly, current flowing from supply line 301 through function line 440 serves to control flip-flop 476 to turn inhibitors 180 and 188 off.

Figure 12:
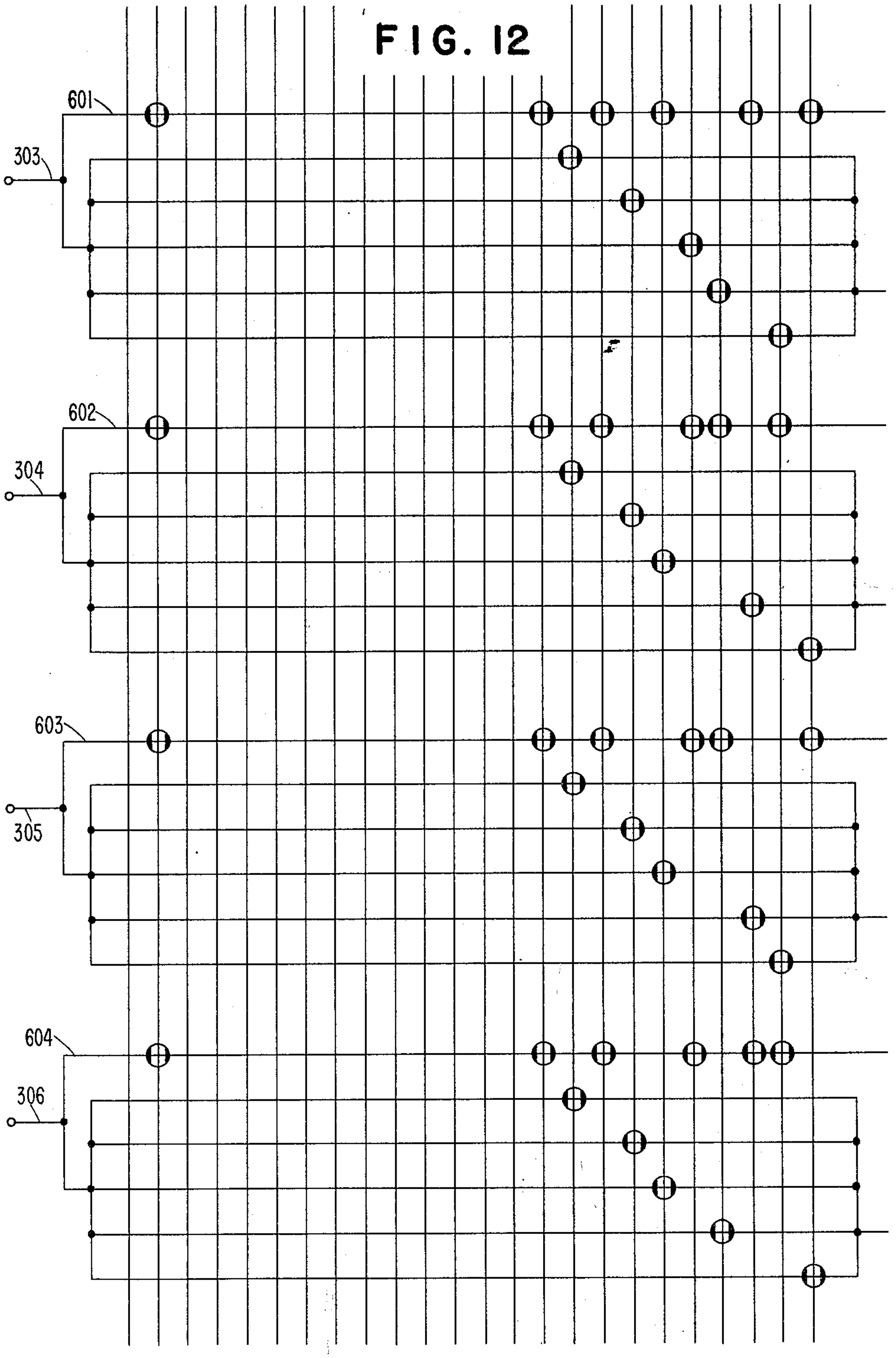
Figure 13:
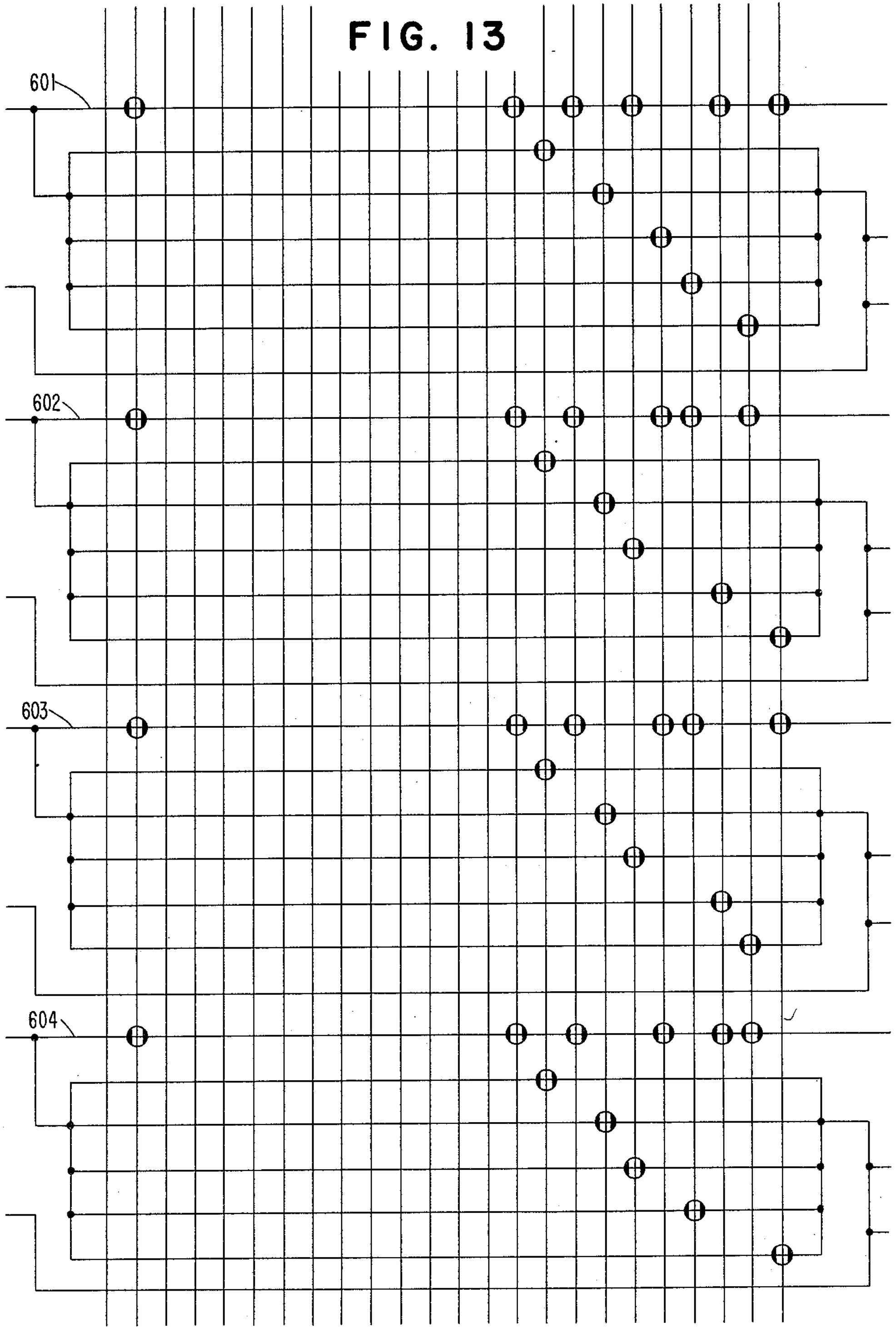
Figure 14:
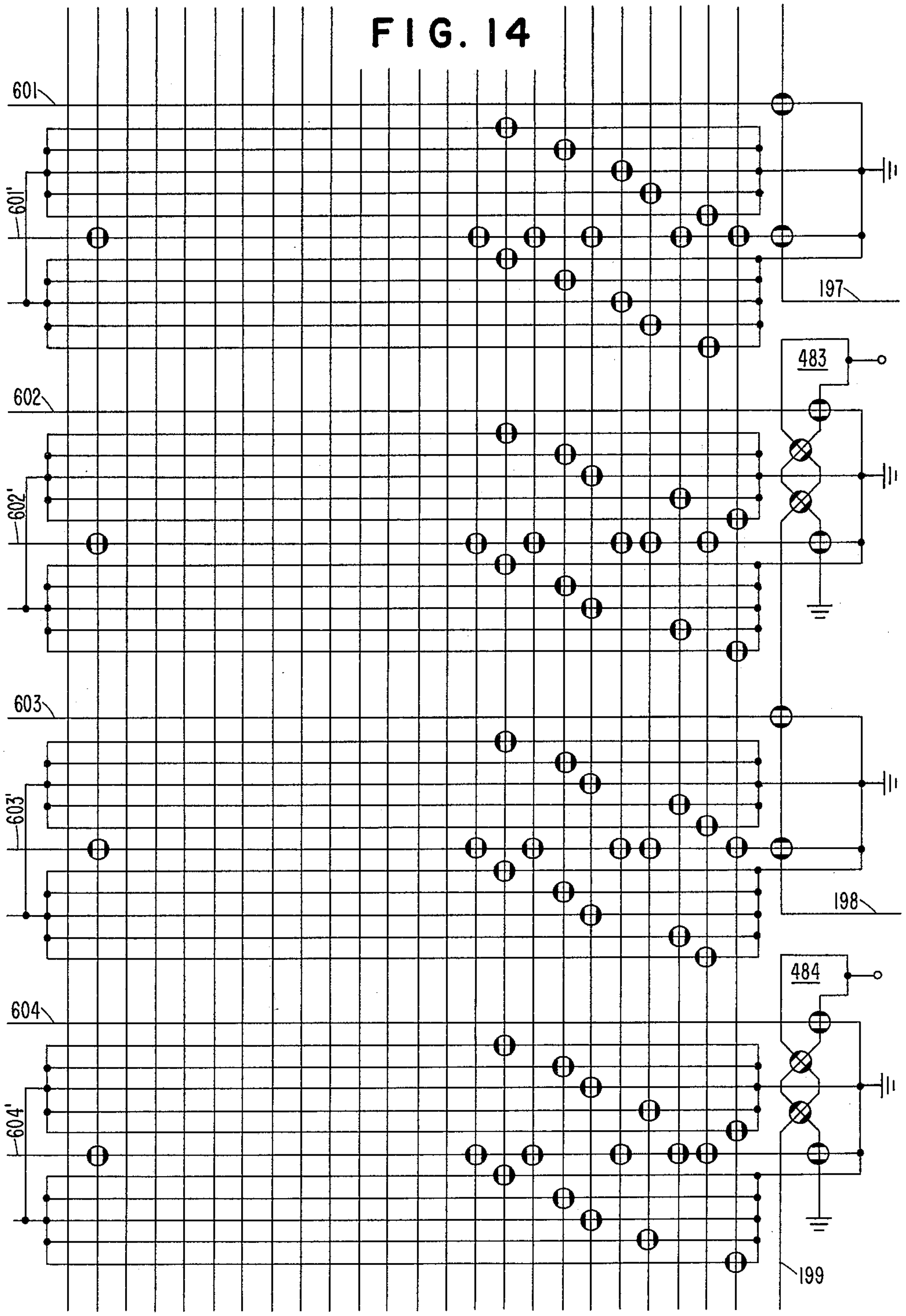
Figure 15:
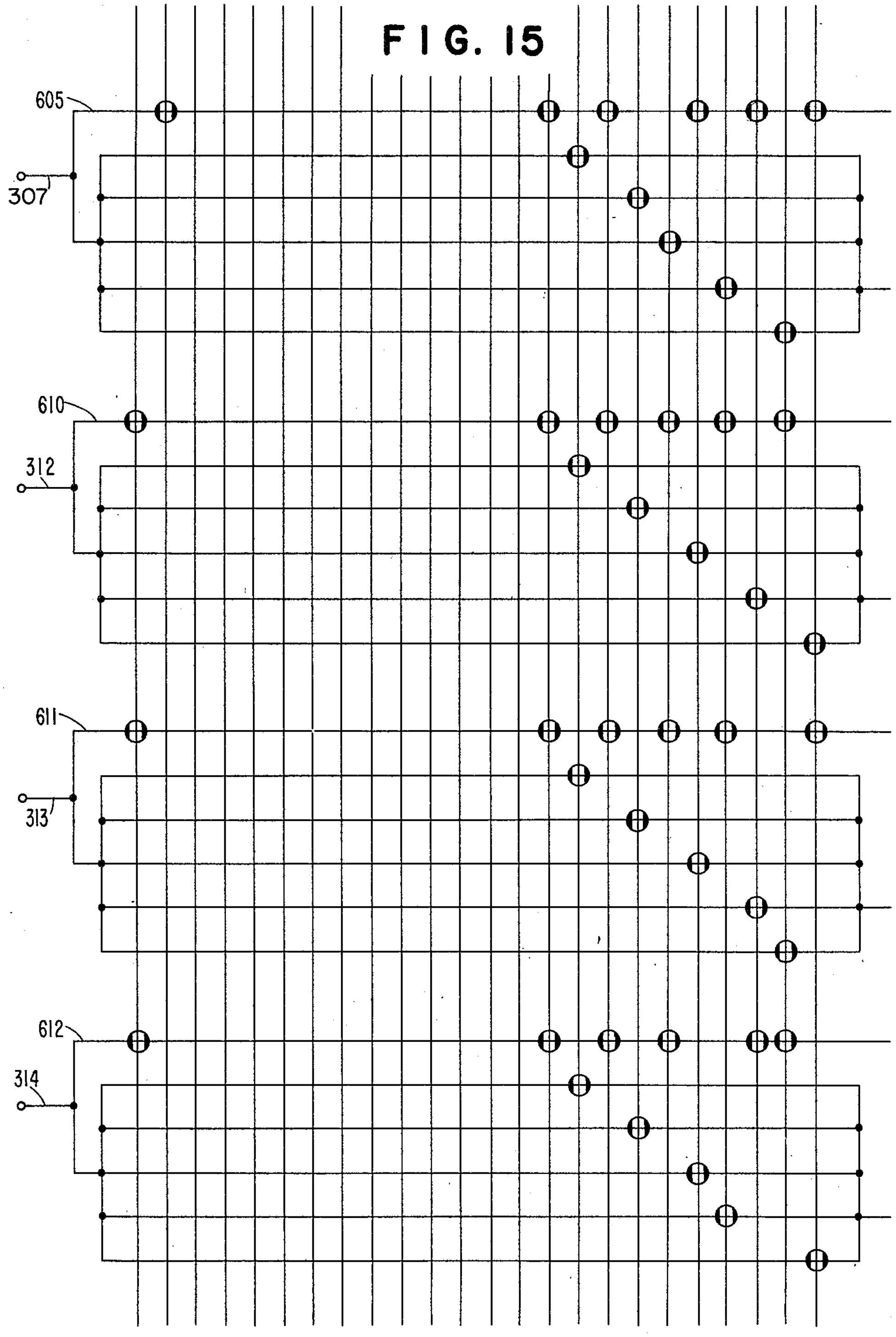
Figure 16:
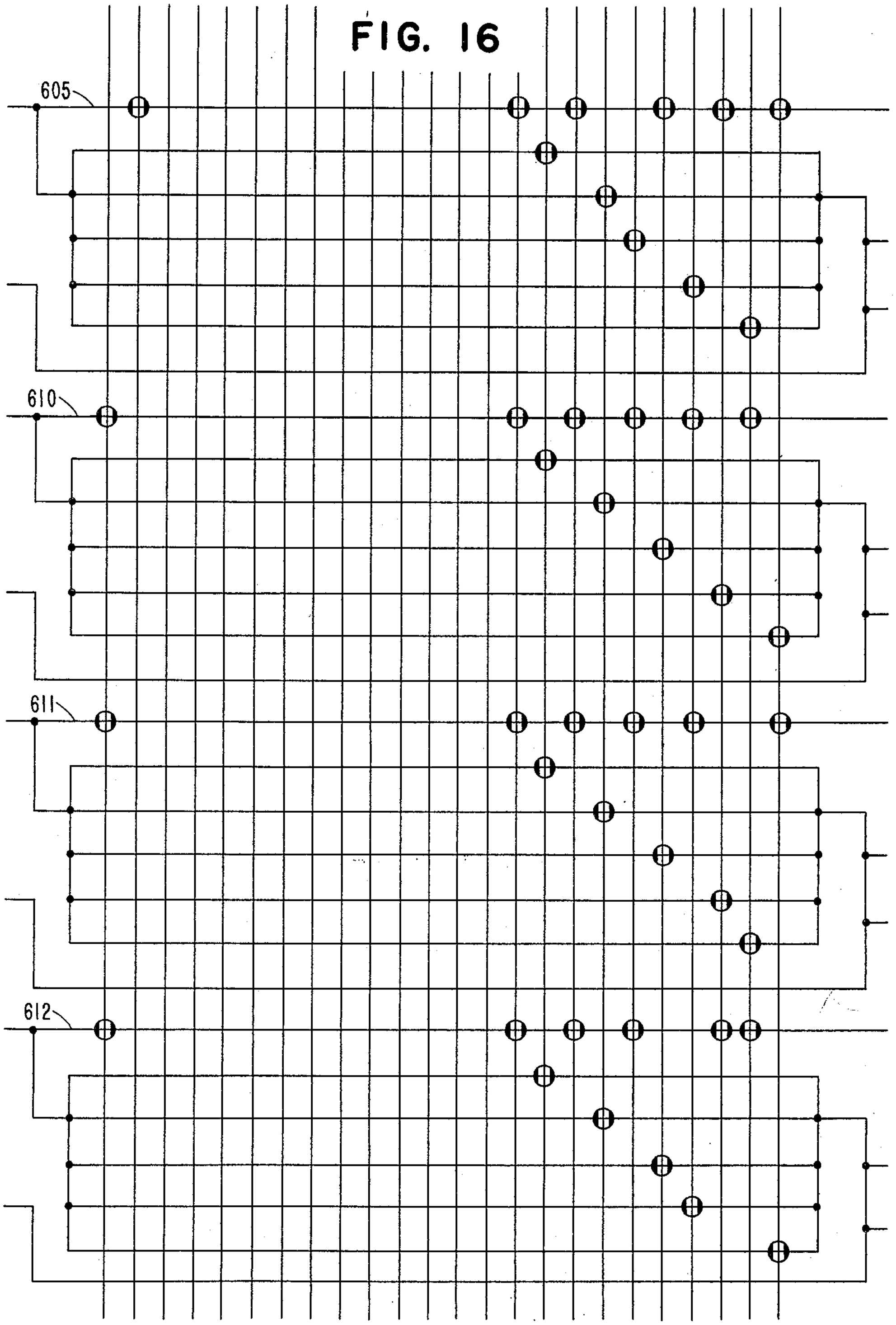
Figure 17:
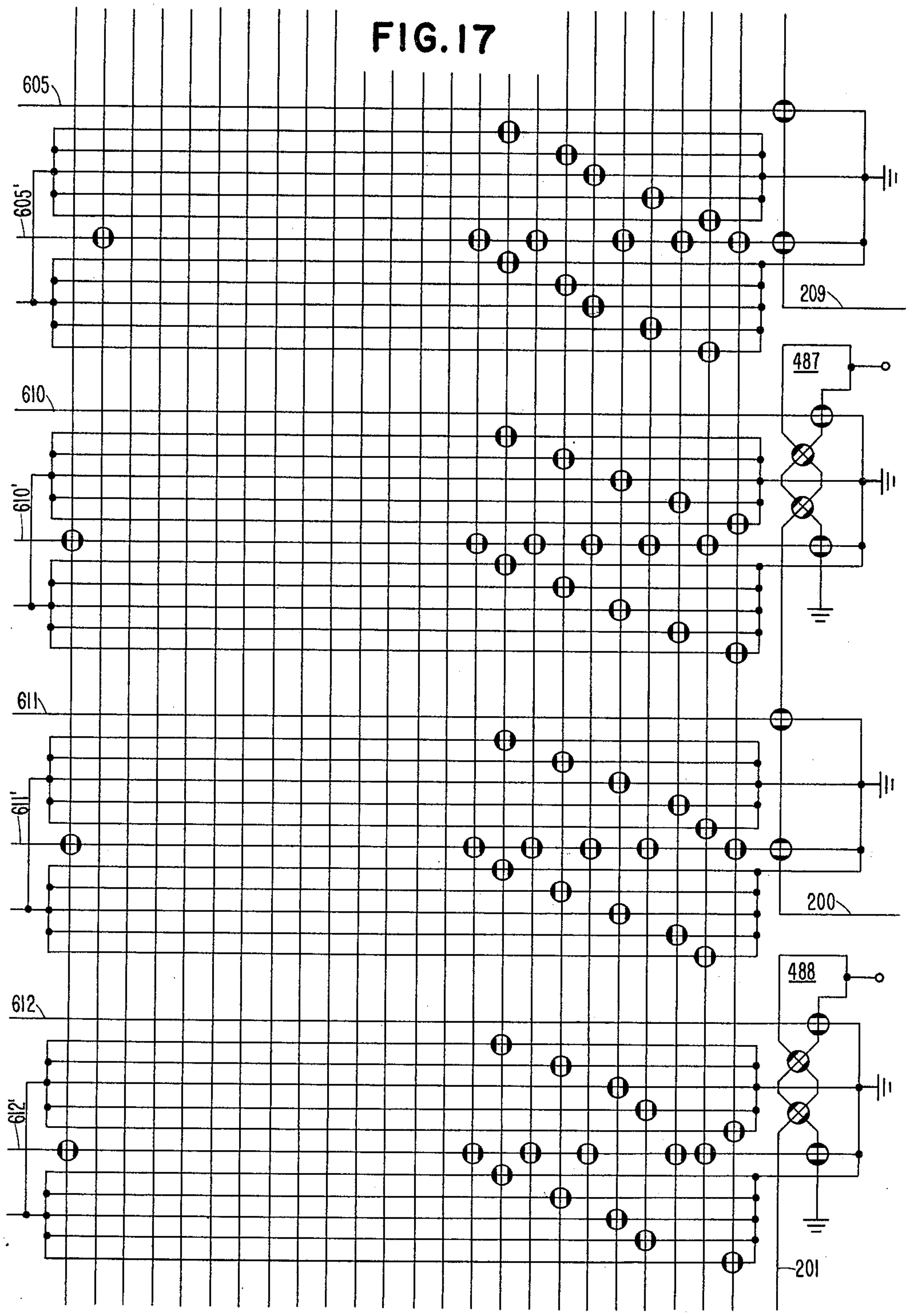
Figure 18:
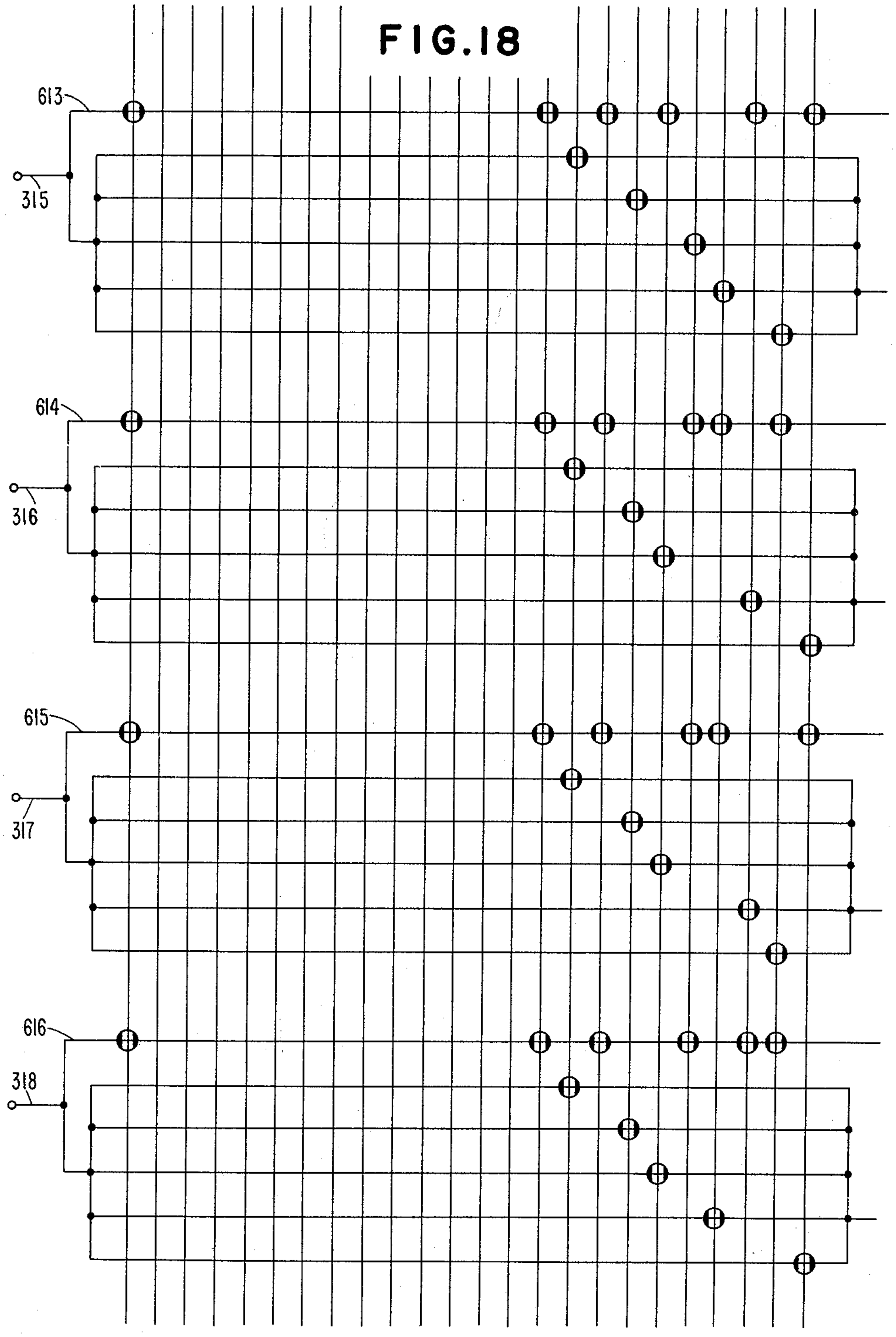
Figure 19:
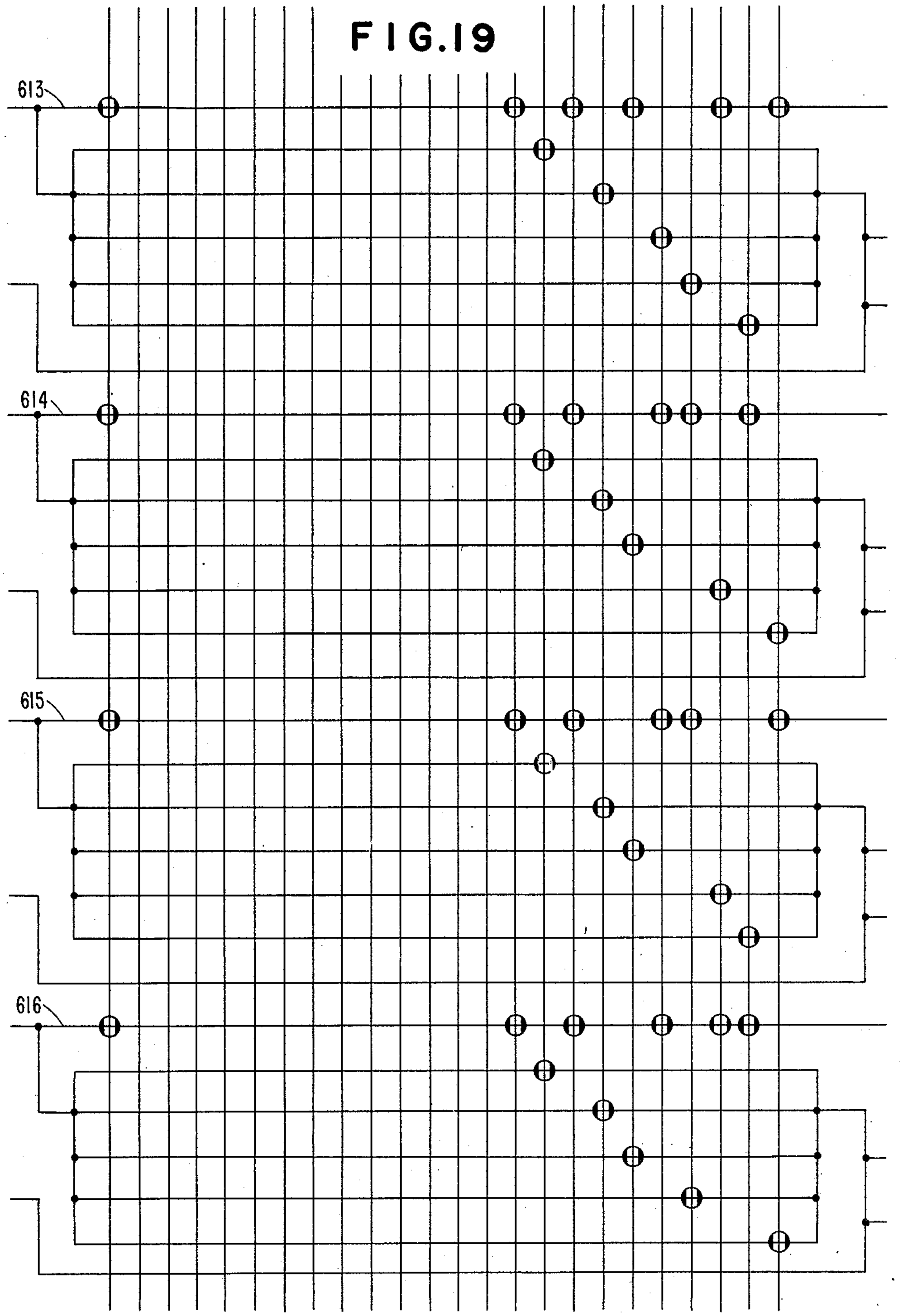
Figure 20:
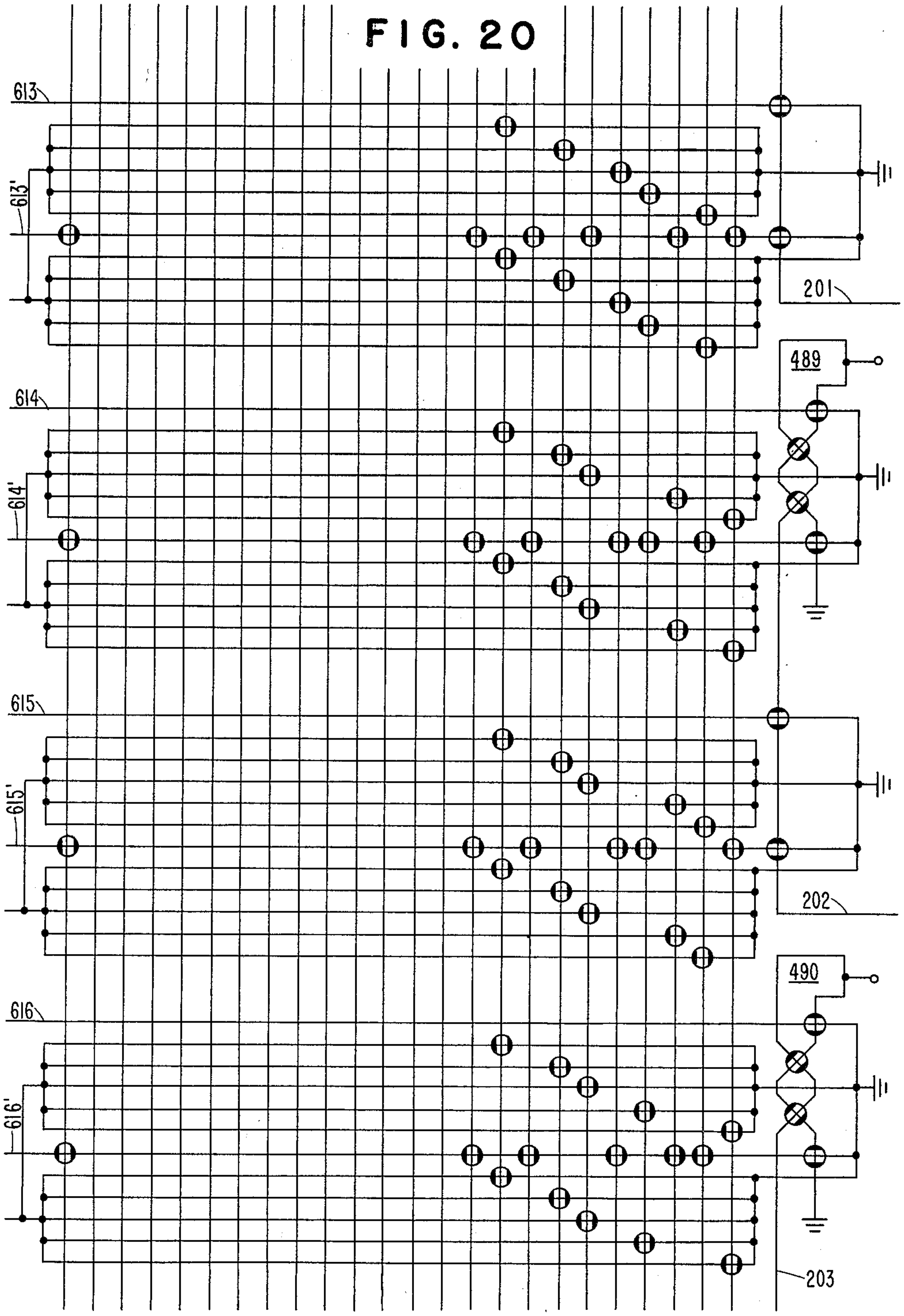

The control circuitry described above with respect to FIGS. 9, 10 and 11 is directed to the control of the bias-off line 196. Similar control circuitry is shown in FIGS. 9 through 26 and 63 through 89 which will provide biasing signals for the bias-off lines 192–195, 197–210 and 382–389 (FIG. 5). In each case, the circuitry provided for a given bias-off line is the same as that shown in FIGS. 9 through 11 for control of line 196 with the exception of the particular arrangement of the inhibitor elements in the respective control circuit function lines and alternate paths. The inhibitors located at the intersections of the various function lines with the bias-off code lines 286 through 295 are so located that current will flow in each function line only upon the occurrence of a specific combination of code signals. The remainder of the time current flows in the alternate paths provided for each function line. Thus, for example, the vertical conductor bias-off line 197 receives its biasing signals from the flip-flop 479 (FIG. 11). The conduction of this flip-flop is controlled by the current flowing through its control inhibitors from either supply line 302 or supply line 303 (FIGS. 9 and 12, respectively), which current is in turn controlled by the coded signals from control computer 270.

In a similar manner supply lines 304 through 307, 312 through 325 and 800 through 831, shown in FIGS. 12, 15, 18, 21, 24, 63, 66, 69, 72, 75, 78, 81, 84 and 87, furnish current to their respective control circuit components. These currents are fed through specified control inhibitors in flip-flops 483, 484, 487 through 493 and 840 through 855, respectively. The selection of which control inhibitors of the flip-flops are to receive these currents is made by the coded signals from computer 270 appearing on lines 286 through 295. The flip-flops, which are shown in FIGS. 14, 17, 20, 23, 26, 65, 68, 71, 74, 77, 80, 82 and 86, when properly activated by signals from the supply lines, will provide biasing signals to bias-off lines 192 through 195, 197 through 210 and 382 through 389 in the same manner that bias-off signals are supplied to line 196 as described above. The particular coded signals needed to control selected ones of the flip-flops are set forth in Table I above.

Considering now the control group associated with flip-flop 476 and including the function line 400, its alternate paths and its redundant components (shown in FIGS. 9, 10 and 11), the utility of the redundant components will be explained. As has been pointed out, the alternate paths provided for the function lines of each control groups are necessary in order that current from the supply line not be blocked in the case where the coded signals supplied by the control computer 270 do not correspond to a particular function line. The redundant components, on the other hand, enable the control group to function properly even in the event of a defective conductor.

To illustrate the principle of redundancy let it be supposed that a break occurs somewhere in the first portion of function line 400, for example, at a point 406. As long as the function set up in line 400 does not appear on the code lines of the control computer, current will flow from the supply line 300 through one or another of the alternate paths 401 through 405 to the common line 426. From line 426, this current will flow through terminal 430 to one of the sets of alternate paths connected to line 434 and 436 (FIG. 11), and thence to ground. If, however, the function set up in line 400 should be applied to the code lines of the control computer, a current will appear on each of lines 287, 289, 291, 293 and 295, inhibiting the flow of current through each of the alternate paths 401 through 405, respectively. In this situation, current would normally flow through function line 400, but, due to the break at point 406, this is impossible. Since the inhibitor elements do not present an open circuit when activated, but only present a more resistive path, the break 406 will force current from supply line 300 to divide and flow through the alternate paths 401 to 405. In the absence of redundant circuitry, this forced flow of current would go directly to ground, and the flip-flop 476 would not be affected. However, when the current that is forced to flow through paths 401 through 405 reaches the common line 426, it is applied to terminals 428 and 430 (FIG. 10).

Terminal 428 is connected to a redundant function line 400′ which traverses the third column of code lines and it is affected by the signals appearing therein in the same manner as the first portion of function line 400. Thus, the appearance of signals corresponding to the function set up in line 400 on the code lines of the control computer will cause the function line 400′ to be activated and to present a nonresistive current path. The sets of alternate paths connected to terminal 430 through line 434 and 436, being identical to the set of alternate paths 401 through 405, present resistive paths to current flowing in line 426. This current will therefore flow through function line 400′ to activate the inhibitor 432 of flip-flop 476. Activation of this inhibitor has the same effect on flip-flop 476 as would the activation of flip-flop 424 by current flowing through function line 400 in the absence of the defect at point 406.

As a further illustration, let it be assumed that a defect occurs in the second or third portions of function line 400. Such a defect might take the form of a break at point 407 of FIG. 10. The appearance of signals on the code lines of the control computer which correspond to the function set up in function line 400 unblocks the first portion of line 400, allowing current from supply line 300 to flow therethrough. The break at 407 will prevent this current from flowing through either the second or the third portion of function line 400, forcing it to flow through one or more of the alternate paths 401′, 402′, 403′, 404′ or 405′. After passing through the alternate paths, the current again reaches line 426 and from there flows through terminal 428, function line 400′ and inhibitor 432. As before, the activation of inhibitor 432 produces the desired action on flip-flop 476.

The redundancy provided by the system mentioned also makes provision for the case where the defect in a line is caused by a defective inhibitor element. For example, suppose that one of the inhibitor elements in the function line 400 should be come defective and fail to inhibit. If this should happen, that inhibitor would be effectively removed from the circuit, allowing the function line 400 to become unblocked for more than one combination of signals on the code lines. Thus, for example, if the inhibitor 413 was shorted out of the circuit, signals appearing on code line 294 would no longer be effective in blocking current flow through function line 400. To prevent such spurious current flow in junction line 400, the second portion of the function line duplicates the first portion. Thus, if inhibitor 413 should become shorted out in the first portion, the corresponding inhibitor in the second portion will take its place. Thus, if a current on code line 294 fails to block the first portion of function line 400, it will be able to do so in the second portion of function line 400. The spurious current flow in the first portion of function line 400 will then be diverted to the alternate paths 401' through 405' and will flow from there to ground.

As a final example it will be assumed that a break occurs in the line 426 at the point 414 (FIG. 10). A break at this point prevents current from flowing through any of the alternate paths 401 to 405. Current from the supply line must then flow through the first portion of the function line 400 even though this line may be inhibited by signals applied to the code lines of the computer. Since the alternate paths 401' to 405' are duplicates of the alternate paths 401 to 405, one of these paths will be unblocked whenever the function line 400 is inhibited. The current forced through the first portion of function line 400 by the break in line 426 will flow through this unblocked line rather than the inhibited second portion of function line 400. After passing through the unblocked line, the current will flow through the terminal 432 to ground. In this manner the break at 414 is bypassed and the control circuit remains operable.

Since each of the control groups in the control system includes the same type of redundancy as that described above, the system as a whole is very reliable in its operation. It should also be noted that although the control computer is shown as having only one set of code lines, this is only for the purpose of simplifying the illustration. In practice, one or two duplicates of each code line may be provided in order to insure the reliability of the code line operation.

In the following description of the insertion of the various general purpose spares in the active circuit and of the setting of the individual cells of these spares it will be assumed that no faults appear in any of the control groups and that the various flip-flops are operated by the currents flowing directly from the supply lines to the flip-flop inhibitors through the function lines. This is done to simplify the explanation of the operation of the device and it should be understood that any of the control currents could be directed through the various redundant current paths provided by the system.

Figure 24:
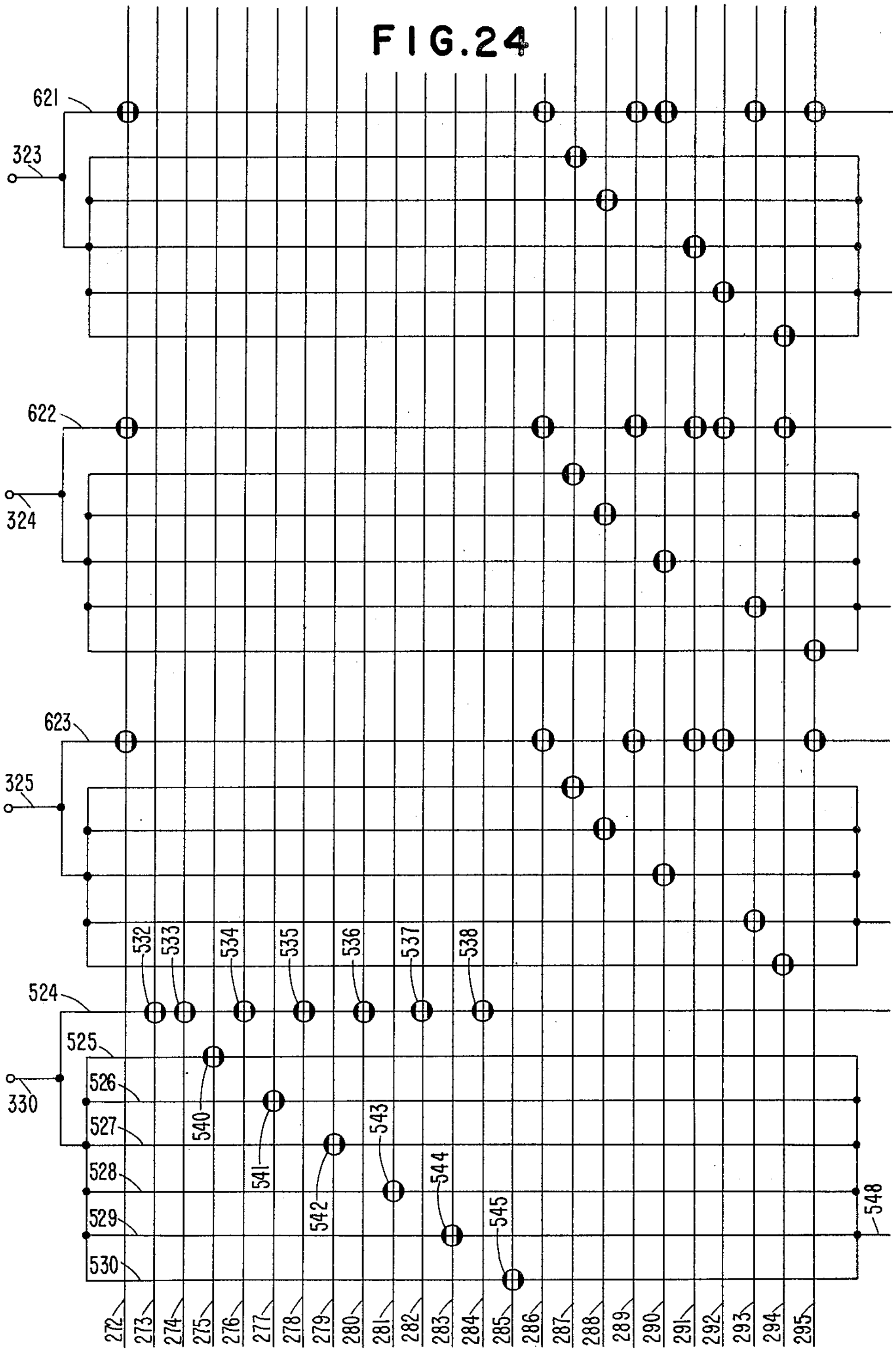
Figure 25:
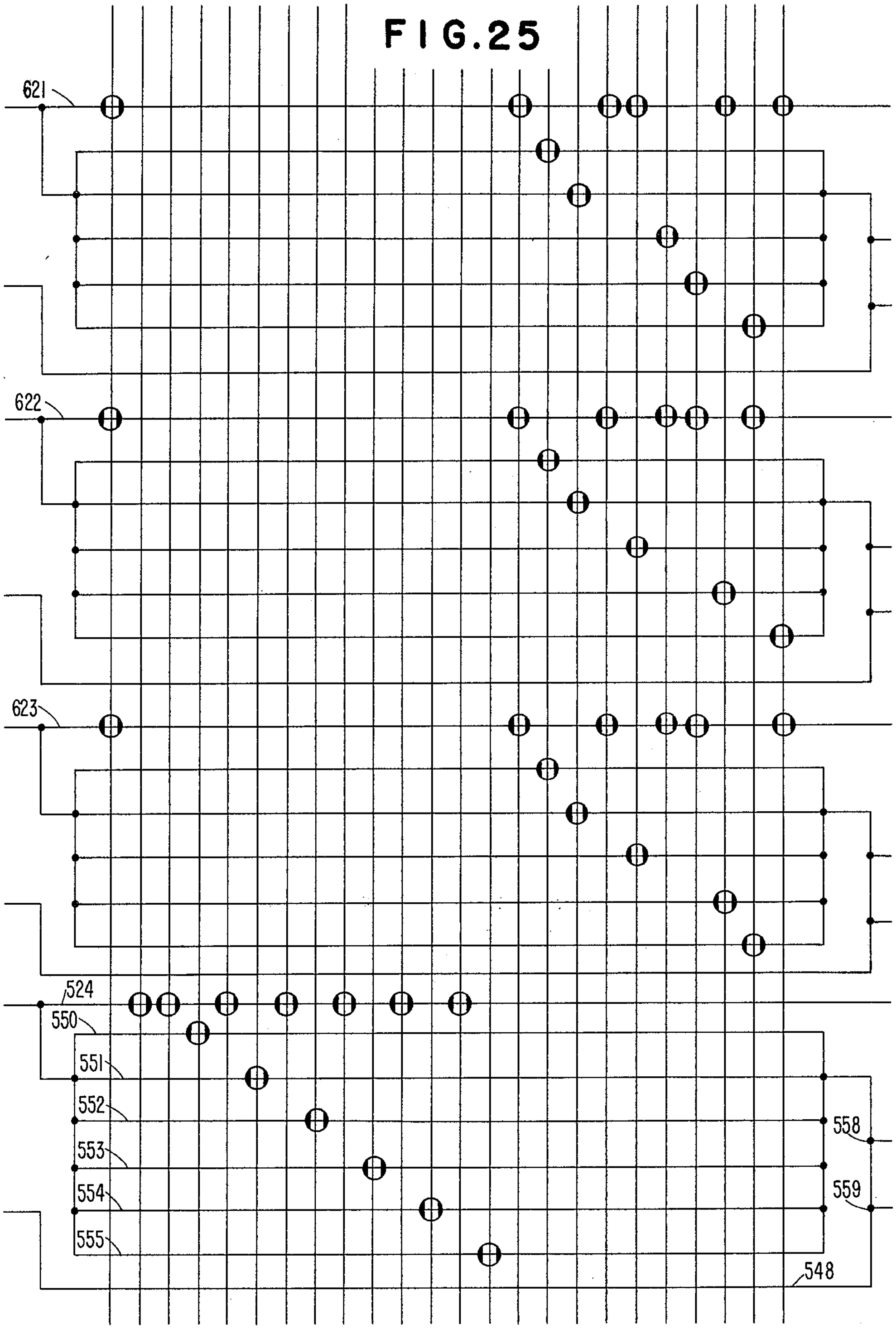
Figure 26:
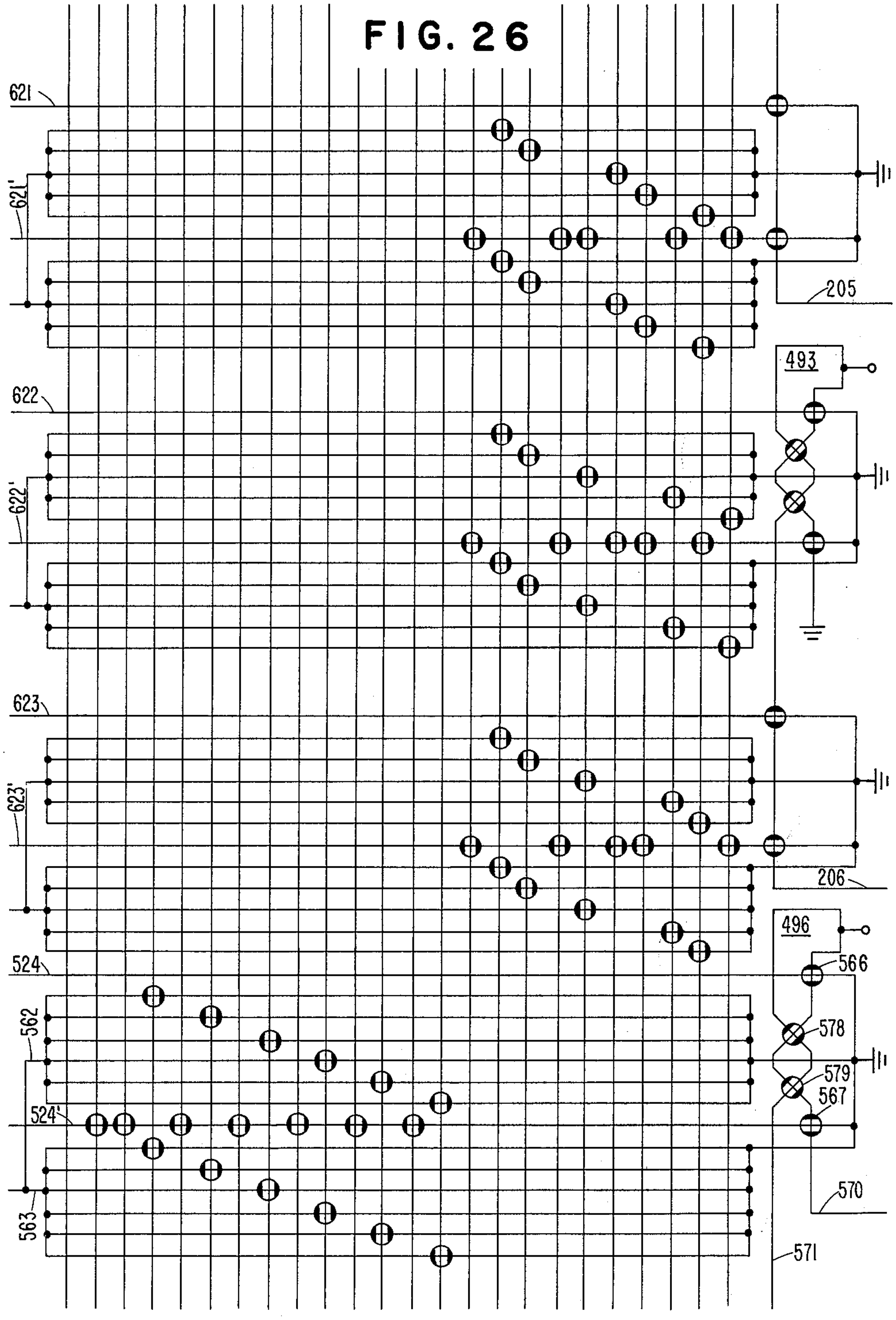

Referring now to FIGS. 24 through 26, a supply line 330 is shown which feeds current from a source (not shown) to a function line 524, a first portion of which is shown in FIG. 24. The first portion of function line 524 traverses the code lines 272 through 295 in the first column formed by these code lines; the second portion of one function line traverses the second column of code lines (FIG. 25); and the third portion of function line 524 traverses the third column of the code lines (FIG. 26). The first portion of line 524 includes an inhibitor on one of the horizontal or vertical select lines 272 and 273, and also includes an inhibitor on one line of each of the pairs of "set spares" code lines. The set spare code lines are indicated in FIG. 24 by the numerals 274 through 285. The particular intersections of function line 524 with set spare lines 274 through 285 at which inhibitors are located are determined by the code chosen for that particular function line.

As may be seen from Table I, the code which energizes the function line 524 is represented by a one on the vertical or horizontal selection pair and zeros on each of the six pairs of set spare lines. Thus inhibitors 532 through 538, respectively, are placed at the intersections of code lines 273, 274, 276, 278, 280, 282 and 284 with function line 524. With this arrangement, any variation from the code selected for line 524 will result in a blocking of current flow through this function line. When current is thus prevented from flowing along function line 524 it is diverted to one of the alternate path 525 through 530. Each alternate path includes a single inhibitor which is located at the intersection of its associated path with one of those spare set code lines which does not traverse an inhibitor at function line 524. Thus, inhibitor 540 is located at the junction of alternate path 525 with code line 275; inhibitor 541 is located at the junction of alternate path 526 with code line 277; inhibitor 542 is located at the junction of alternate path 527 with code line 279; inhibitor 543 is located at the junction of alternate path 528 with code line 281; inhibitor 544 is located at the junction of alternate path 529 with code line 283; and inhibitor 545 is located at the junction of alternate path 530 with code line 285. When the function code selected for function line 524 appears on code lines 274 through 285, each of lines 525 through 530 is inhibited so that all the current from supply line 330 will flow through function line 524. The six alternate paths 525 through 530 terminate in a common line 548.

The second portion of line 524, shown in FIG. 25 is a duplicate of the first portion and includes inhibitors at the intersections of the code lines 273, 274, 276, 278, 280, 282 and 284. The second portion of line 524 also has six alternate paths, indicated by the numerals 550 through 555, which are identical to corresponding ones of alternate paths 525 through 530. The alternate paths 550 through 555 terminate in a common line which is connected to line 548. Line 548 includes two output terminals indicated at 558 and 559.

The third portion of line 524 traverses the third column formed by the code lines 272 through 295 and includes only the inhibitor 566 which is included in one branch of a flip-flop 496. Function line 524 is terminated at a common ground point. Connected to the terminal 558 of line 548 is a second function line 525' which is a duplicate of the first portion of function line 524. This line, after traversing the code lines, contains inhibitor 567 located in branch 570 of flip-flop 496. Connected to terminal 559 by way of lines 562 and 563, respectively, are two sets of alternate paths, each set being identical to the set containing alternate paths 525 through 530 shown in FIG. 24. These two sets are both terminated at common ground point.

Figure 27:
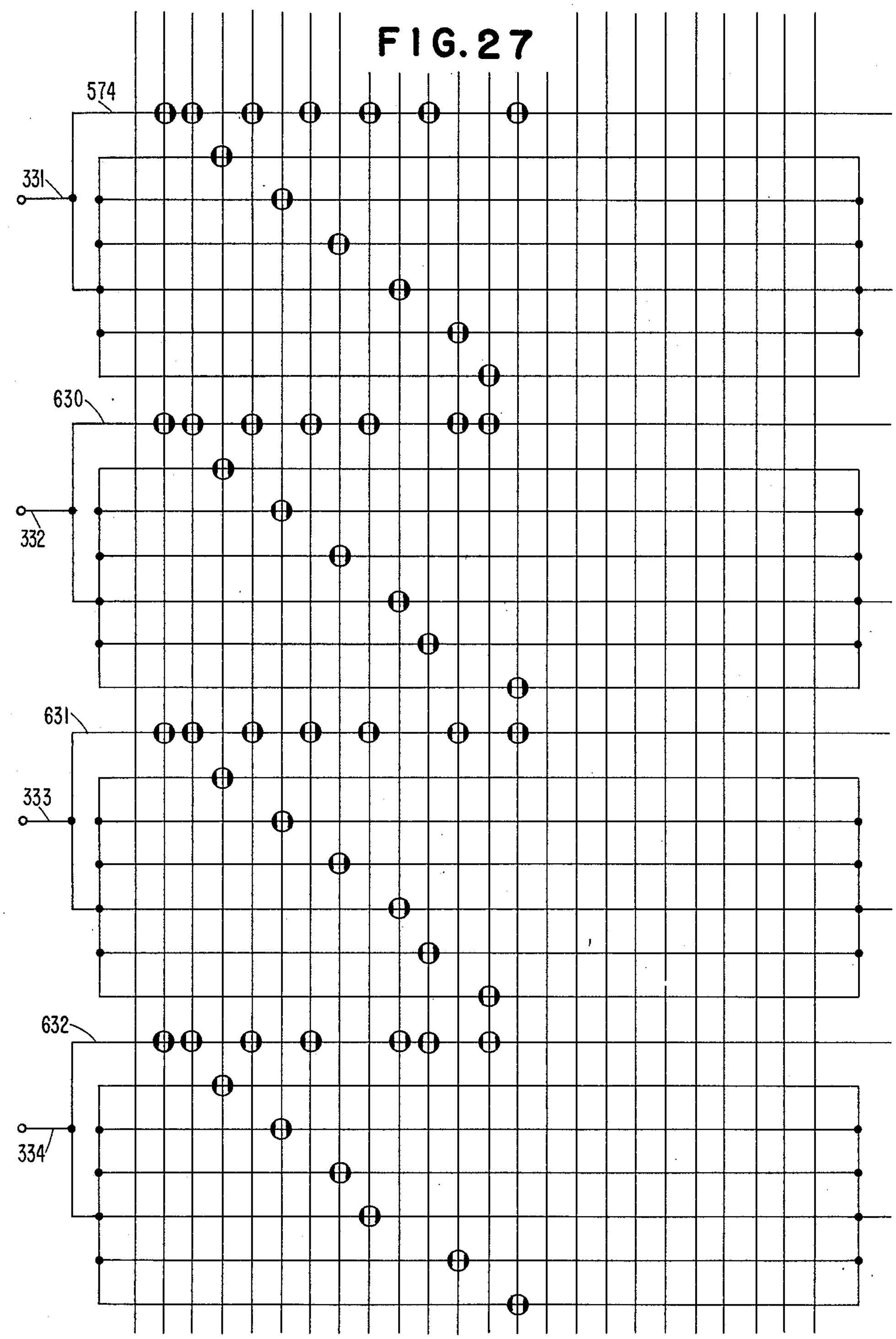
Figure 28:
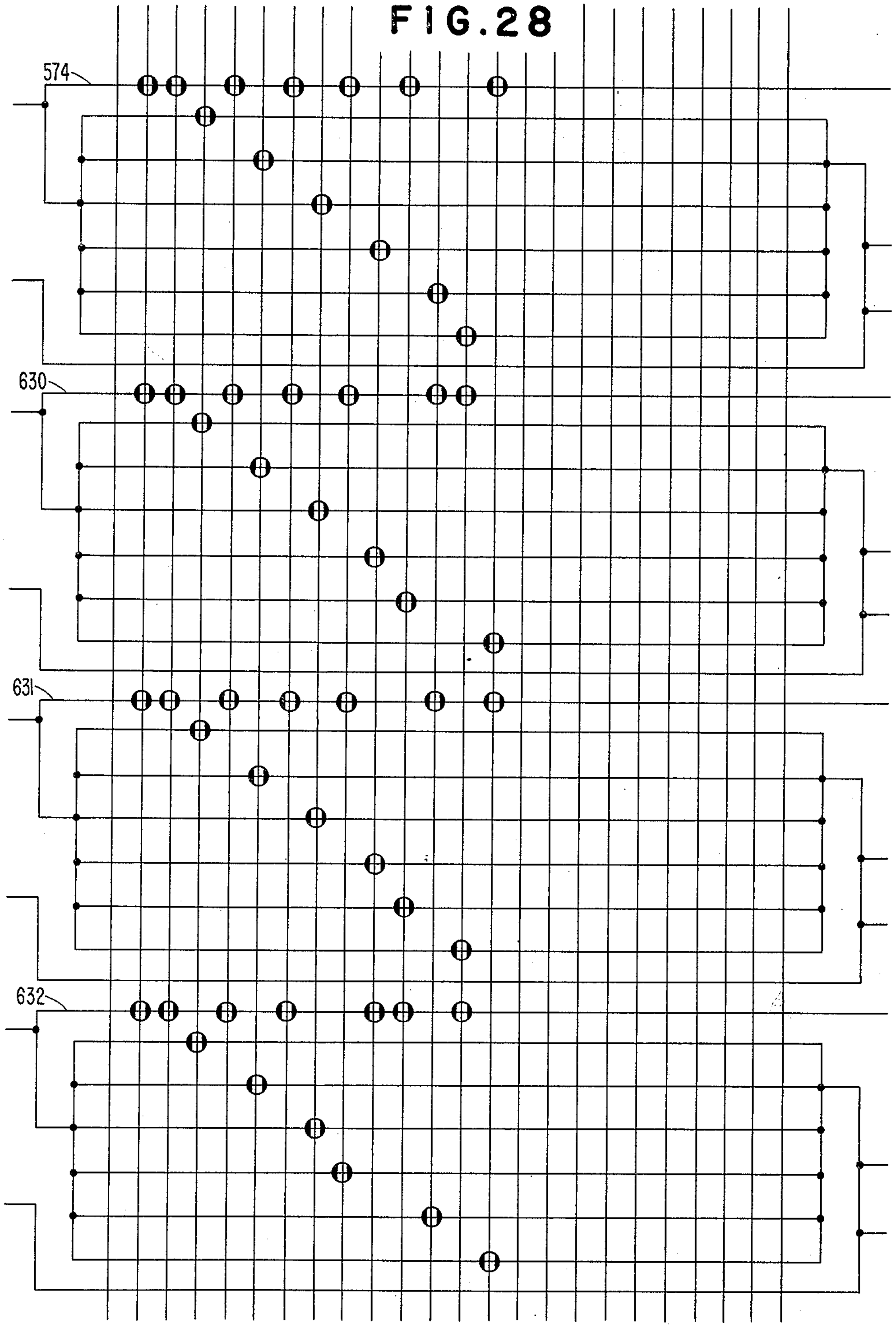
Figure 29:
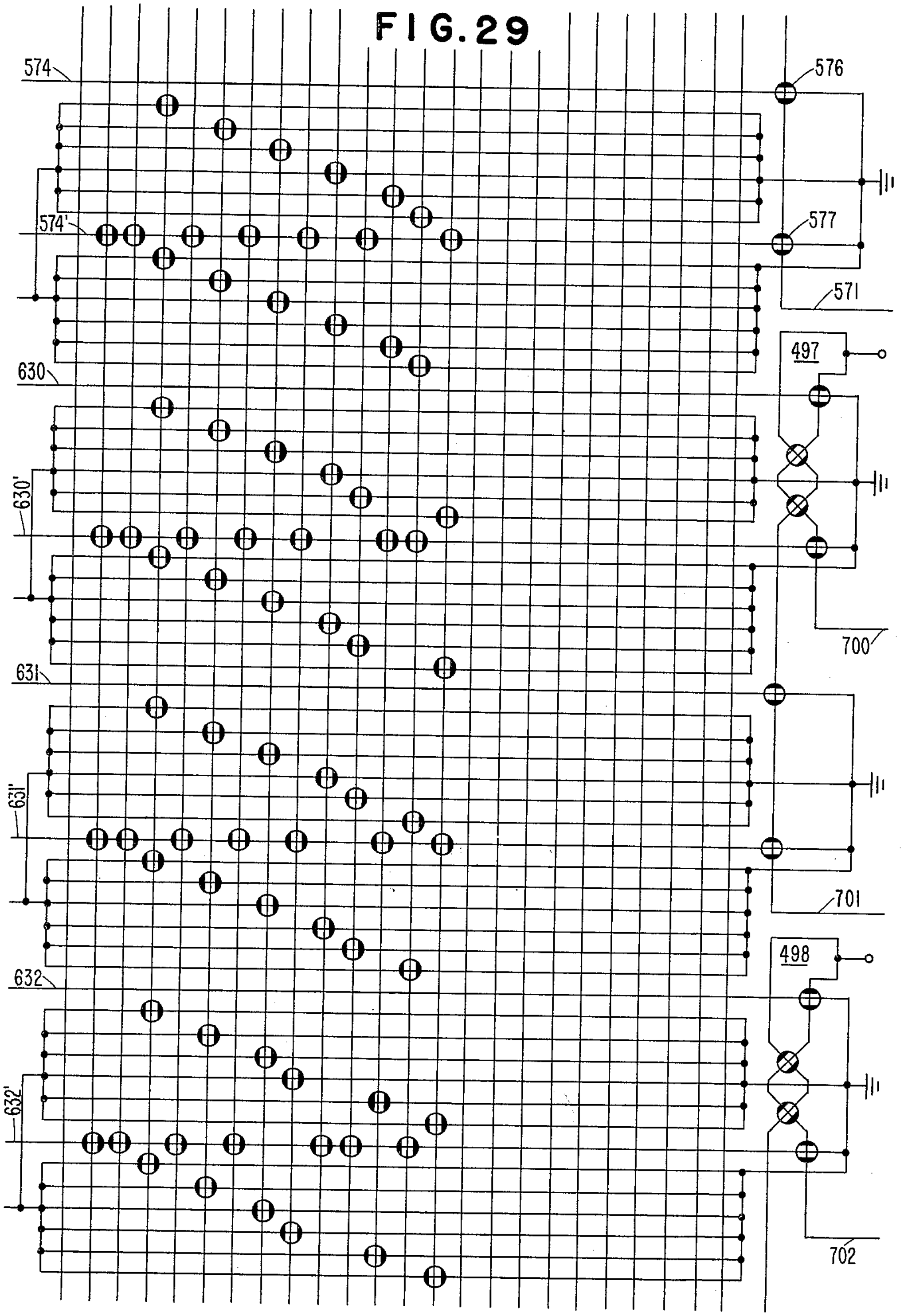

FIGS. 27, 28 and 29 include a second group of control components which receive current from a supply line 331. The number of components supplied by this line may be broken down into three portions, the first portion being shown in FIG. 27, the second portion being shown in FIG. 28, and the third portion in FIG. 29. These portions correspond to the portions of the group of components connected to the supply line 330 shown in FIGS. 24, 25, and 26, respectively. The portions shown in FIGS. 24 and 27 correspond to each other and are identical to each other with the exception of the particular location of the inhibitors on the function line and on the alternate paths. The locations of the inhibitors are determined by the function selected for the particular function line, and therefore the positions of the inhibitors will vary from line to line in accordance with functions selected for those lines. The second portion of the group of components supplied by line 331 and including function line 574 is shown in FIG. 28. This portion corresponds to the second portion of the group of components connected to supply line 330 and shown in FIG. 26, differing therefrom only in the particular location of inhibitor elements.

The third portions of these two groups are shown in FIGS. 26 and 29. These portions again correspond to each other with the exception of the particular location of the inhibitor elements. The portion shown in FIG. 29 includes function lines 574 and 574' which after traversing the third column of the code lines 272 through 295 include inhibitor elements 576 and 577, respectively, and are connected to ground. Inhibitors 576 and 577 are located at the intersections of lines 574 and 574' with branch 571 of flop-flop 496. These inhibitors are so arranged that current flowing through either of the two function lines will block current flow in branch 571. Similarly, current flowing in either of function lines 524 or 524' will cause inhibitors 566 and 567, respectively, to block current flow in branch 570 of flip-flop 496. By choosing the proper coded output from computer 270, current from either source 330 or 331 may be passed to the control inhibitors of flip-flop 496. If current passes through either control inhibitor 566 or control inhibitor 567, the flip-flop 496 will provide an output from branch 571. Due to the presence of the holding inhibitor 579, current flow will continue in branch 571 once it is established therein. Similarly, current flow in either of the function lines 574 and 574' will cause control inhibitors 576 and 577 to block current flow through branch 571. This will established current flow in branch 570, which current will be maintained therein by means of the inhibitor 578.

Lines 570 and 571, whose outputs are controlled by the set spare lines of the control computer 270, are connected to the first vertical spare set lines indicated in FIGS. 6, 7 and 8. As shown in FIG. 6 lines 570 and 571 activate the control inhibitors 582 and 583, respectively, of the cell 158 located in the first vertical spare 114. A signal appearing on branch 570 of flip-flop 496 will cause a current flow which will activate the control inhibitor 582, preventing current from flowing through the corresponding branch of cell 158. Since the main inhibitor 584 of cell 158 is located in this branch, the activation of inhibitor 582 will prevent the activation of the main inhibitor 584, thus maintaining it in an off condition. On the other hand, the appearance of a signal on branch 571 of flip-flop 496 will activate the control inhibitor 583, causing the current path in spare 114 to include the main inhibitor 584. If the vertical spare 114 is substituted for either of lines 52 and 55, the main inhibitor 584 will be included in the current path, while if the vertical spare 114 is substituted for either of lines 53 or 54, the inhibitor will be bypassed.

In a similar manner each of the supply lines 332 through 381 may be selected by the control computer 270 to supply current to the control inhibitors of flip-flops 497 through 521, respectively. The resulting outputs from these flip-flops determine whether the main inhibitors of the various cells of the vertical and horizontal spare 114, 116, 102 and 104 are to be turned on or off. Thus, by choosing the output signals appearing on lines 272 through 285 of the control computer 270 in accordance with the code set up in Table I, each cell may be set up individually to the desired condition. The flip-flops 496 through 521 will remain in the condition to which they are set even after the control signals from computer 270 have come to an end.

Cells 134 through 137 of the first horizontal spare 102 are set up by control signals derived from flip-flops 514 through 517, respectively, by means of control lines 246 through 253. The state of conduction of each of the flip-flops 514 through 517 is determined by the computer 270 which designates which ones of the function lines 664 through 671 are to conduct from their associated supply lines 366 through 373, respectively, to the control inhibitors of their respective flip-flops. These flip-flops and their associated function lines appear in FIGS. 51 through 59.

Similarly, the cells 140 through 143 of the second horizontal spare 104 are controlled by signals from flip-flops 518 through 521, respectively, through lines 736 through 743 to the common ground point 254. These flip-flops, wich appear in FIGS. 57 through 65, are controlled by currents in supply lines 374 to 381 though selected ones of their respective function lines 672 to 679. Again, the selection of those function lines through which current is to flow is made by the computer 270 and is effected by coded signals appearing on the "set spare" lines. Cells 158 through 166 of the first vertical spare 114 are controlled by means of signals derived from flip-flops 496 through 504, respectively, the signals appearing on the lines 570, 571 and 700 through 715. The state of conduction of flip-flops 496 through 504 is determined by means of currents flowing in selected ones of the function lines 524, 574 and 630 through 645. The respective function lines receive current from the supply lines 330 through 347, each function line with its associated supply line and alternate paths forming a control group for its associated flip-flop. The control groups for flip-flops 496 through 504 are illustrated in FIGS. 24 through 41. Finally, FIGS. 39 through 53 show the control circuitry for flip-flops 505 through 513, which provide control signals to the cells 258 through 266, respectively, of the second vertical spare 116. The signals from these flip-flops are supplied to their respective cells by way of control lines 716 through 733. The flip-flops are controlled by currents flowing from supply lines 348 to 365 through selected ones of the function lines 646 to 663, respectively. Control lines 570, 571 and 700 to 733 are each connected to a common ground point 254 after having traversed their respective control inhibitors.

Having set forth the structure of the rectangular array with its spares and their associated control circuitry, the operation of the overall system will now be described. This operation will be set forth with reference to specific examples. Returning now to the array 50 shown in FIG. 5, it will be recalled that the vertical conductors 52 through 55 carry signals representing the variables $a$ and $b$ of the two functions $f_1$ and $f_2$, $f_1$ appearing on output line 66, $\overline{f_1}$ appearing on output line 68, $f_2$ appearing on output 70 and $\overline{f_2}$ appearing on output line 72. As long as the conductors 52 through 55 and 58 through 64 of the array remain operable, no problem arises. However, should a fault appear in one of these conductors, the array will no longer operate properly. As has been mentioned above, such a fault may occur during the manufacture of the array or during the insertion of the array into a system. When such a fault occurs in the array the conductor in which the fault appears may be replaced by one of the spares 102, 104, 114 or 116.

When the system is initially put into operation, sources of continuous current are applied to each of the supply lines 300 to 307, 312 to 325, 330 through 381, and 800 through 831 and to each of the flip-flops 476, 479, 483, 484, 487 through 493, 496 through 521 and 840 through 855. The computer 270 is then sequenced to provide a series of coded output signals which will send each of the biasing flip-flops 476, 479, 483, 484, 487 through 493 and 840 through 855 in turn to the desired initial condition. Thus, each of flip-flops 476, 479, 483, 484, and 487 through 493 is set to its off condition to prevent signals from appearing on lines 196 through 206. When no signals appear on lines 196 through 206, vertical conductors 52 through 55 and horizontal conductors 58 through 64 are placed in the active circuit of array 50. Each of the flip-flops 840 through 855 is set to its on condition, causing biasing signals to appear on the bias-off lines 192 through 195, 207 through 210 and 382 through 389, which signals activate inhibitors 150 through 157, 172 through 179 and 172' through 179'. The activation of these inhibitors blocks the flow of current through the horizontal and vertical spares 102, 104, 114 and 116, removing them from the active circuit of array 50. The remainder of the flip-flops; that is, flip-flops 496 through 521, initially have no effect on the active circuitry.

It will now be assumed that by means of an error detecting system (not shown) either a break or short circuit is discovered in the horizontal conductor 58 of the array 50, rendering that conductor useless. The control computer 270 selects one of the horizontal spares 102 or 104 to replace that conductor. After one of these spares is selected it is set up to correspond electrically with the line 58. Assuming the line 102 to have been selected, the setting up occurs in the following manner. Since the line 58 contains inhibitors at intersections with vertical conductors 52 and 55, the main inhibitors 234 and 243 of cells 134 and 137, respectively, of spare 102 must be included in the path of current flowing through line 102. Also, since no inhibitors appear at the junctions of 58 with conductors 53 and 54 the main inhibitors 237 and 240 are of cells 135 and 136, respectively, must be excluded from the current path.

Figure 51:
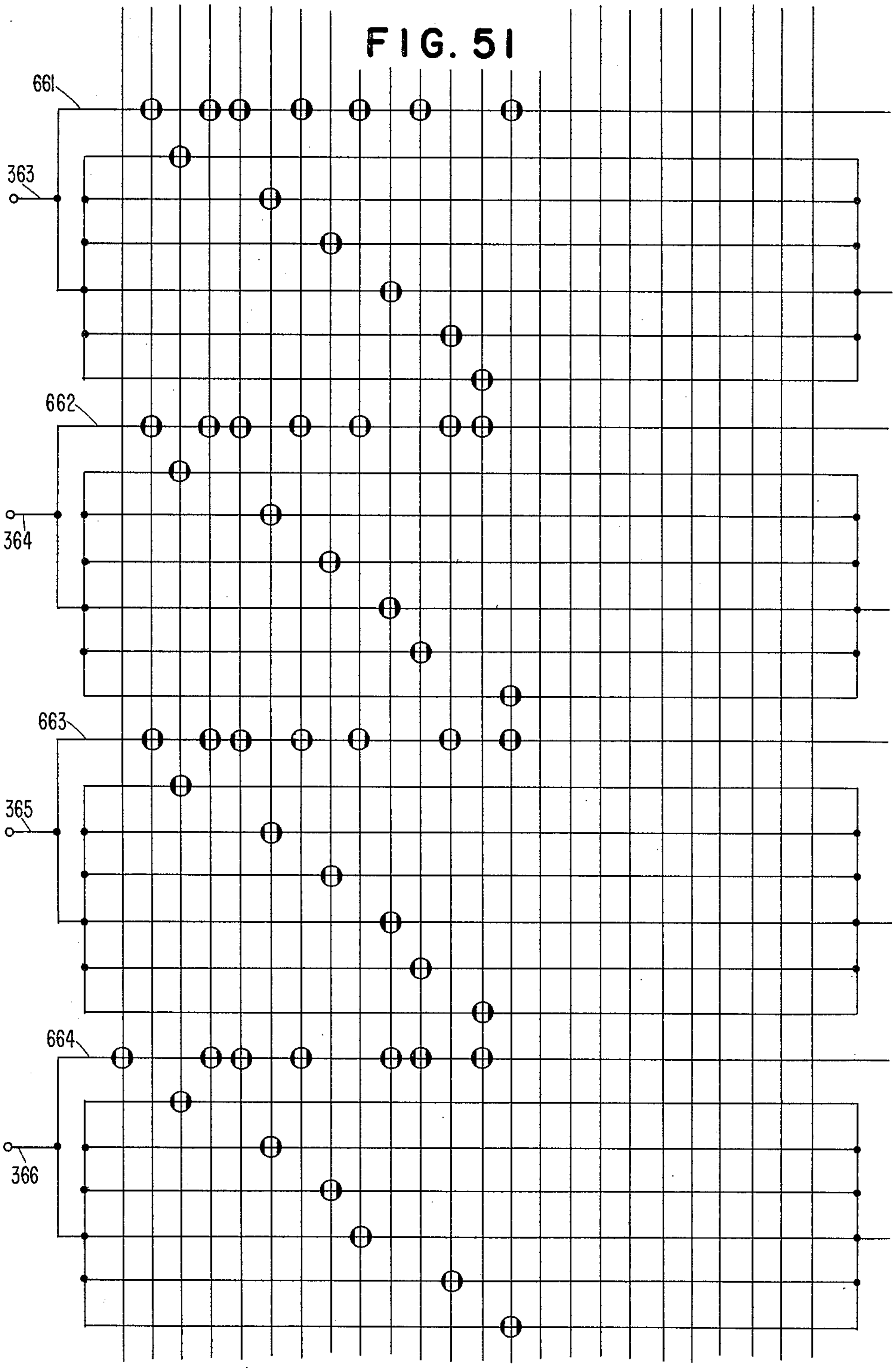
Figure 52:
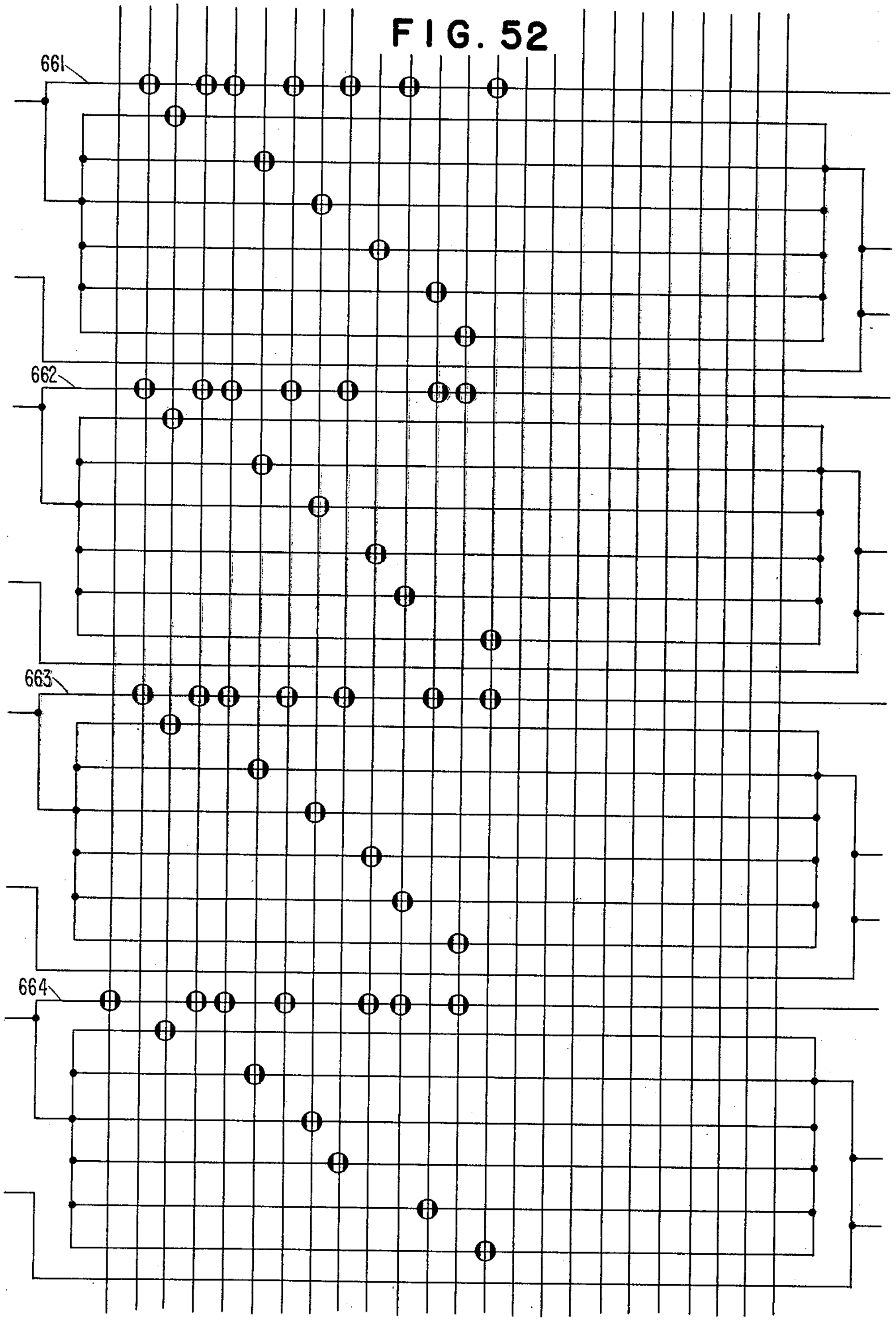
Figure 53:
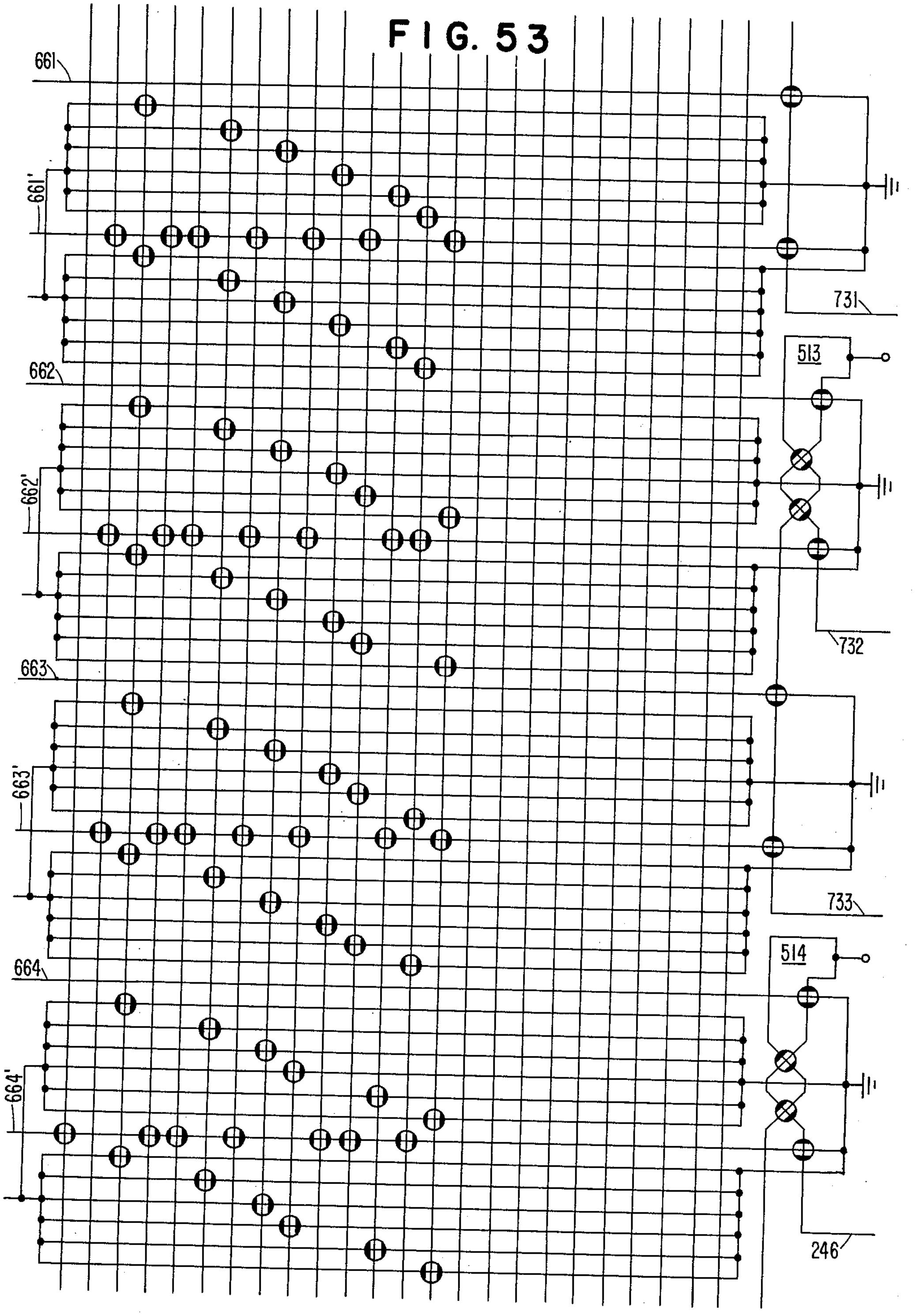
Figure 54:
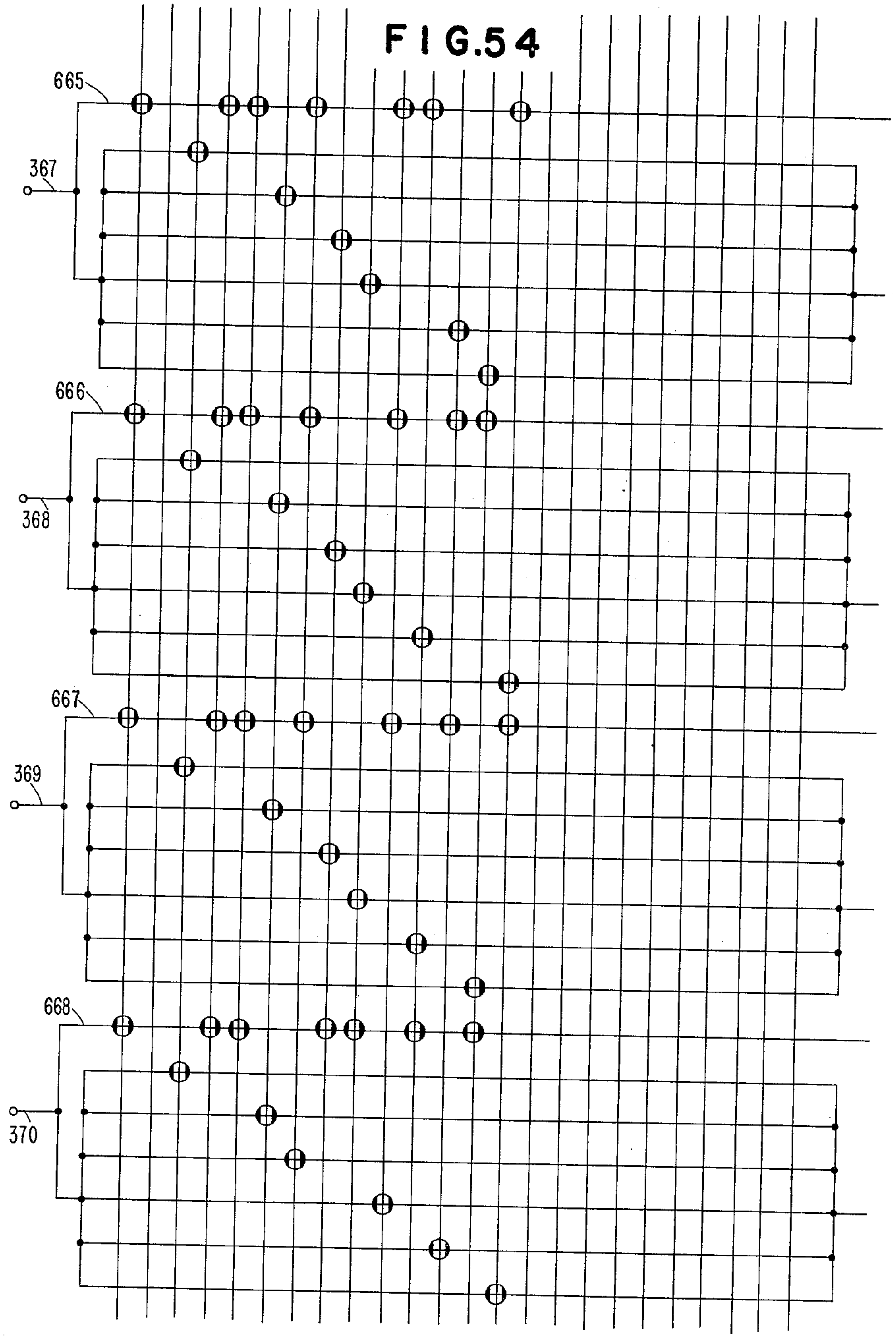
Figure 55:
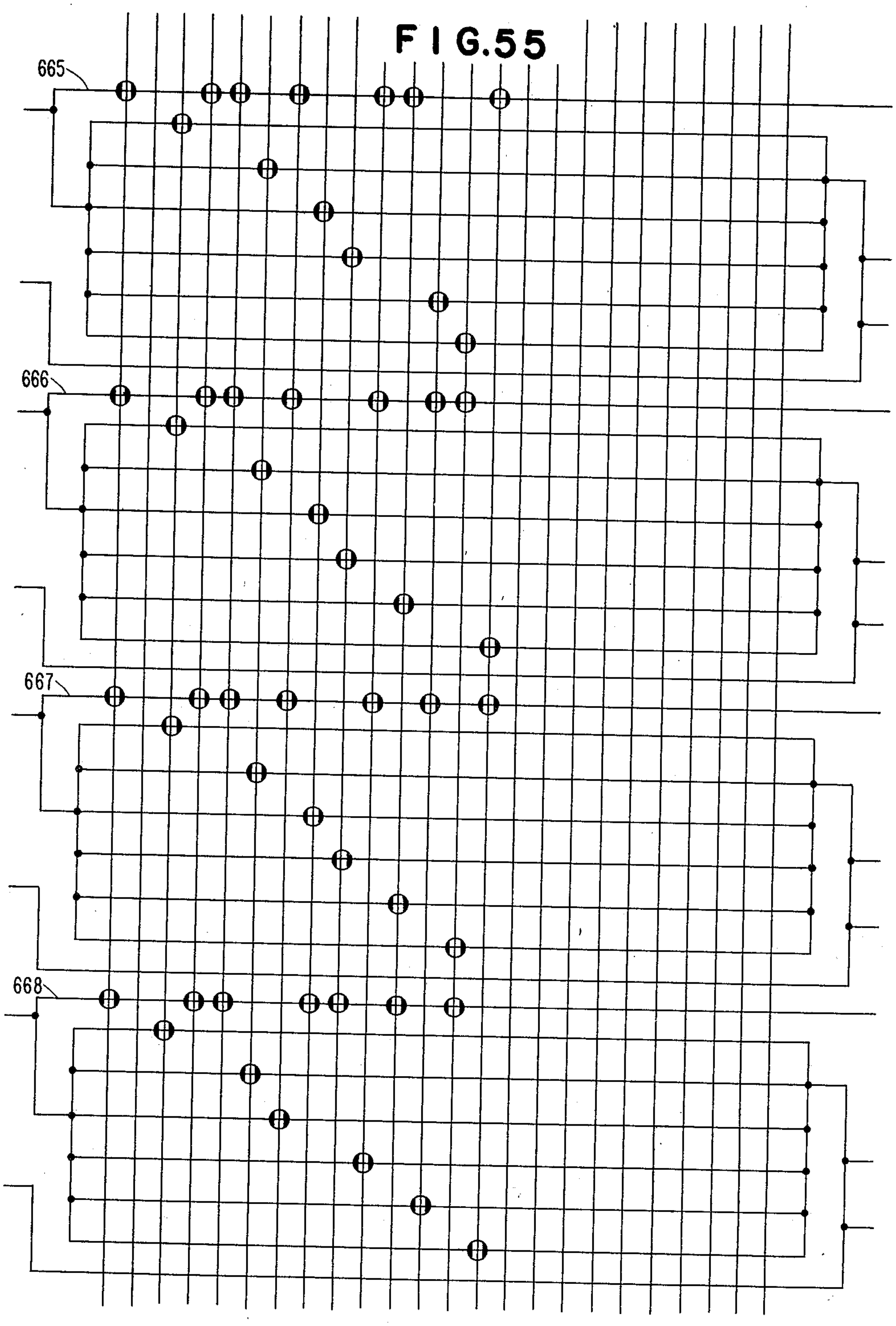
Figure 56:
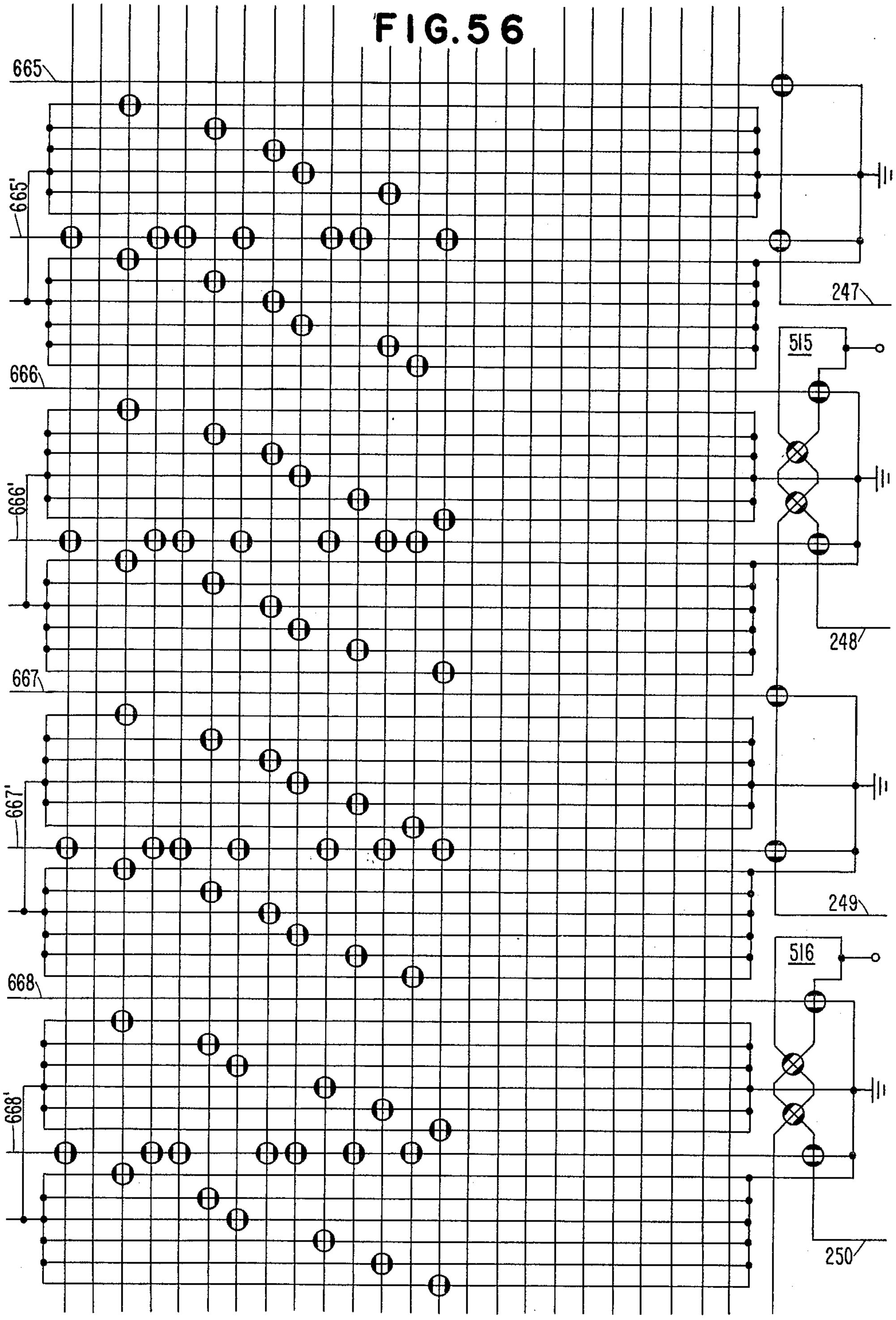

To insert the main inhibitor of cell 134 in the current path, the control inhibitor 233 must be activated to prevent current from flowing through the lower branch of the cell. To activate the inhibitor 233, a spare set signal must be applied to line 247. This line originates in flip-flop 514 which is shown in FIGS. 53 and 56. The control circuits for this flip-flop include the function line 664, which is fed by current from the supply line 366 and function line 665 which is fed by current from the supply line 367. The control circuits are shown in FIGS. 51 through 56. To obtain an output current on line 247 of the flip-flop 514 it is necessary to provide inhibit signals on function line 264, which signals will serve to block current from flowing in line 246 of flip-flop 514. To accomplish this, the computer 270 provides a coded output signal in accordance with that set out in Table I for the control of cell 134. The occurrence of these signals on the code lines cause a flip-flop 514 to be set as desired. The coded signals representing the function of function line 665 which is shown in FIGS. 54 through 56 do not appear on the code lines since such a combination of signals would allow current to pass from supply line 367 through the function line 665 to the control inhibitor in line 247. This current would prevent current from flowing in line 247 and would cause the output of flip-flop 514 to switch to line 246. Such a switch would only be required in the event that it was desired to remove the main inhibitor 234 from the current path of the spare 102.

The main inhibitor 237 of cell 135 is not to appear in spare 102. To accomplish this a signal is applied to the set line 248, causing the control inhibitor 235 in the upper branch of the cell to block current flow through that branch. Set line 248 originates at the flip-flop 515 (FIG. 56) and current is directed through it by applying signals to the function line 667. These signals, which originate at supply line 369, prevent current from flowing in line 249 of flip-flop 515, forcing the current flow to be established in line 248. Again, to obtain current flow in line 667 control signals represented by the code of Table I are applied to the set spare lines of the computer 270. Since the code represented by the function line 666 has not been applied to the code lines, no current will pass through the line 666 and thus current will continue to flow in set line 248.

The setting up of cell 136 is similar to that of cell 135, a current being required on line 250 to inhibit the upper branch of cell 136 and force the current flowing through spare 102 to bypass main inhibitor 240. Set line 250 originates in flip-flop 516 shown in FIGS. 56 and 59. To provide current flow in line 250 as desired, the computer 270 must provide signals on the set spare code lines which signals are representative of the function of function line 669. This function line, which appears in FIGS. 57 through 59 will then pass current from the supply line 371 to the control inhibitor in the set spare line 251, impeding the flow of current therethrough and causing the output of flip-flop 516 to appear on set line 250.

As was the case with cell 134, it is desired that the main inhibitor 243 of cell 137 be included in the current path of cell 102. This is accomplished by providing a signal on set spare line 253 which will activate inhibitor 242, and impede the flow through the lower branch of cell 137. To obtain current flow through line 253, coded output signals are provided by computer 270 which correspond to the function of function line 670. This will allow current to flow from the supply line 372 to a control inhibitor in line 252 of flip-flop 517. The activation of this inhibitor by current flow through function line 670 will prevent the appearance of the signal on the line 252 and will cause the current output of flip-flop 517 to flow through line 253, as desired.

The computer 270 then sends out on the horizontal or vertical select lines 272 and 273 and on the bias-off code lines 286 to 295 the signals necessary to remove conductor 58 from the active circuit of array 50. The signals necessary for this are indicated on Table I as being the control signals on code lines 273, 287, 289, 291, 293 and 295, a signal on each of these lines representing a binary zero. Since this particular combination of coded signals represents the function established by the inhibitors located on function line 610 (FIGS. 15, 16 and 17), current will flow from supply line 312 through the function line 610, switching the current flow of the flip-flop 487 to the branch line 200. The current thus directed to line 200 will continue to flow therein until such time as one of the control inhibitors in line 200 is activated to switch the current flow out of line 200. The signal now appearing on line 200 traverses inhibitors 212 and 222 which are located at the junctions of line 200 with horizontal conductor 58. The activation of inhibitors 212 and 222 blocks the flow of current through conductor 58 and thus removes it from the active circuit of the array 50.

Upon completion of the setting of cells 134 through 137 and the biasing off of defective conductor 58 the biasing off signal being applied to line 385 is removed, deactivating the inhibitors 175 and 175′ and placing the spare 102 in the active circuit. The signal is removed from line 385 by providing signals on the bias-off code lines of computer 270 which corresponds to the function setup in function line 773, shown in FIGS. 81 through 83. The appearance of such signals allow current to flow from supply line 823 through function line 773 to an inhibitor included in the bias line 385, activating that inhibitor. The activation of this inhibitor blocks further current flow through line 385 and causes flip-flop 851 (FIG. 83) to start conducting through its other branch. When this has been done the horizontal spare 102 takes the place of horizontal conductor 58 and duplicates it exactly. Thus, current from the $f_1$ driver will flow through input line 74, through connecting line 108 and inhibitor 175, through the upper branch of cell 134 (when there is no signal on vertical line 52) through the lower branch of cell 135, through the lower branch of cell 136, through the upper branch of cell 137 (when there is no current flowing in vertical line 55), across cells 165 and 265 of vertical spares 114 and 116, respectively, through inhibitor 175′ and connecting line 118 to the $f_1$ output line 66.

It will now be assumed that, after spare 102 has replaced line 58, a defect is discovered in vertical line 55. In order to maintain the operation of array 50 the defective line is replaced by one of the vertical spares, for example spare 114. The procedure to be followed in substituting this spare for the vertical line 55 is similar to the procedure followed in replacing horizontal line 58.

Before vertical spare 114 can be substituted for conductor 55, the various cells of the spare must be properly set up. As may be seen from the array 50 the vertical line 55 includes inhibitors at its junctions with lines 58, 61 and 62. However, since line 58 has been removed from the circuit and replaced by the spare 102, it is the inhibitor at the junction of conductor 55 with spare 102 that must be replaced instead. Therefore, cell 158, which is at the junction of spare 114 with horizontal line 58 need not be set in any particular manner so long as current can flow through either the left-hand or the right-hand branch. The control inhibitors 582 and 583 which appear in respective branches of cell 158 are controlled by set signals appearing on lines 570 and 571, respectively. These set lines originate in flip-flop 496, shown in FIG. 26. This flip-flop is controlled by function lines 524 and 574, which appear in FIGS. 24 through 29. Since this flip-flop had no effect on the original conductors used in the array 50, it was not set to any particular condition at the start of the operation of the system. Thus, the current from flip-flop 496 is flowing through either line 570 or line 571, but not both. If the current flow has established itself in line 570, the right-hand side of cell 158 will inhibit current flow, while if current has established itself in line 571 the left-hand side of cell 158 will be inhibited. In either event, only one side of the cell will block the flow of current and thus there will be a current path available through cell 158.

Cell 159 of spare 114 forms an intersection with horizontal line 59. Since no inhibitor appears at the junction of conductor 55 with conductor 59, the main inhibitor of cell 159 is to be bypassed. This is accomplished by applying a signal only to line 700 of the set lines 700 and 701 which lead to the control inhibitors in the right and left-hand branches, respectively, of cell 159. The vertical spare set line 700 originates at flip-flop 497 which is controlled by the function lines 630 and 631, appearing in FIGS. 27 to 29. To provide an output on line 700, an activating signal must pe applied to the inhibitor included in line 701. To accomplish this the function line 631 is made conductive by the application of signals to the set spare code lines of control computer 270. These signals correspond to the function set up in function line 631 as shown in Table I. Current may then flow from supply line 333 through function line 631 to activate the inhibitor in line 701. Since signals corresponding to the function set up in line 630 are not provided by the control computer 270, current from supply line 332 must pass through an alternate path to ground. The signal appearing on line 700 causes the main inhibitor of cell 159 to be bypassed.

Figure 30:
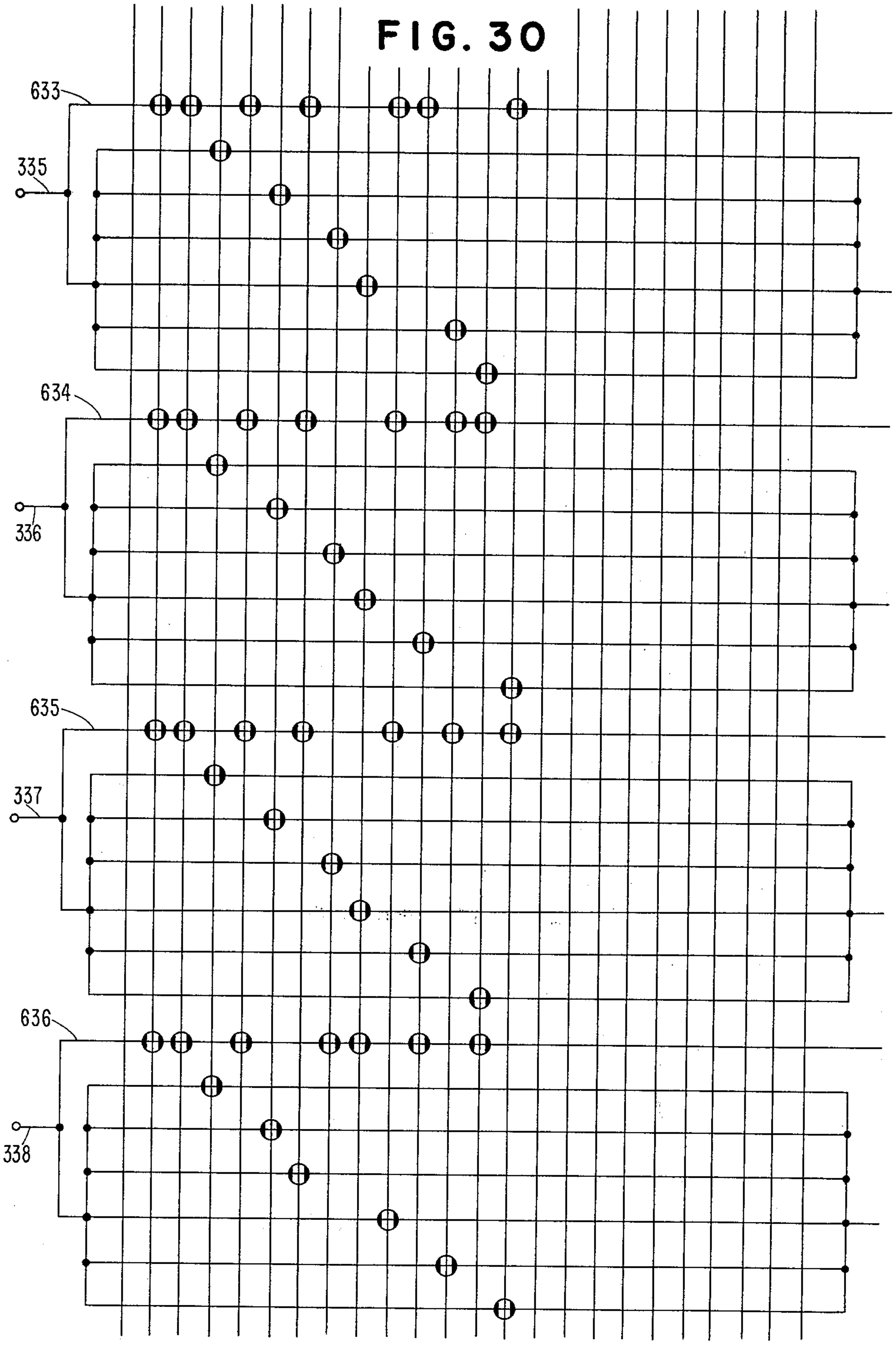
Figure 31:
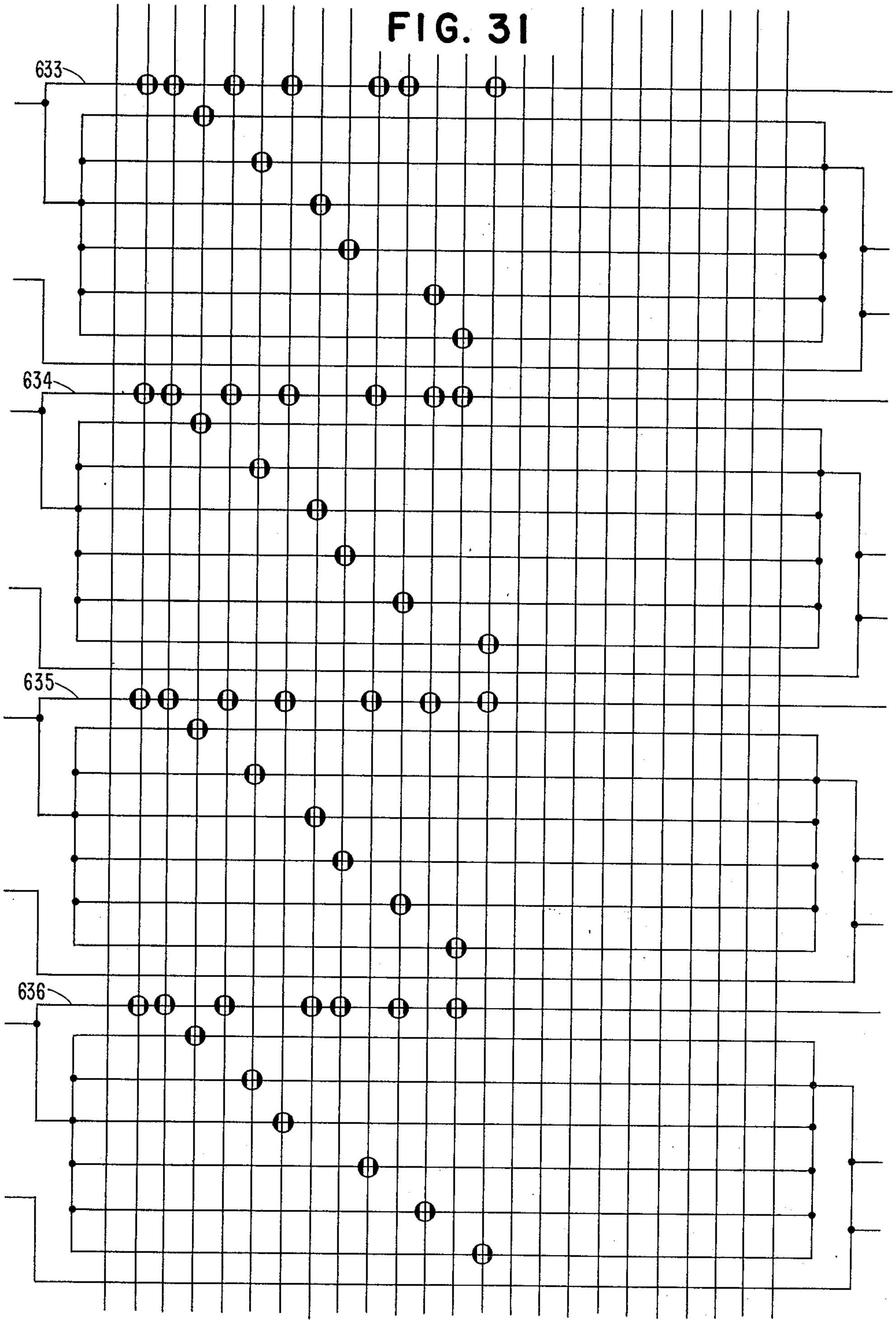
Figure 32:
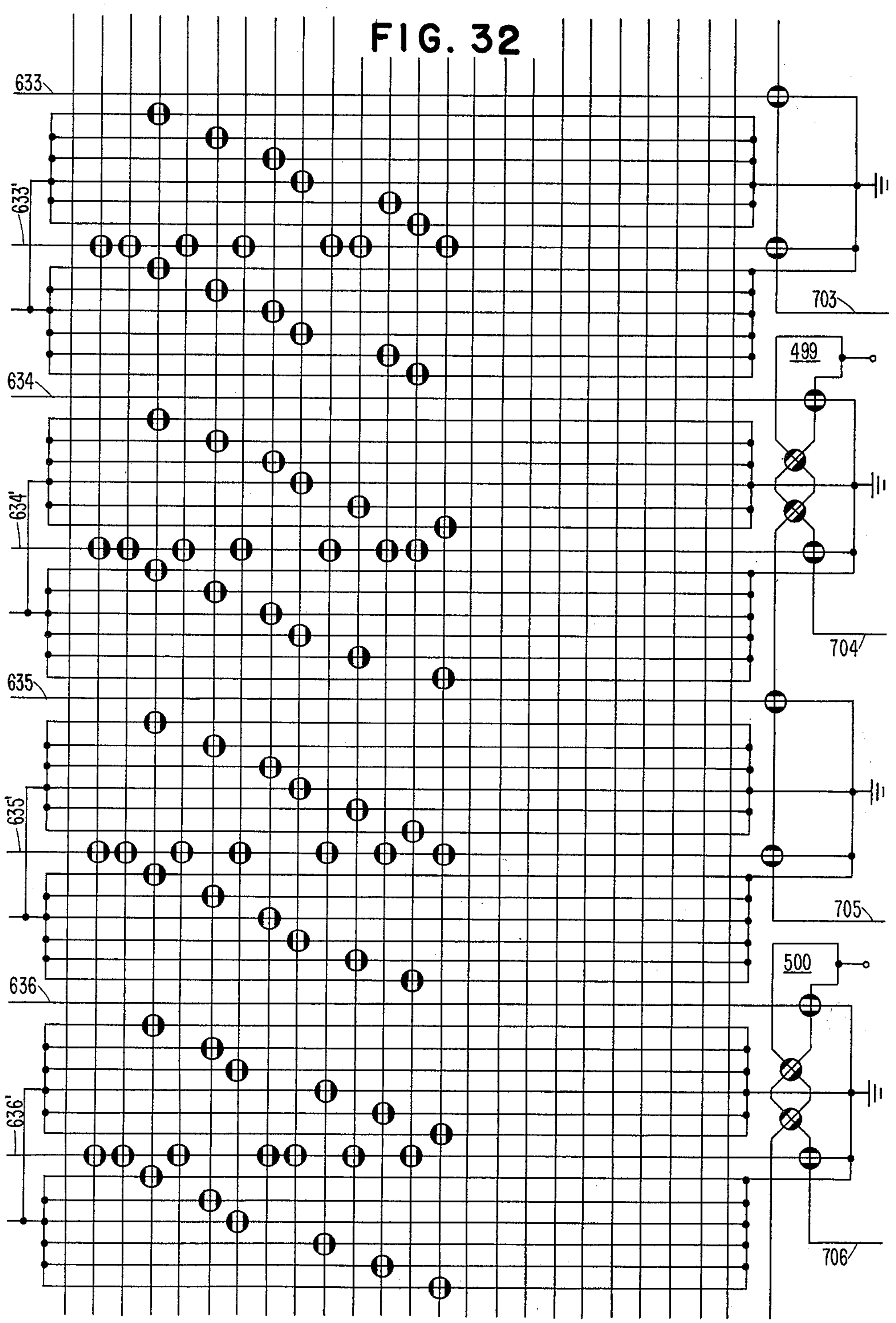
Figure 33:
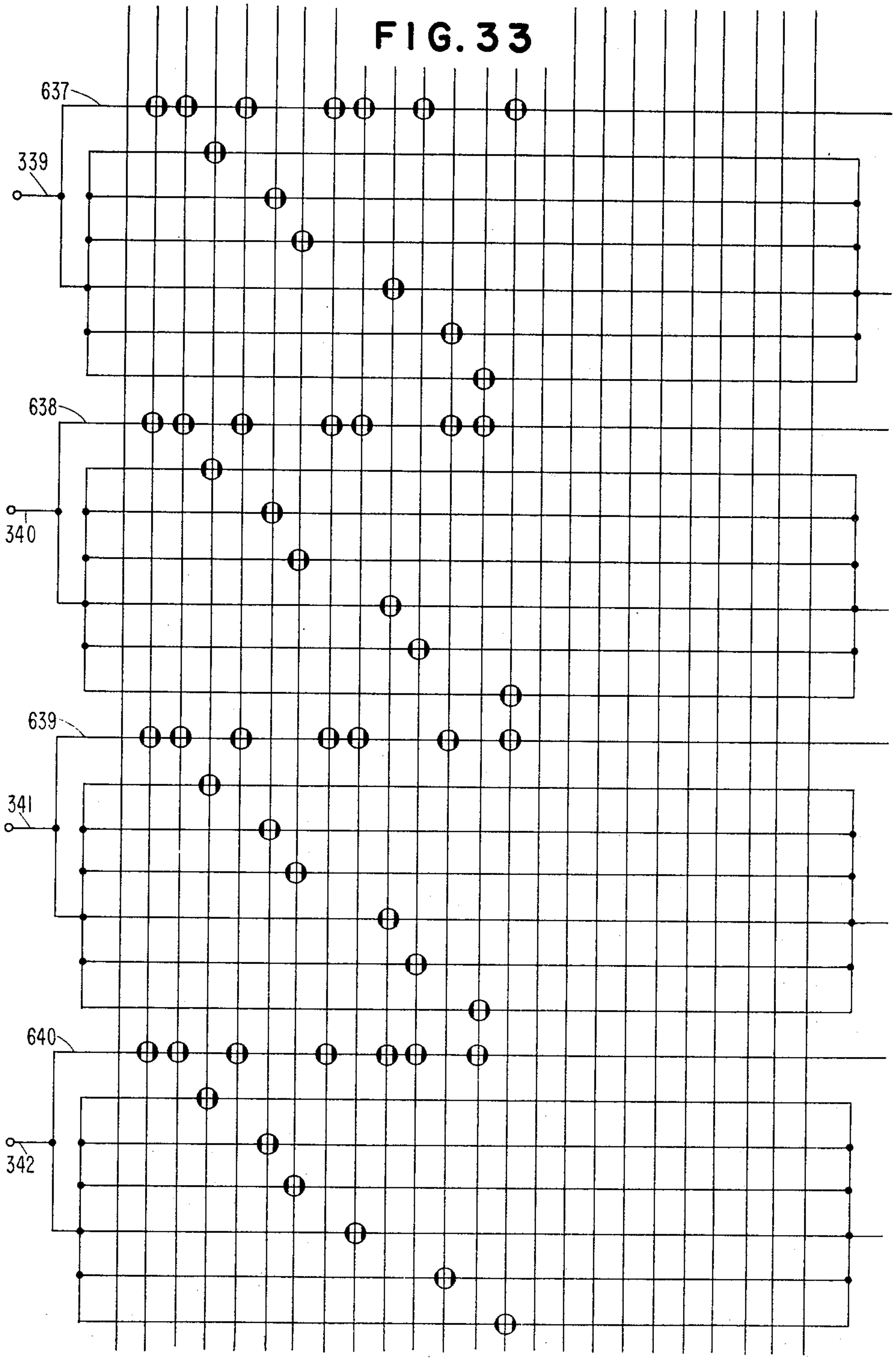
Figure 34:
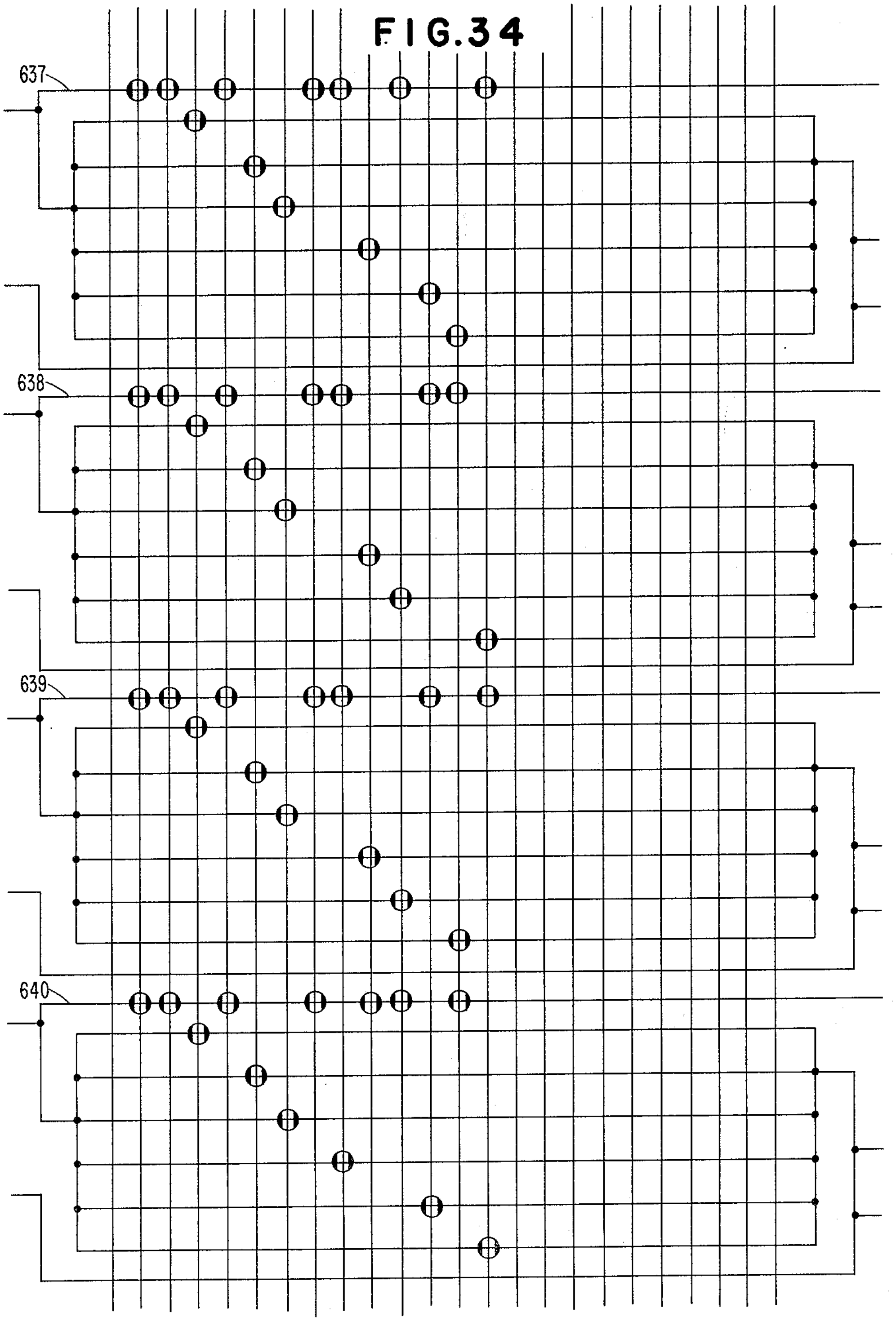
Figure 35:
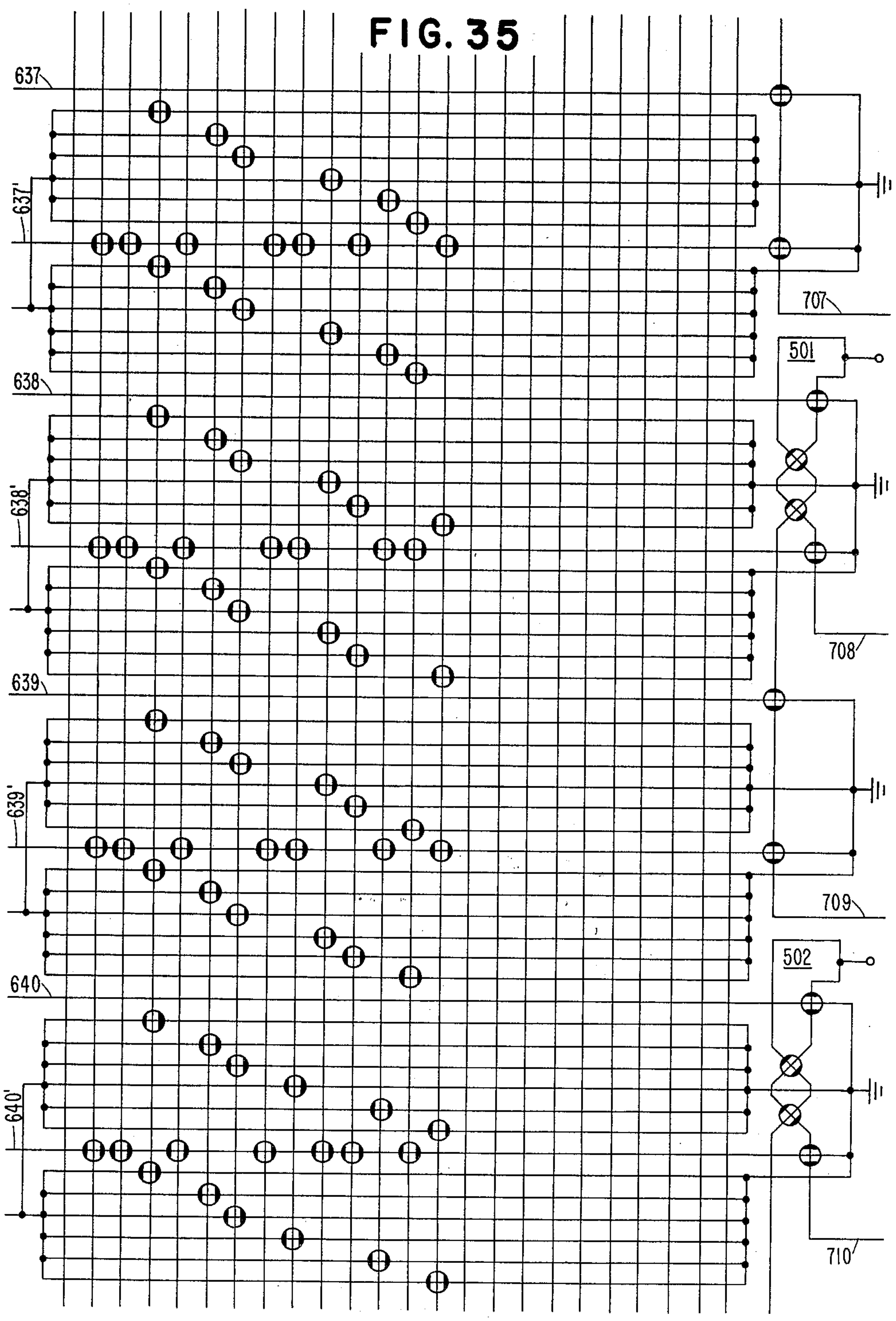

Turning now to cell 160 which has a junction with horizontal line 60, it may be seen from the array 50 that the main inhibitor of this cell is to be bypassed. This is accomplished by providing a set signal on the vertical spare set line 702 and by providing no signal on the set line 703. Set line 702 originates at flip-flop 498 which is controlled by current flowing either from supply line 334 or supply line 335 through their associated function lines 632 and 633, respectively. Function line 632 is shown in FIGS. 27 to 29 while function line 633 is shown in FIGS. 30 to 32. In order to obtain the desired signal on line 702, a current must be passed through function line 633 to activate the inhibitors appearing in line 703. This is accomplished by supplying spare set signals on the code lines of computer 270 in accordance with the code set up in Table I. When the proper signals are applied to the code lines current passes through line 633 and blocks off set line 703, forcing the current output from flip-flop 498 to flow through set line 702. With current blocked out of line 703 the left-hand side of cell 160 will not impede the flow of current and the main inhibitor of that cell will be bypassed.

Since horizontal line 61 includes an inhibitor at its junction with vertical conductor 55, the cell 161 must be set so that current will flow through its main conductor. Thus, it must be arranged to have current flowing through the set line 705 to activate the control inhibitor in the left-hand branch of cell 161. To obtain current in line 705, the flip-flop 499 (FIG. 32) must be set so that no current will flow through line 704. This is accomplished by applying signals on the spare set code lines of computer 270 which correspond to the function set up in function line 634. When this is the case, current will flow from supply line 336 through the junction line 634 to the inhibitor in line 704, activating that inhibitor and causing the current of flip-flop 499 to flow through line 705. Current would be directed to flow through function line 635 only when it is desired to block the current flowing in set line 705 to switch the output of flip-flop 499 to line 704. However, this is not desired in the present illustration.

Cell 162 is located at the intersection of vertical spare 114 with horizontal line 62. In order to make the spare 114 correspond to line 55 the main inhibitor of cell 162 must be included in the current path of the spare. This is accomplished by supplying a current to the control inhibitor in the left-hand branch of the cell. This current is carried by line 707 which originates in flip-flop 500, shown in FIGS. 32 and 35. Current is obtained in line 707 by inhibiting current flow through line 706. This is done by current flowing through function line 636 from supply line 338 in response to the application of coded signals to the code lines of computer 270.

Figure 36:
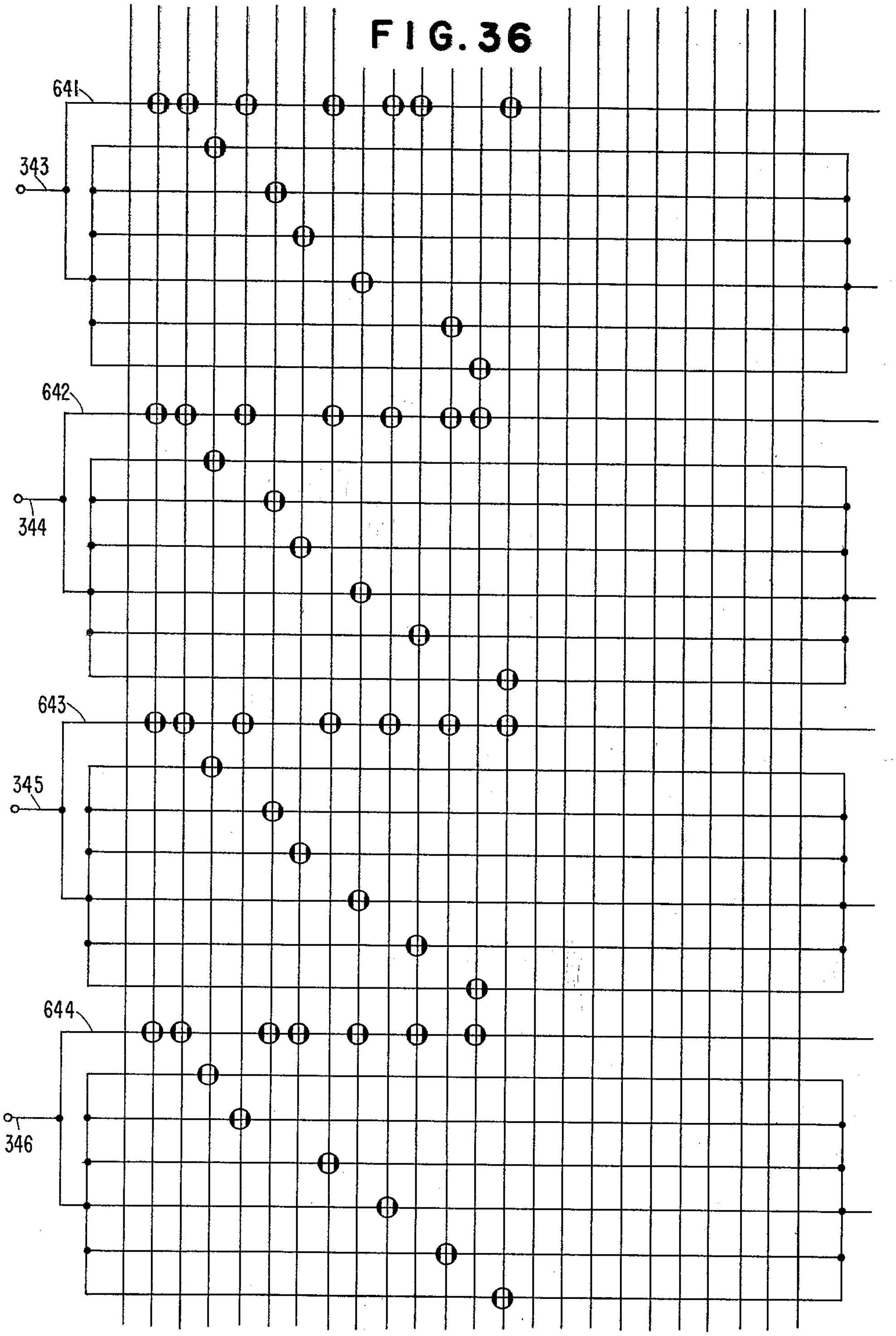
Figure 37:
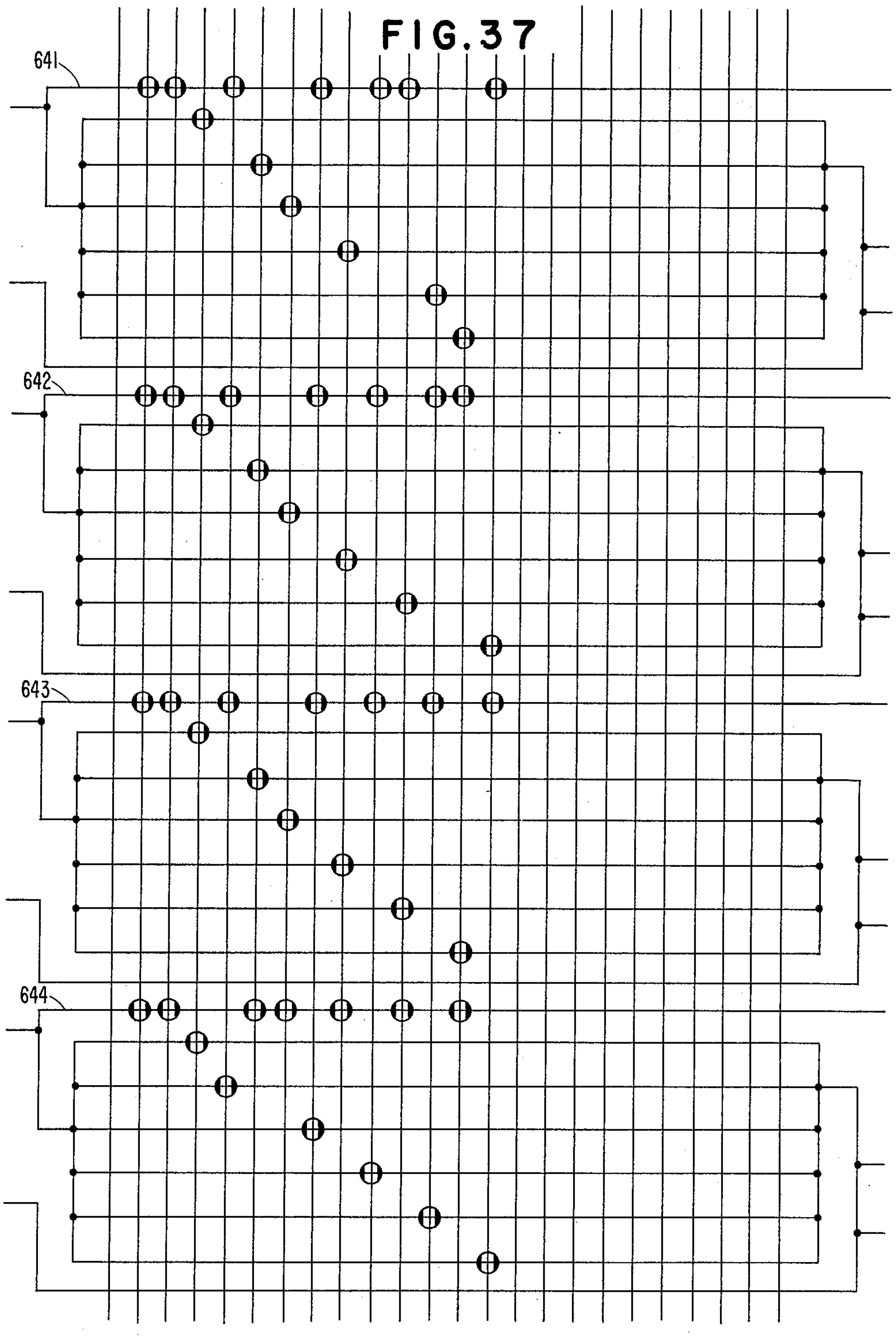
Figure 38:
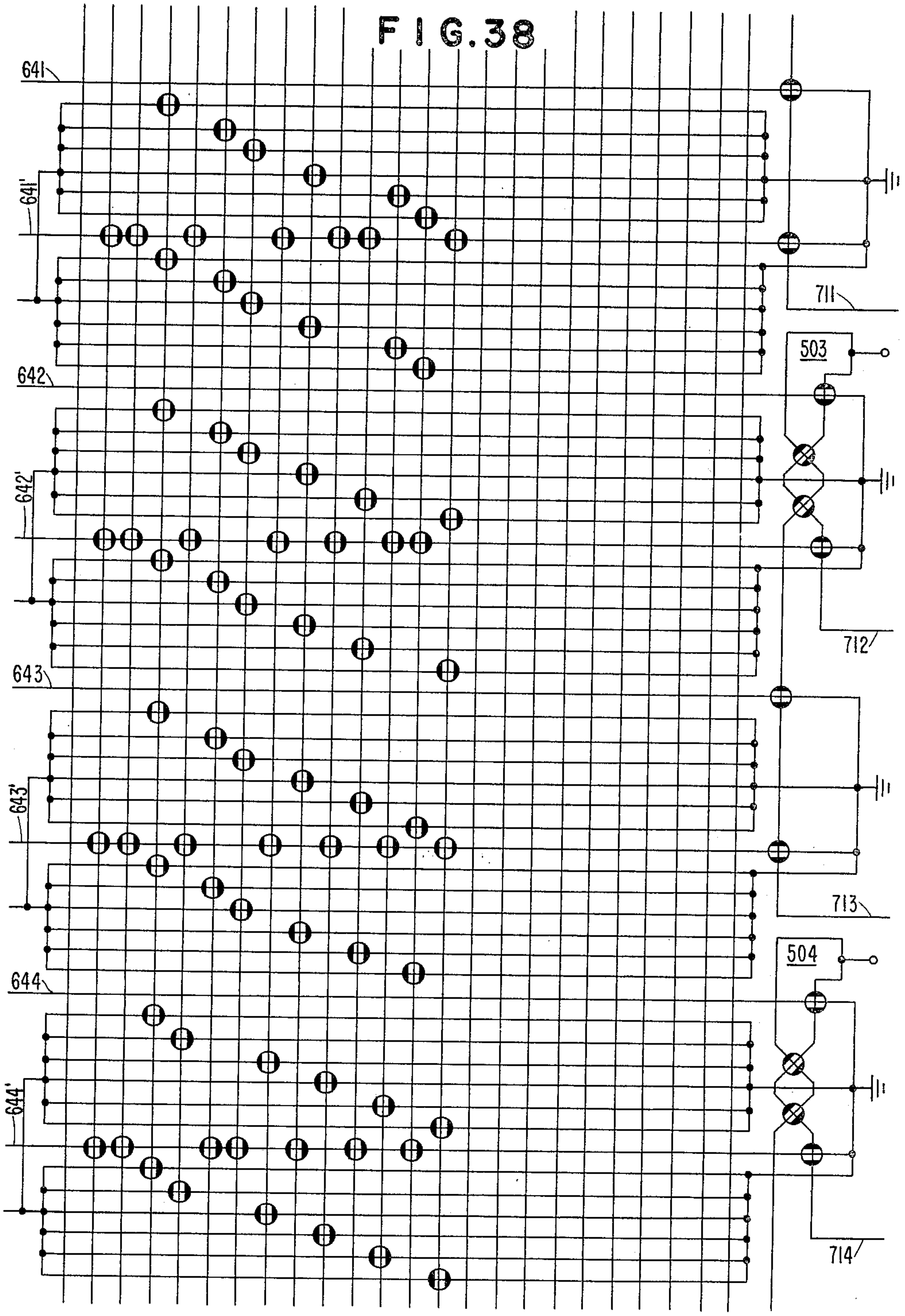
Figure 39:
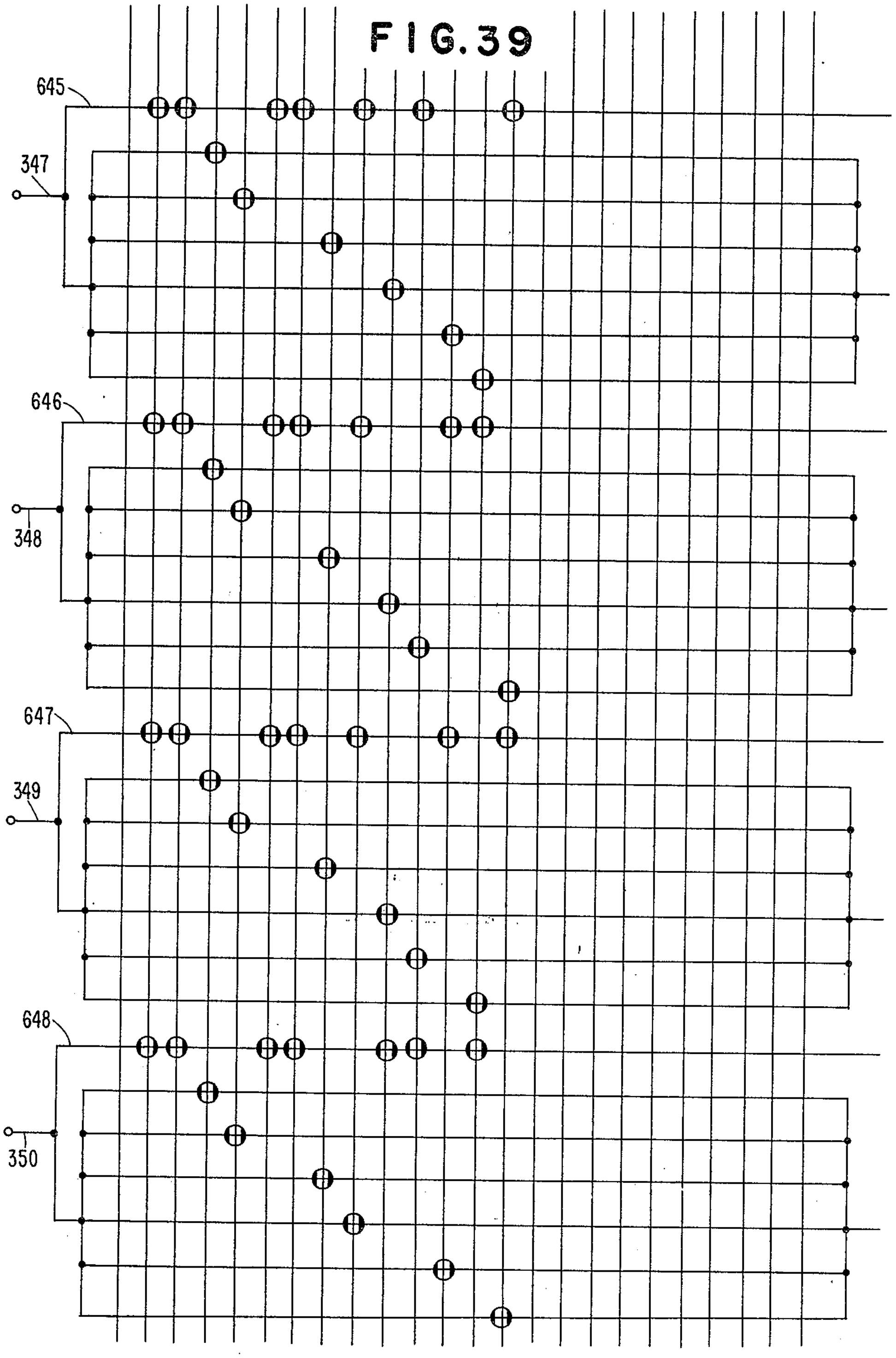
Figure 40:
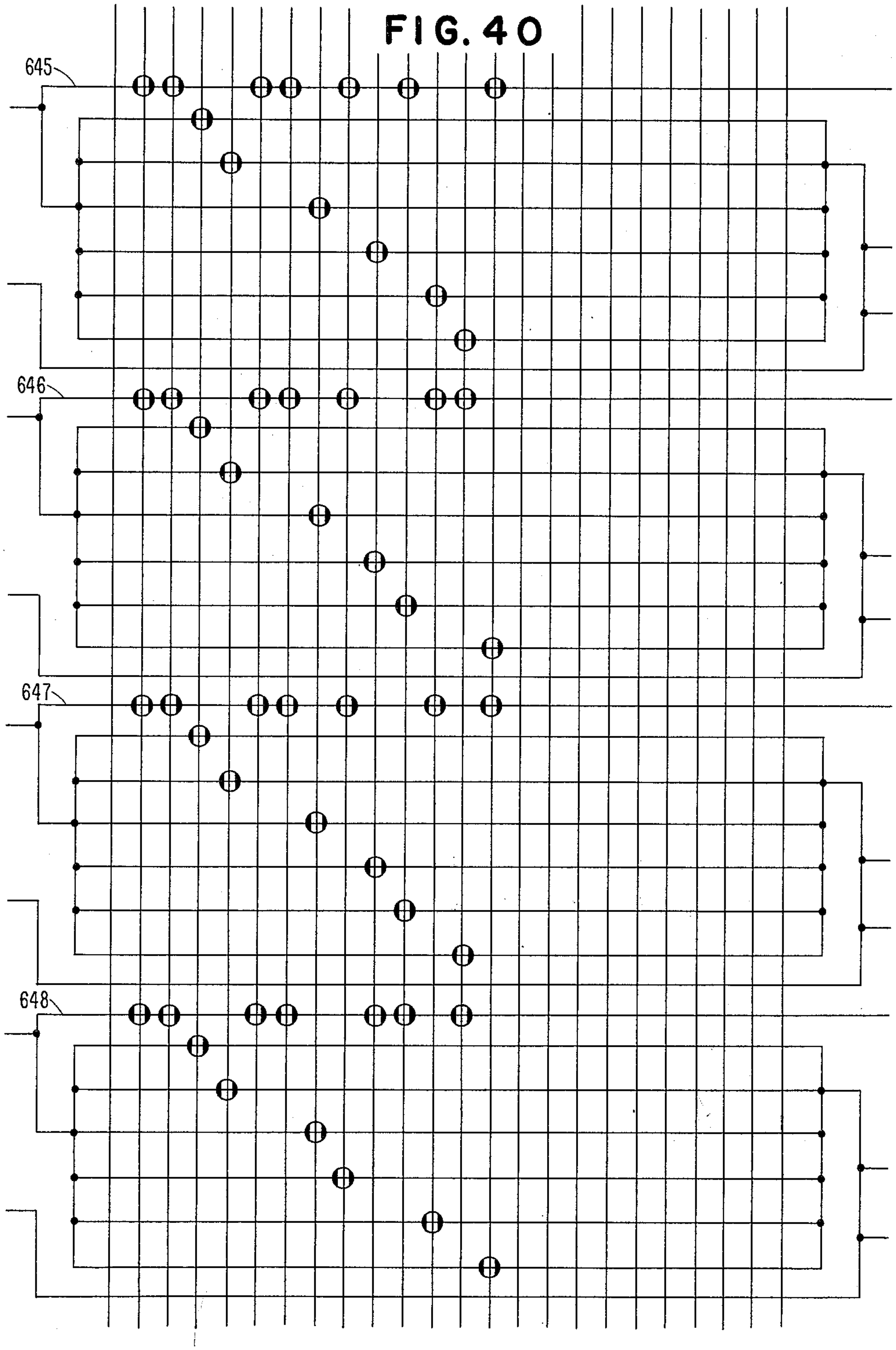
Figure 41:
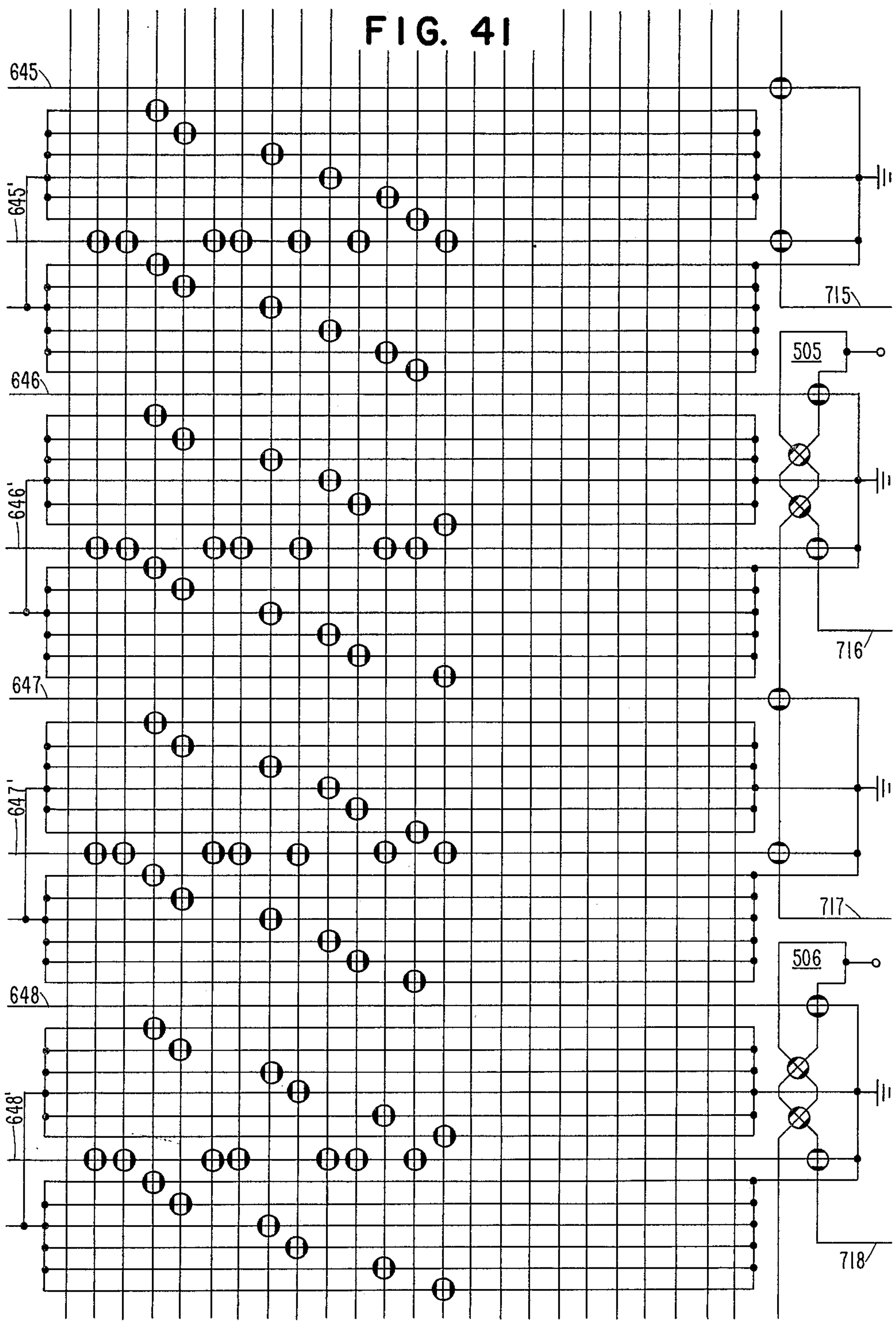

Cells 163 and 164 which appear at the junctions of spare 114 with lines 63 and 64, respectively, both must provide a path to bypass their respective main inhibitors. This is done by applying signals to set lines 708 and 710, respectively. Lines 709 and 711 therefore are to receive no signals. Line 708 originates at flip-flop 501 which is controlled by the function lines 638 and 639. Since a current is to be obtained on line 708, the computer 270 provides set signals corresponding to the function set up in function lines 639, allowing current to pass from supply line 341 through the function line to an inhibitor in set line 709. This blocks off line 709 and forces the current output from flip-flop 501 to appear on line 708. Function lines 638 and 639 appear in FIGS. 33 to 35. Set line 710 originates at flip-flop 502 which is controlled by the function lines 640 and 641. Function line 641 is shown in FIGS. 36, 37 and 38. To obtain a current output on line 710, the computer 270 provides output signals corresponding to the functions set up in function line 641, allowing current to pass from supply line 343 to an inhibitor in set line 711. This inhibitor is thus activated and blocks off current flow through line 711. This forces the current from flip-flop 502 to flow through line 710, inhibiting the right-hand branch of cell 164 and thus causing the main inhibitor of that cell to be bypassed.

Cell 165 of spare 114 is located at the intersection of spare 114 with the horizontal spare 102. Since horizontal spare 102 has been substituted for horizontal conductor 58, it is now a part of the active circuit of the array 50. Since an inhibitor appeared at the junction of vertical line 55 with horizontal conductor 58, an inhibitor must appear at the junction of the lines substituted for conductors 55 and 58, respectively. Therefore, the main inhibitor of cell 165 must be included in the current path of spare 114. This is accomplished by activating the control inhibitor in the left-hand branch of cell 165 by means of a set current appearing on set line 713. Set line 713 originates at the flip-flop 503 of FIG. 38. To obtain current flow through this line, the computer 270 provides output signals in accordance with the function set up in function line 642, shown in FIGS. 36, 37 and 38. Current flowing through this function line from supply line 344 prevents current from flowing in line 712 of flip-flop 503 by activating an inhibitor in that line. The output current of flip-flop 503 is thus forced to flow through set line 713 as was desired.

The cell 166 is located at the intersection of horizontal spare 104 with vertical spare 114. Since horizontal spare 104 is not in the active circuit, cell 166 need not be set in any particular manner. Thus, the state of conduction of flip-flop 504, which supplies current either through line 714 or 715, is immaterial.

A bias-off signal is then applied to line 199, activating inhibitors 183 and 191 to prevent current flow through line 55. To obtain a bias-off signal on line 199, a combination of signals must appear on the bias off code lines of the control computer 270, which signals correspond to the function set up in function line 604, shown in FIGS. 12, 13 and 14. Application of these signals allows a current to flow from supply line 306 through function line 604 to activate an inhibitor in the grounded branch of flip-flop 484. The activation of this inhibitor prevents current from flowing in that particular branch, forcing it to flow in the branch when includes the bias line 199. Vertical line 55 is thus cut off.

After each cell of vertical line 114 has been set up in the manner described above and line 55 biased off, the bias-off signal is removed from line 195, deactivating inhibitor 153 and placing the vertical spare 114 in the active circuit. To remove the bias-off signal from line 195, the computer 270 furnishes coded output signals on the bias-off lines corresponding to the function set up in function line 757 (shown in FIGS. 69, 70 and 71). These signals unblock the function line 757 and allow current to flow therethrough from the supply line 807. This current serves to activate an inhibitor located in the bias line 195 and blocks further current flow therethrough. This forces the current output from flip-flop 843 to flow to ground. When the current is thus removed from bias line 195 the vertical spare 114 takes its place in the active circuit. The current intended for line 55 then flows through connector line 149, through inhibitor 153, through either branch of cell 158, through the left-hand branches of cells 159 and 160, through the right-hand branches of cells 161 and 162, through the left-hand branches of cells 163 and 164, through the right-hand branch of cell 165, through either branch of cell 166 and then to ground.

Next, let it be assumed that a fault has been detected in horizontal line 63. Since the horizontal spare 104 is still available, it may be substituted for the faulty line. The same procedure is used in this substitution as was used in the two substitutions discussed above. The horizontal spare 104 is set up to correspond to line 63. To accomplish this, cell 140, which is at the intersection of spare 104 with vertical line 52, is set up to include the main inhibitor in the path of current flow while the cells 141, 142 and 143, which are located at the intersections of spare 104 with conductors 53, 54 and 55, respectively, are set up so that the current path bypasses the main inhibitor.

Figure 57:
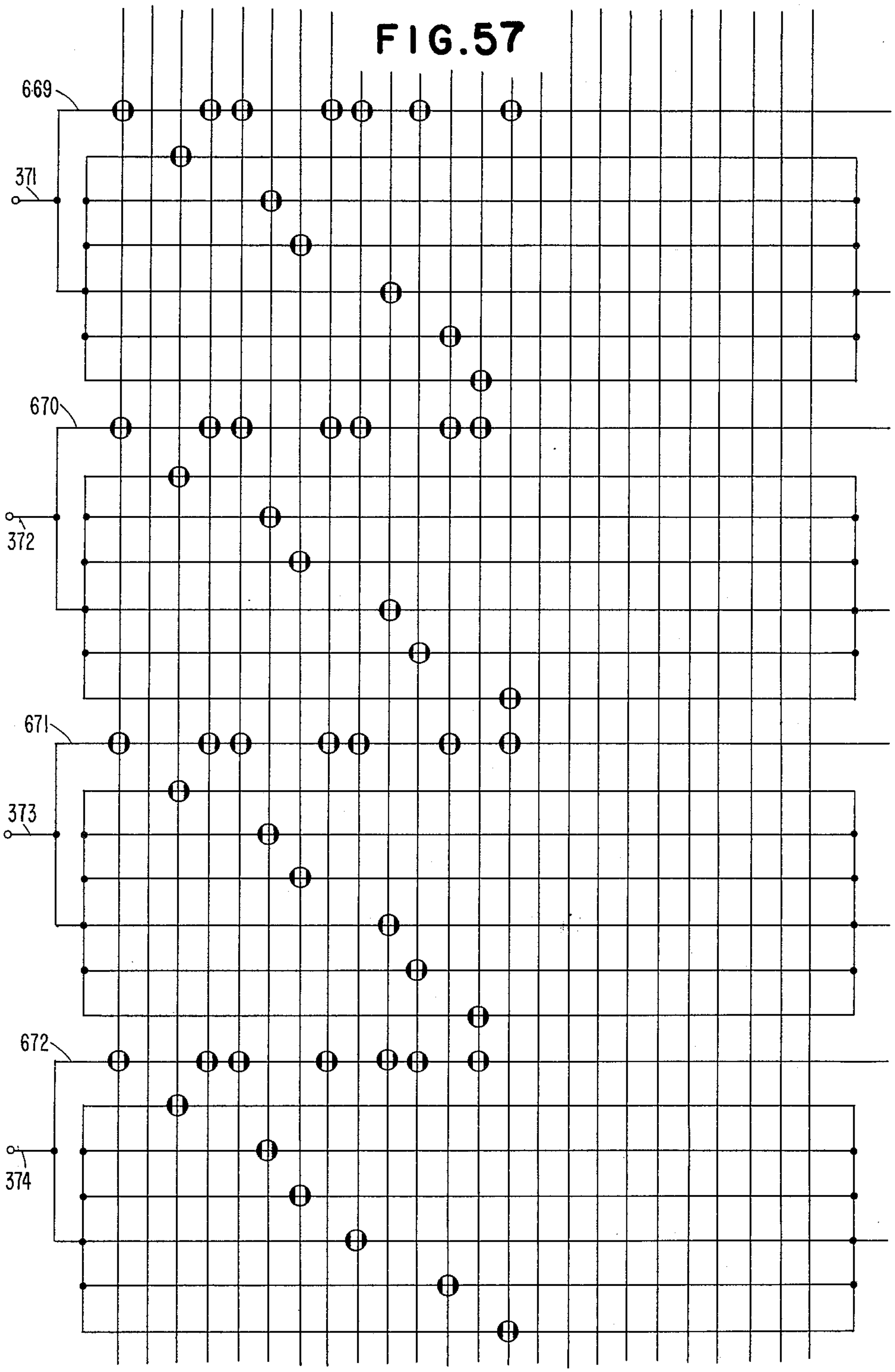
Figure 58:
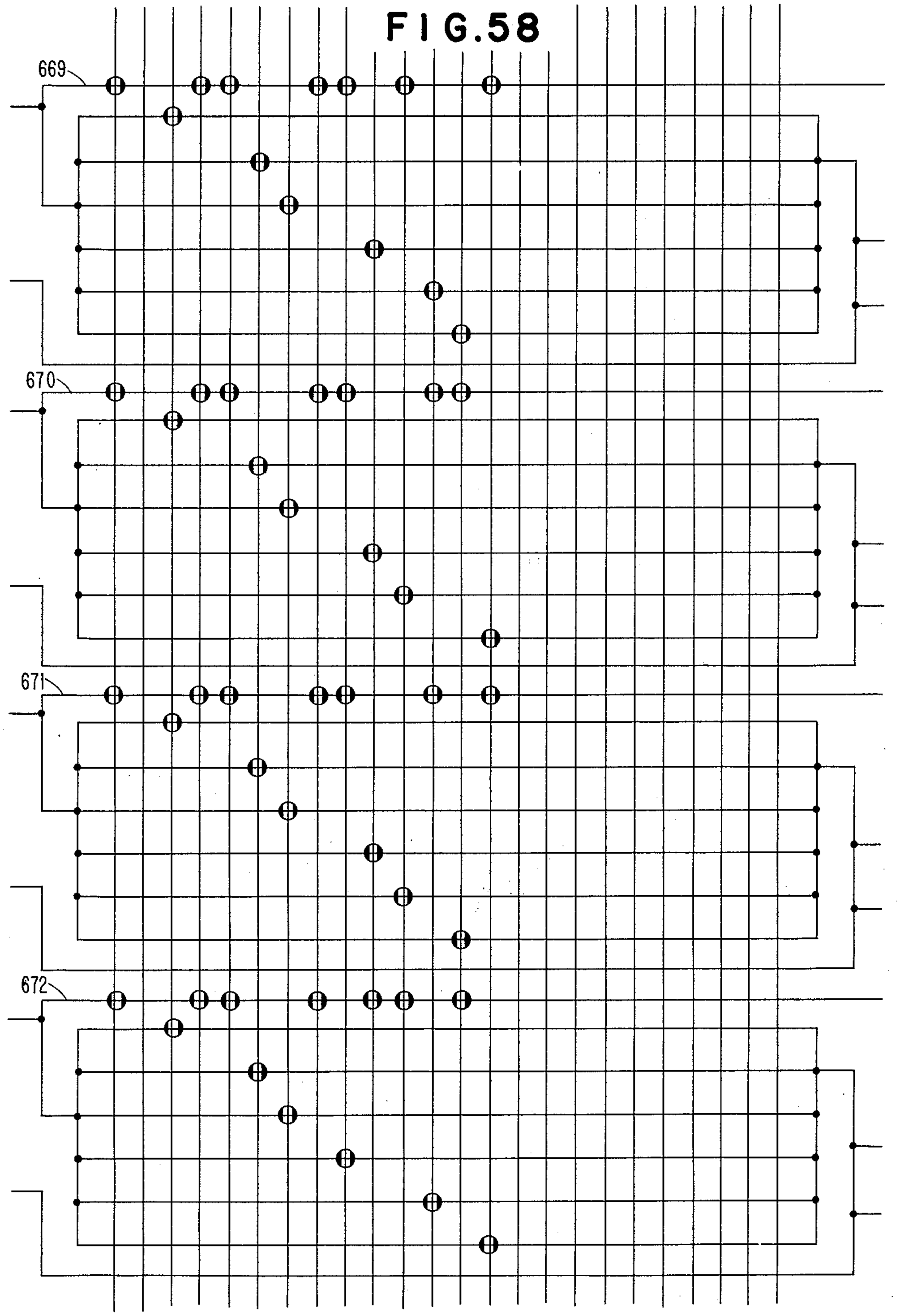
Figure 59:
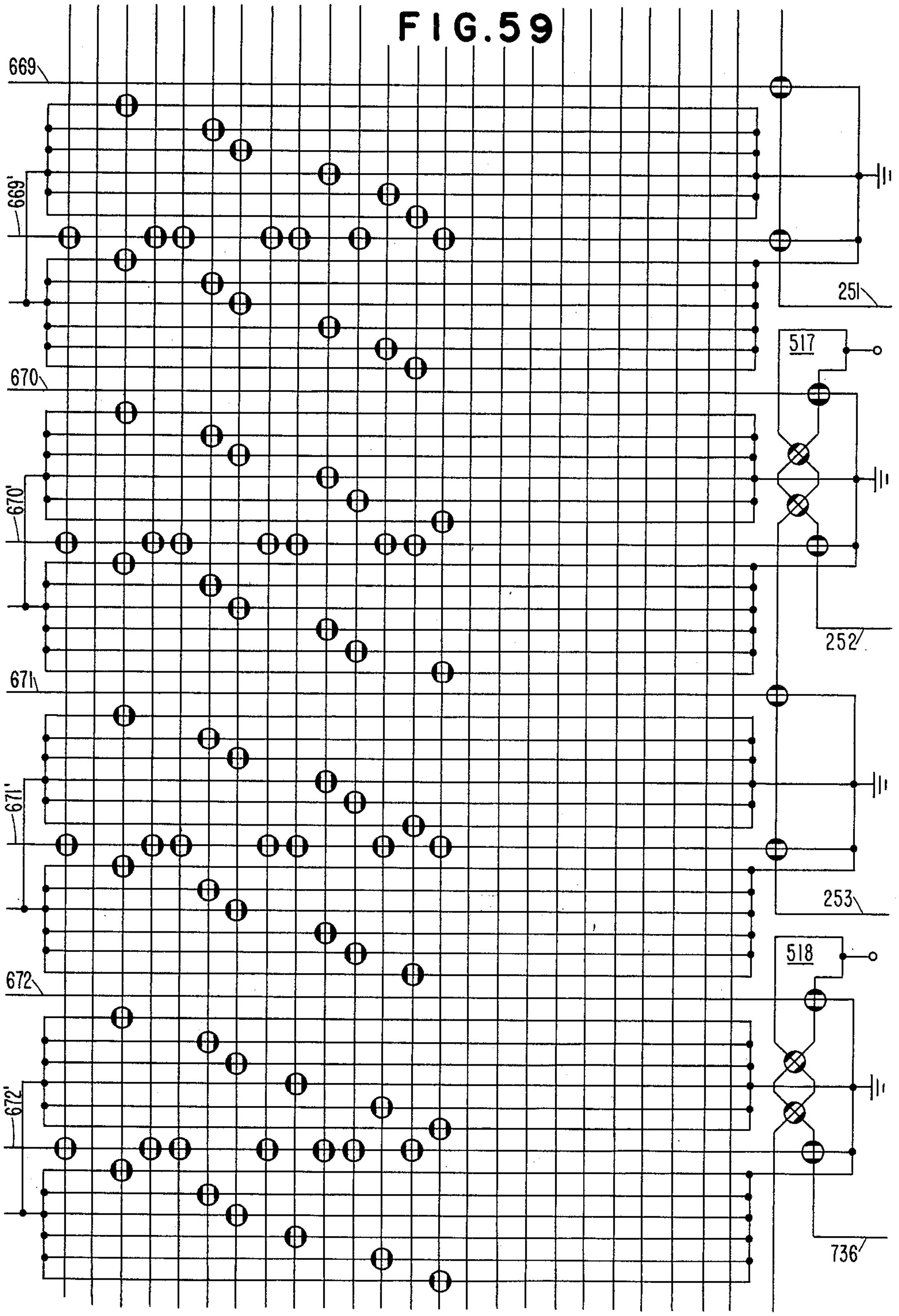

To direct the current flow in horizontal spare 104 through the main inhibitor of cell 140 it is necessary to apply a signal to the setting line 737 while no current is applied to line 736. Setting line 737 originates at flip-flop 518, shown in FIGS. 59 and 62. To obtain the desired output on line 737, the control computer 270 provides a coded signal output on the set spare code lines which corresponds to the function of function line 672 (FIGS. 57, 58 and 59). This allows current to flow from supply line 374 through function line 672 to an inhibitor located in the line 736 of flip-flop 518. The activation of the inhibitor accomplished by this signal blocks current flow through line 736 and forces the output of flip-flop 518 to flow through line 737. No current flows through function line 673 (FIGS. 60, 61 and 62) since such a current would activate the inhibitor in line 737 and block the current flow in this line.

Figure 60:
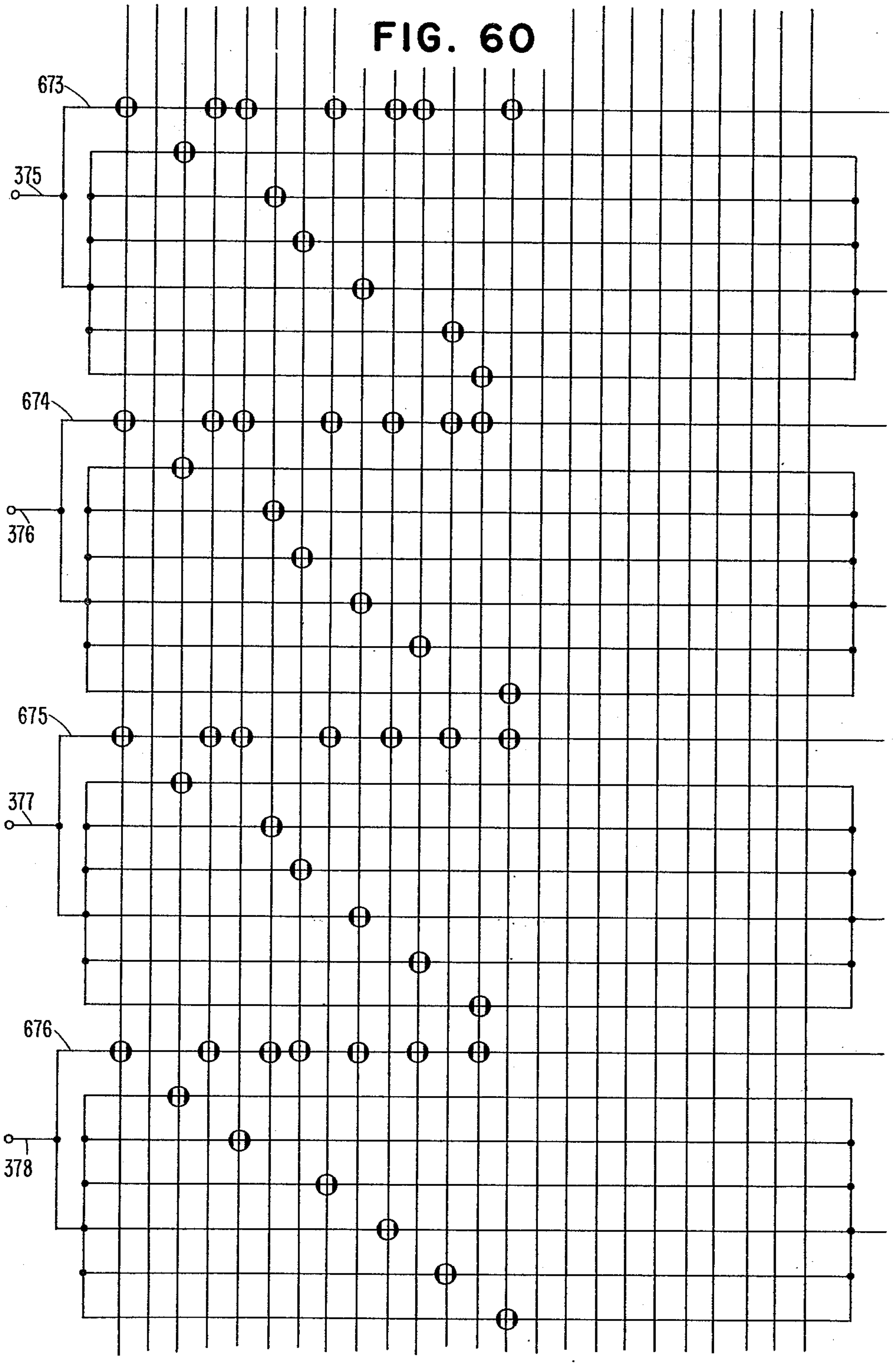
Figure 61:
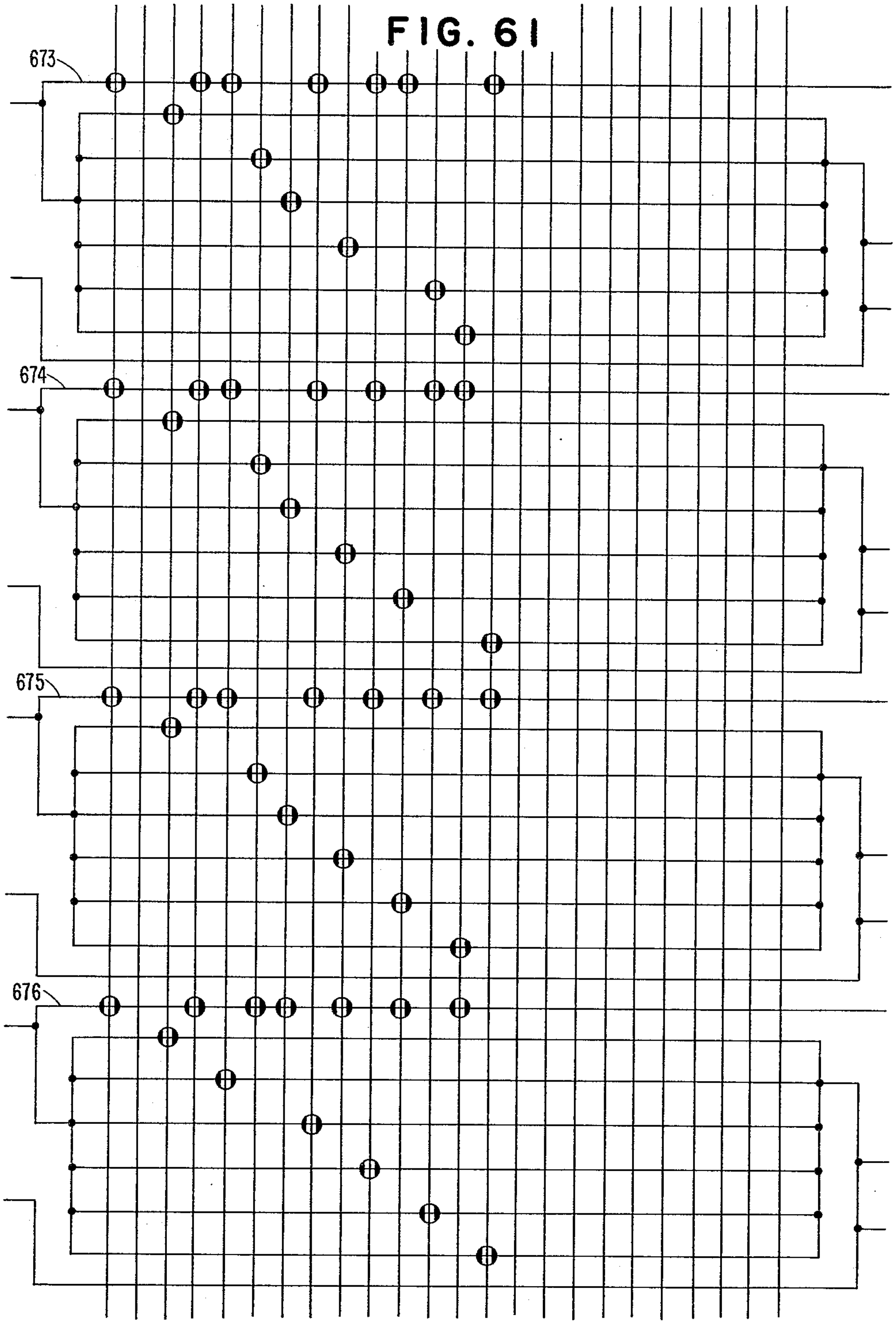
Figure 62:
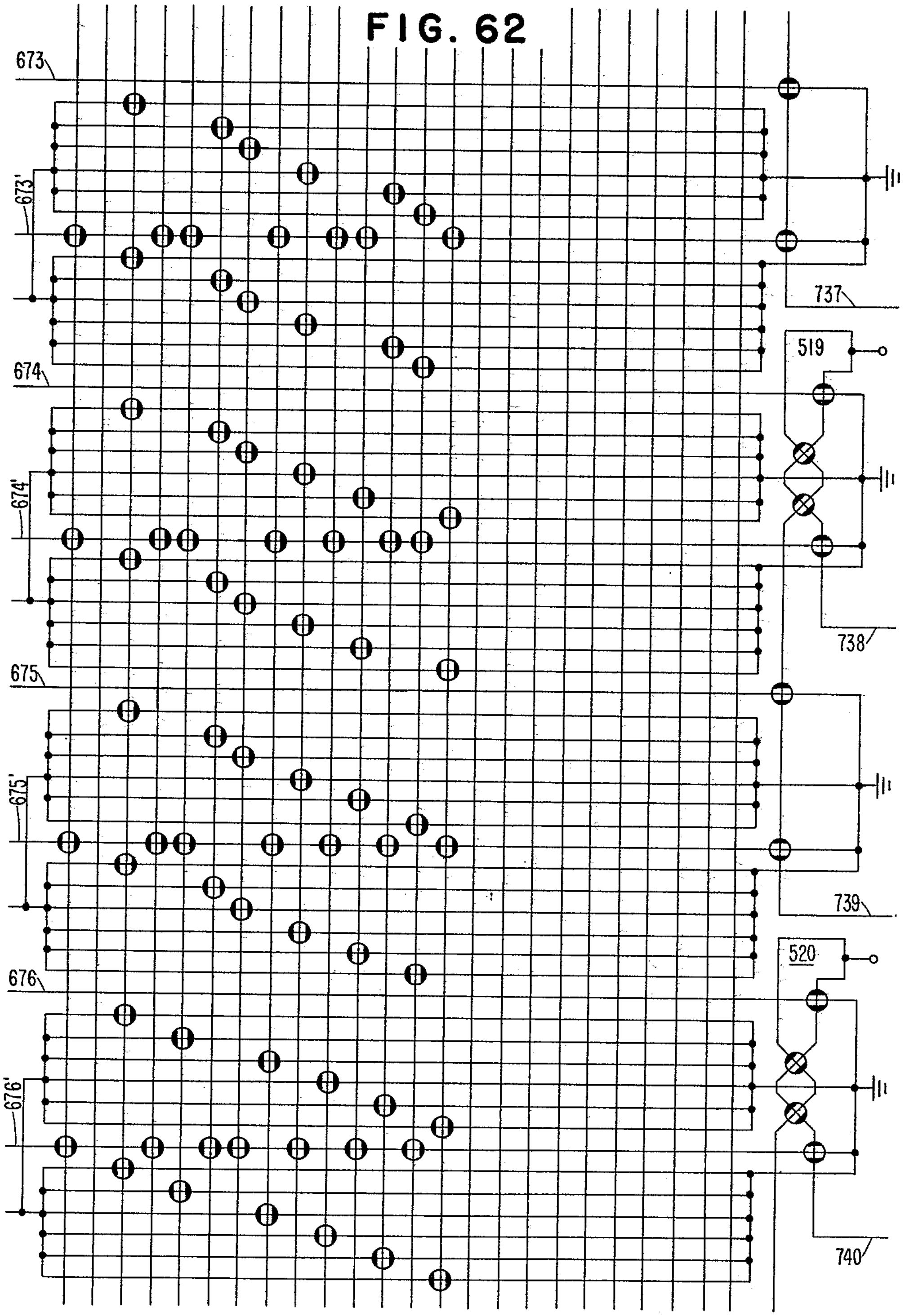
Figure 63:
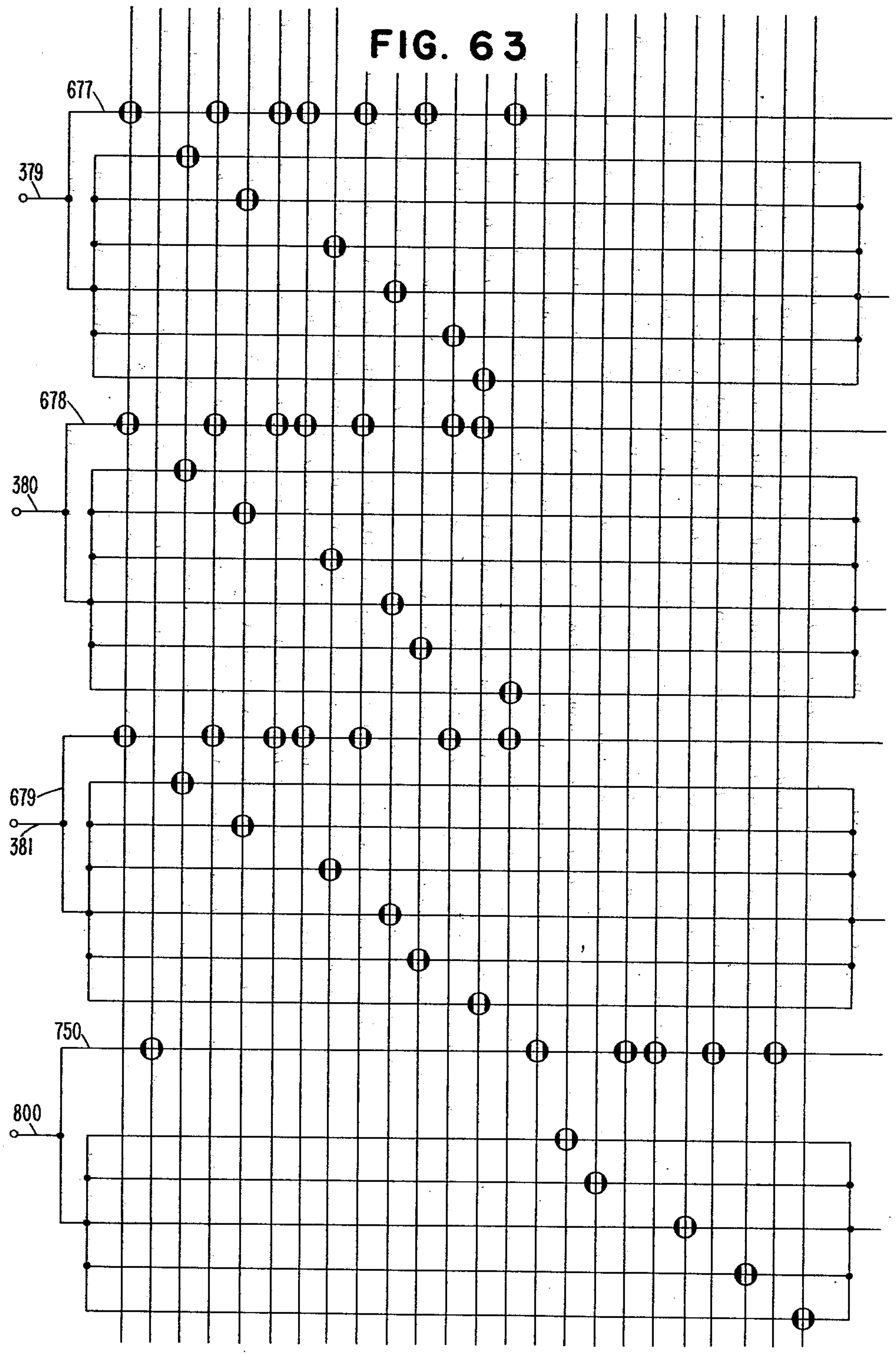
Figure 64:
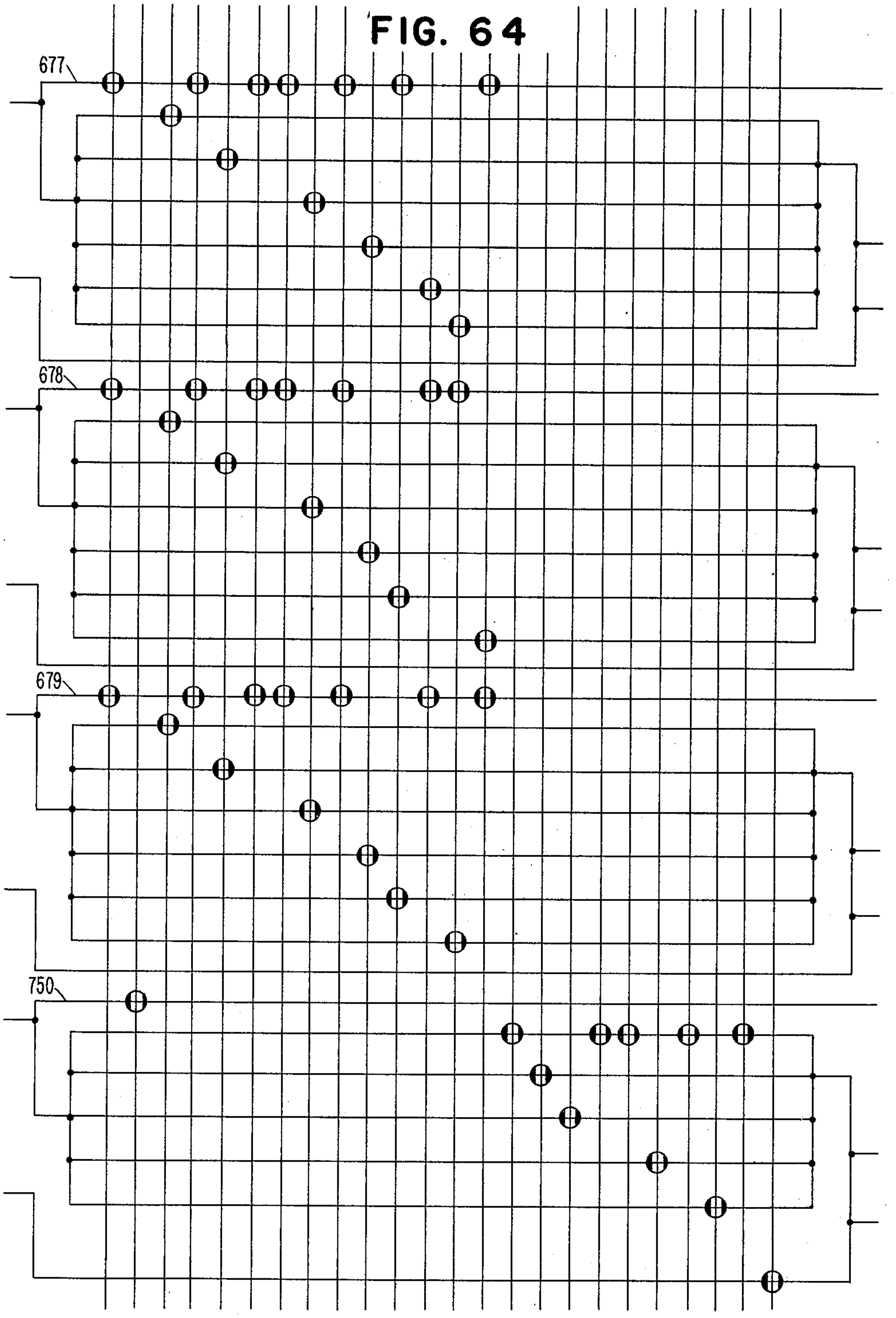
Figure 65:
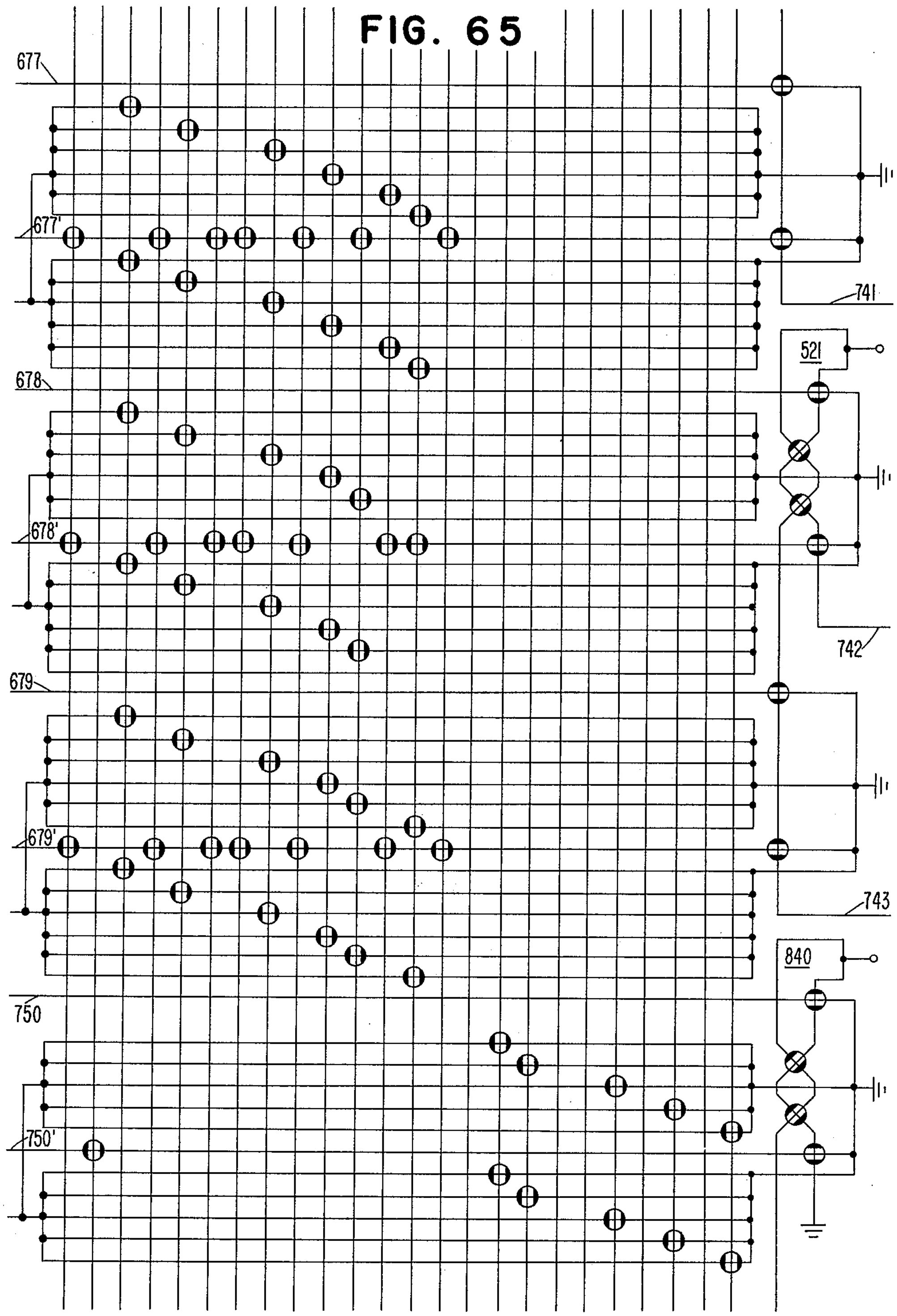
Figure 66:
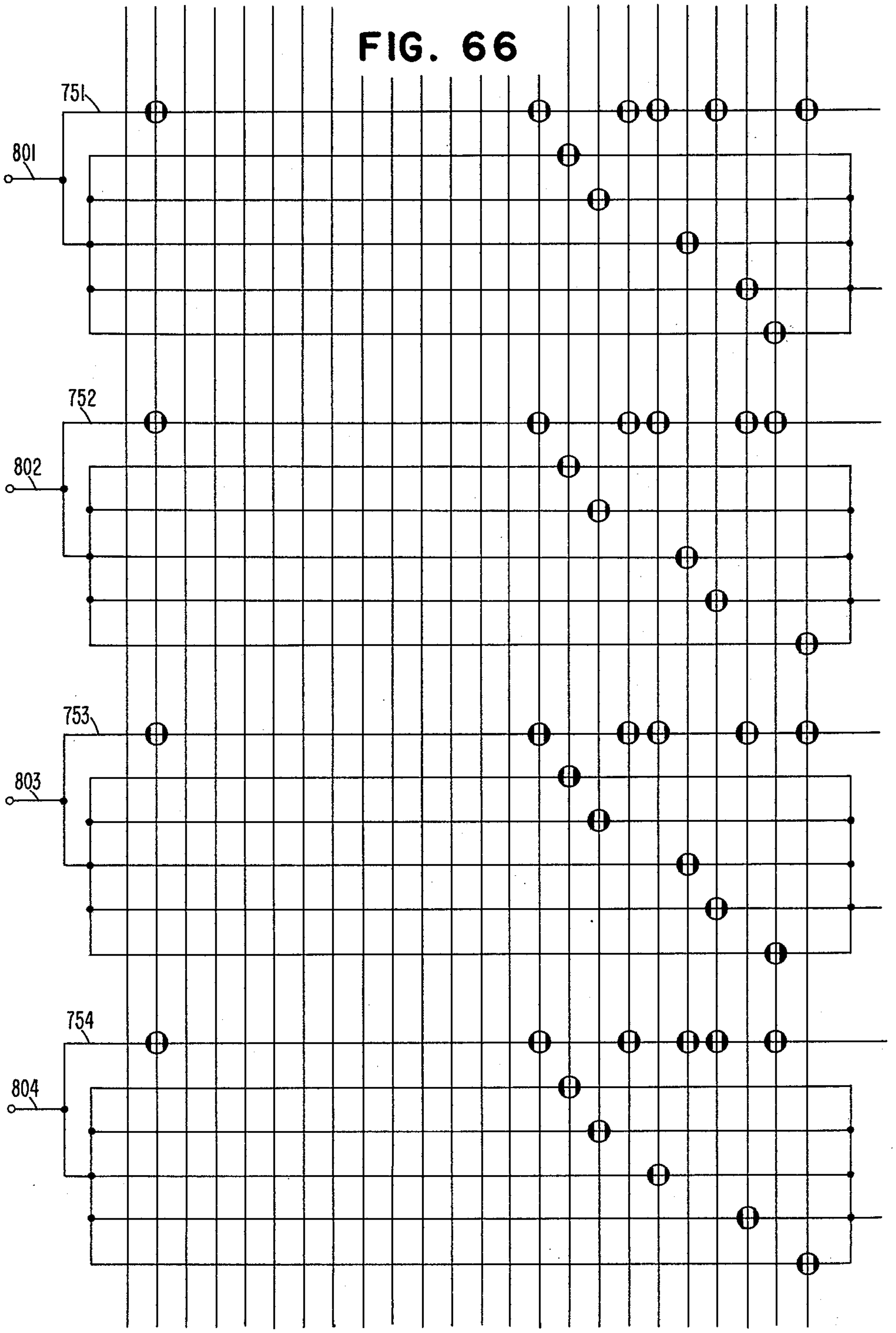
Figure 67:
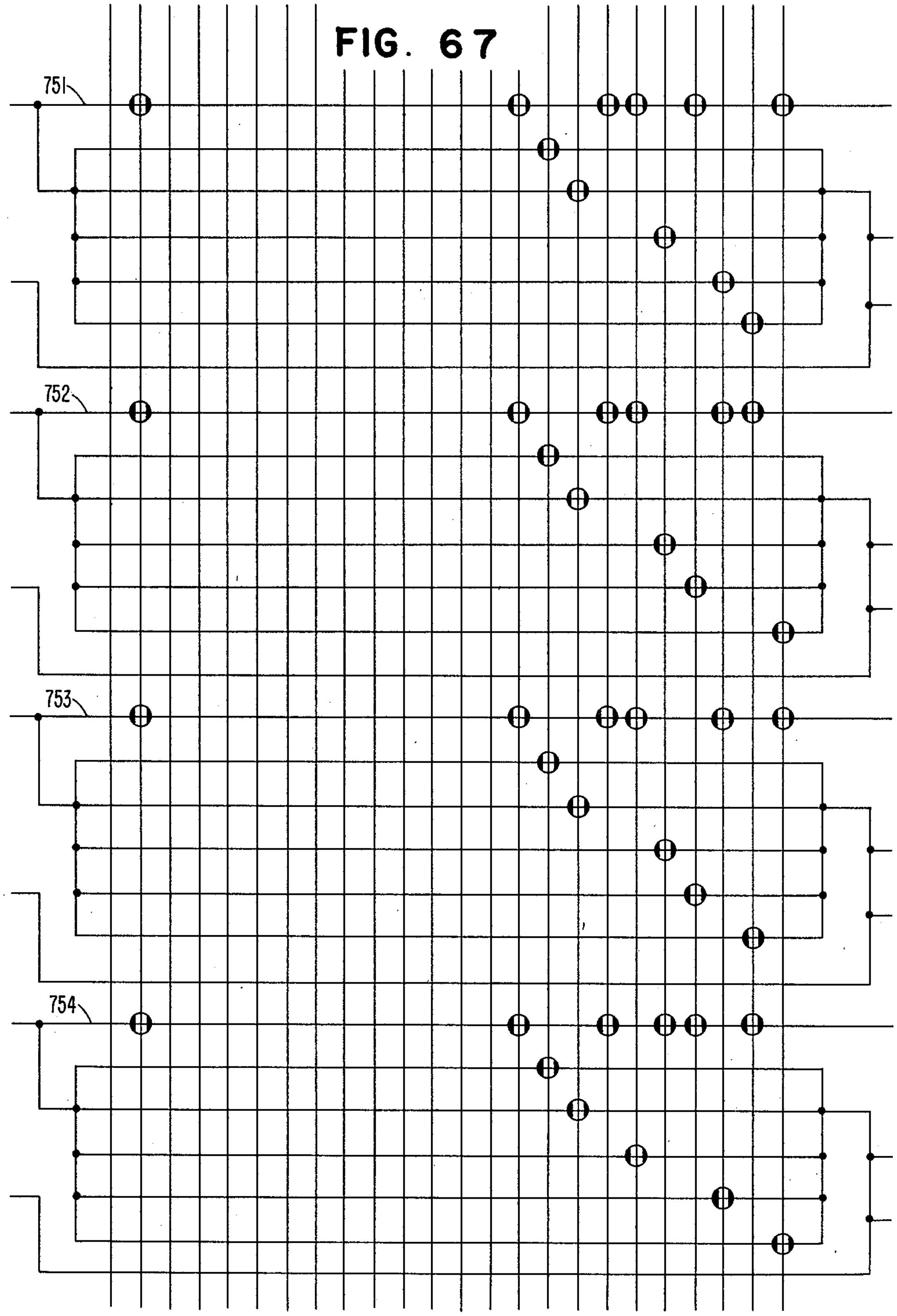
Figure 68:
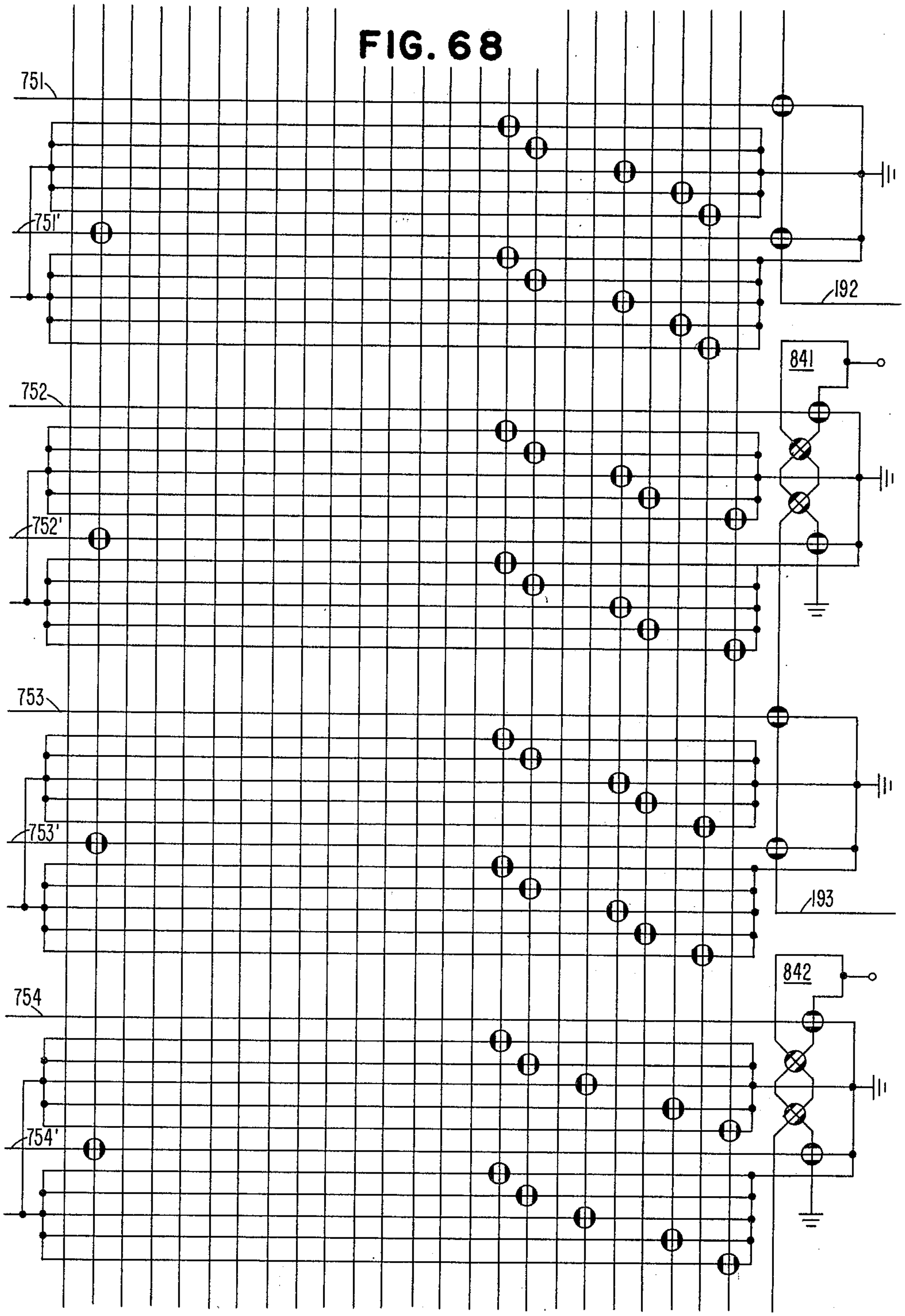
Figure 69:
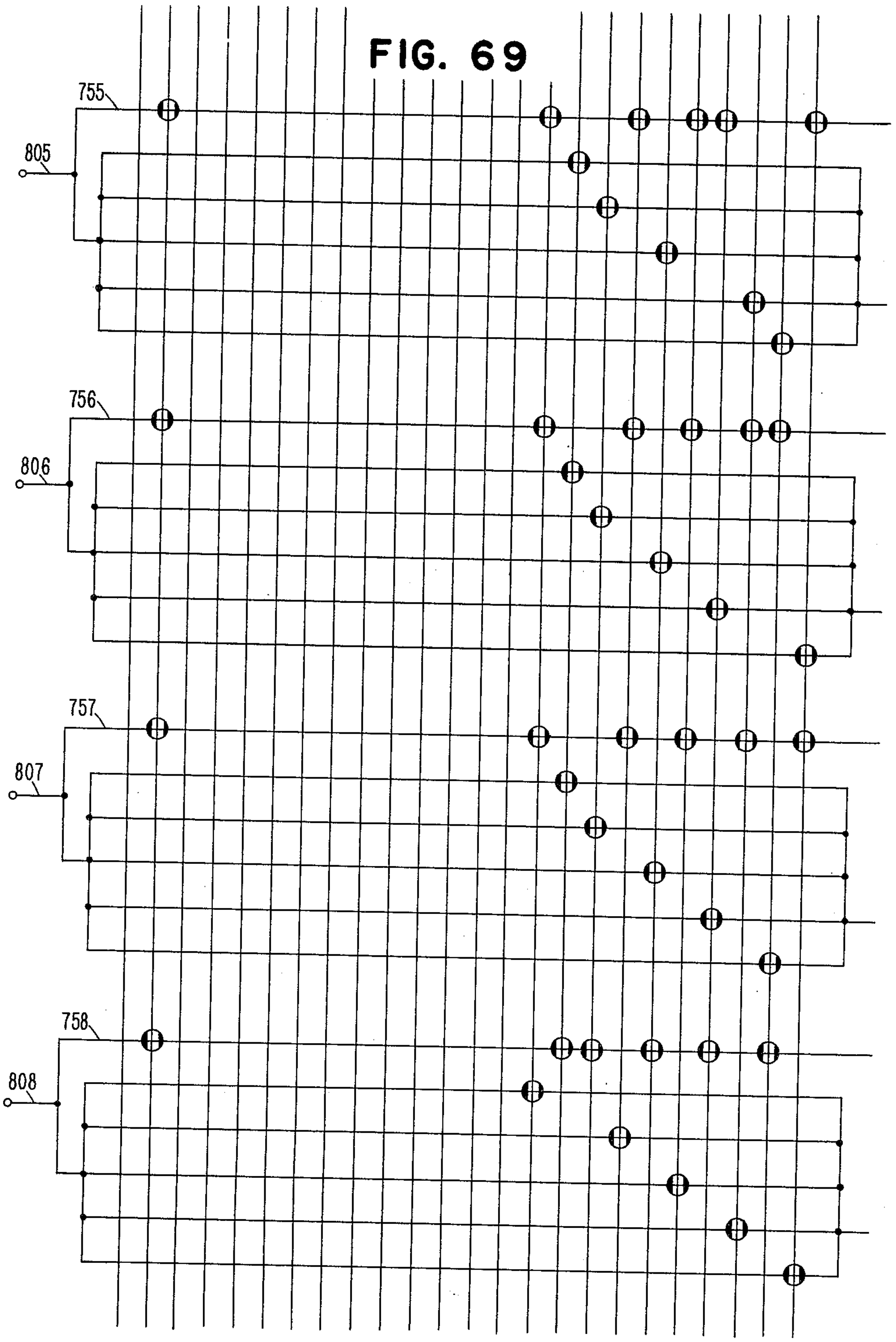
Figure 70:
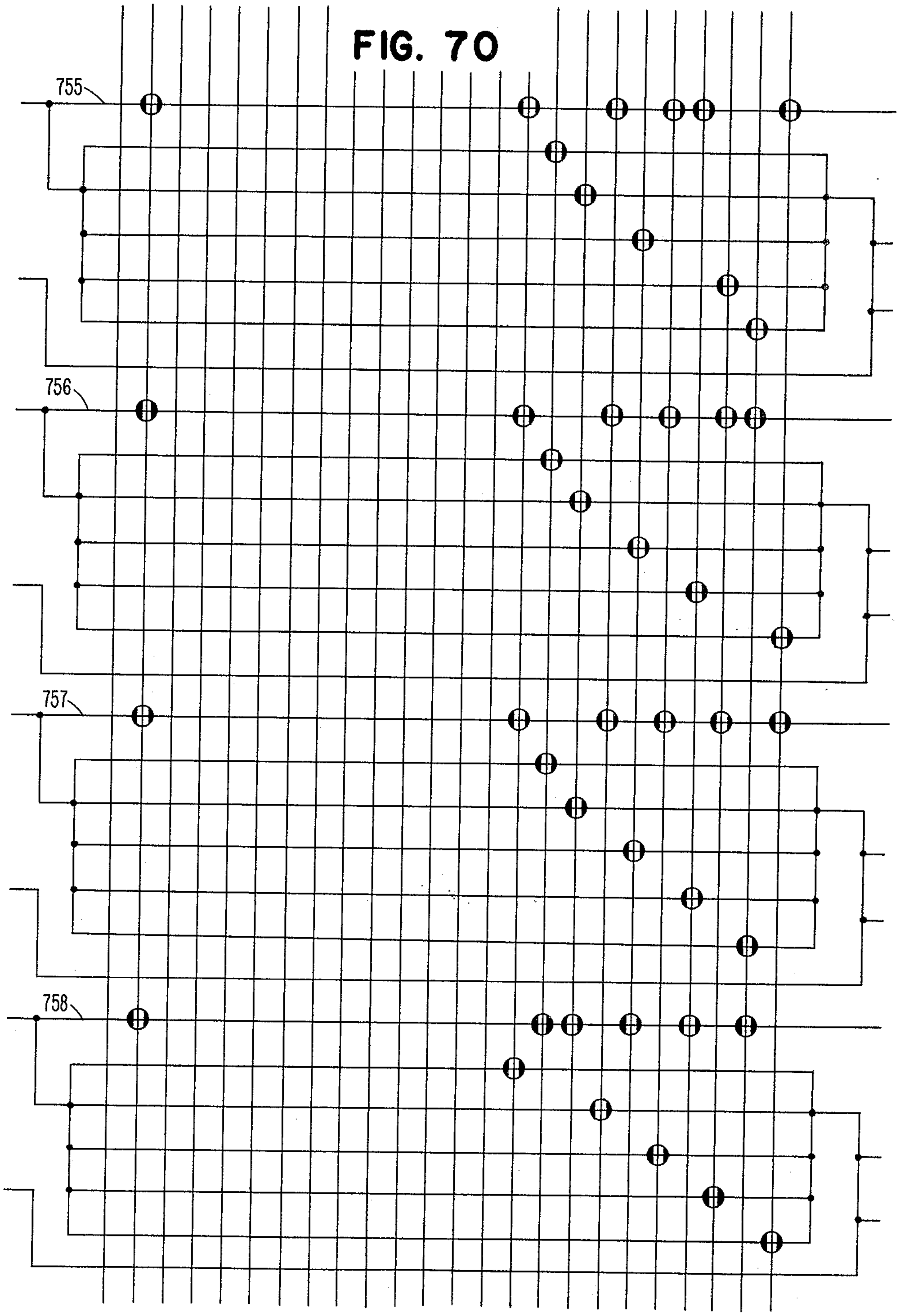

It is evident that the main inhibitors of the remaining cells 141, 142 and 143 are to be bypassed in order that spare 104 might correspond to conductor 663. To accomplish this bypassing, the lower branch of the cell must be left conductive while the upper branches of these cells must be inhibited. Inhibition of the upper branches of cells 141 through 145 is accomplished by the application of setting signals to lines 738, 740 and 742, which signals activate the corresponding control inhibitors of these cells. The horizontal spare set line 738 originates at flip-flop 519 which is controlled by function lines 674 and 675. These function lines are illustrated in FIGS. 60, 61 and 62. To obtain an output on line 738 so as to bypass the main inhibitor of cell 141, the control computer 270 provides output signals on the set spare code lines in accordance with the function set up in function line 675. These signals allow the current to pass from supply line 377 through function line 675 to an inhibitor in spare set line 739 activating the inhibitor and blocking current flow through 739. This forces the output current of flip-flop 519 to flow through line 738, as is desired.

In a similar manner, the control computer 270 provides coded output signals in accordance with the function set up in function line 677, allowing current to flow from supply line 379 through function line 677 (shown in FIGS. 63, 64 and 65) and blocking current flow in set line 741. This causes the output of flip-flop 520 to appear on line 740, causing the main inhibitor of cell 142 to be bypassed. Set line 742, which originates at the flip-flop 521 (FIG. 65) is provided with a setting signal from its associated flip-flop in the same manner. Thus, the function line 679 is made conductive by means of coded signals from the control computer 270, allowing current to flow from supply line 381. This current activates the inhibitor in flip-flop 521 and blocks current flow in line 743. Thus the output of flip-flop 521 is diverted to line 742 and the main inhibitor of cell 143 is bypassed. The spare 104 is now ready to be substituted for the original conductor 63.

Figure 21:
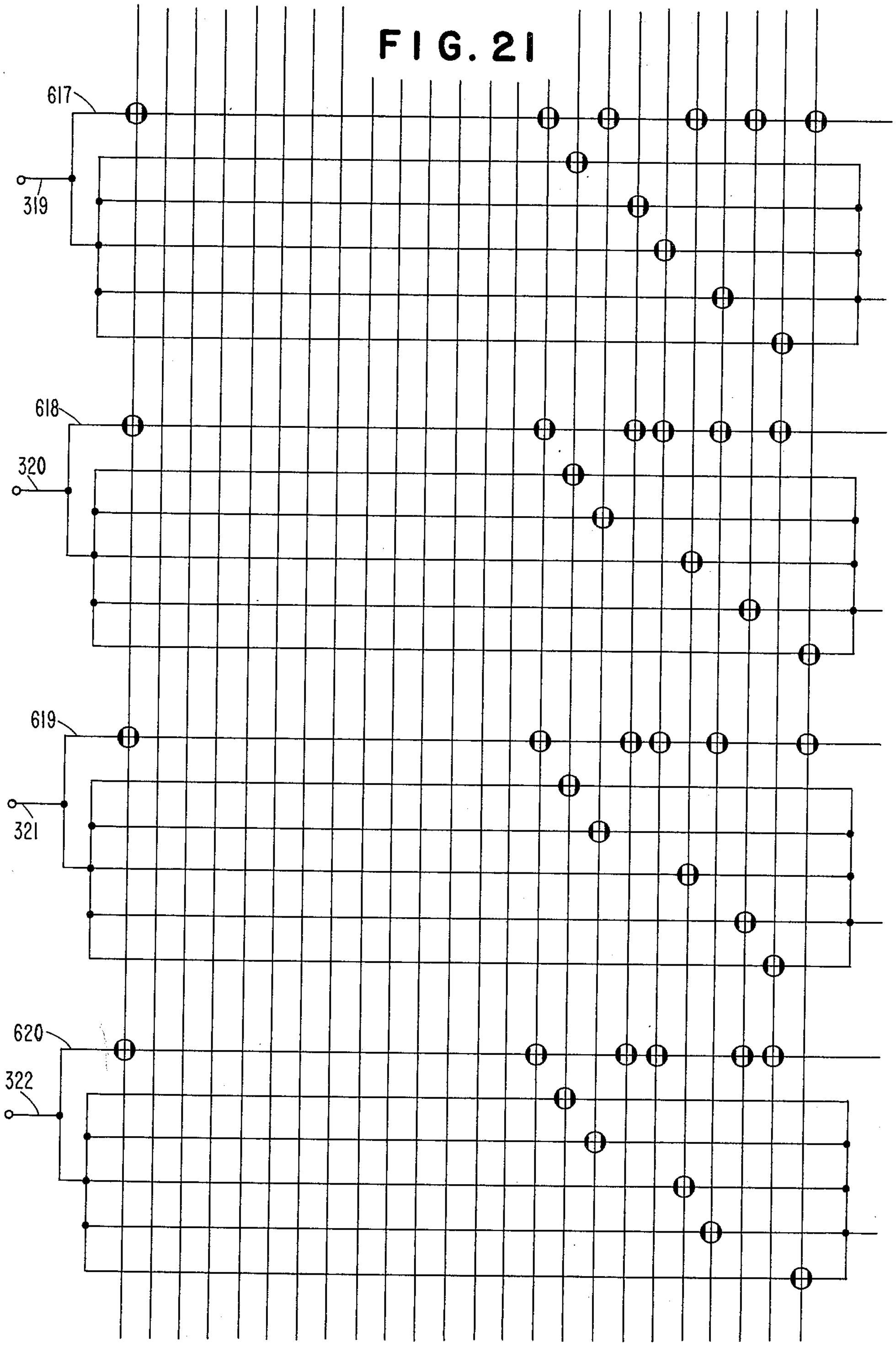
Figure 22:
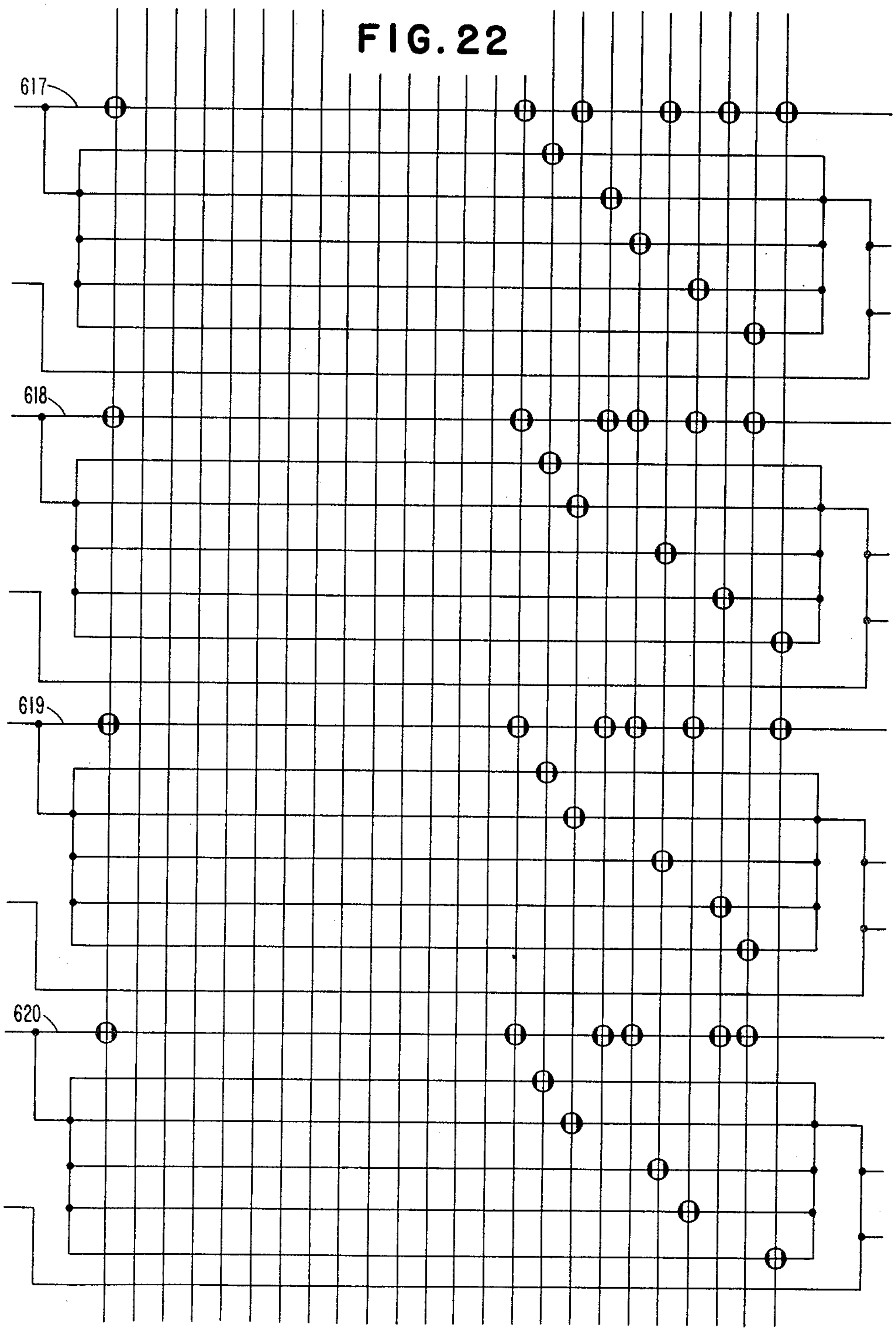
Figure 23:
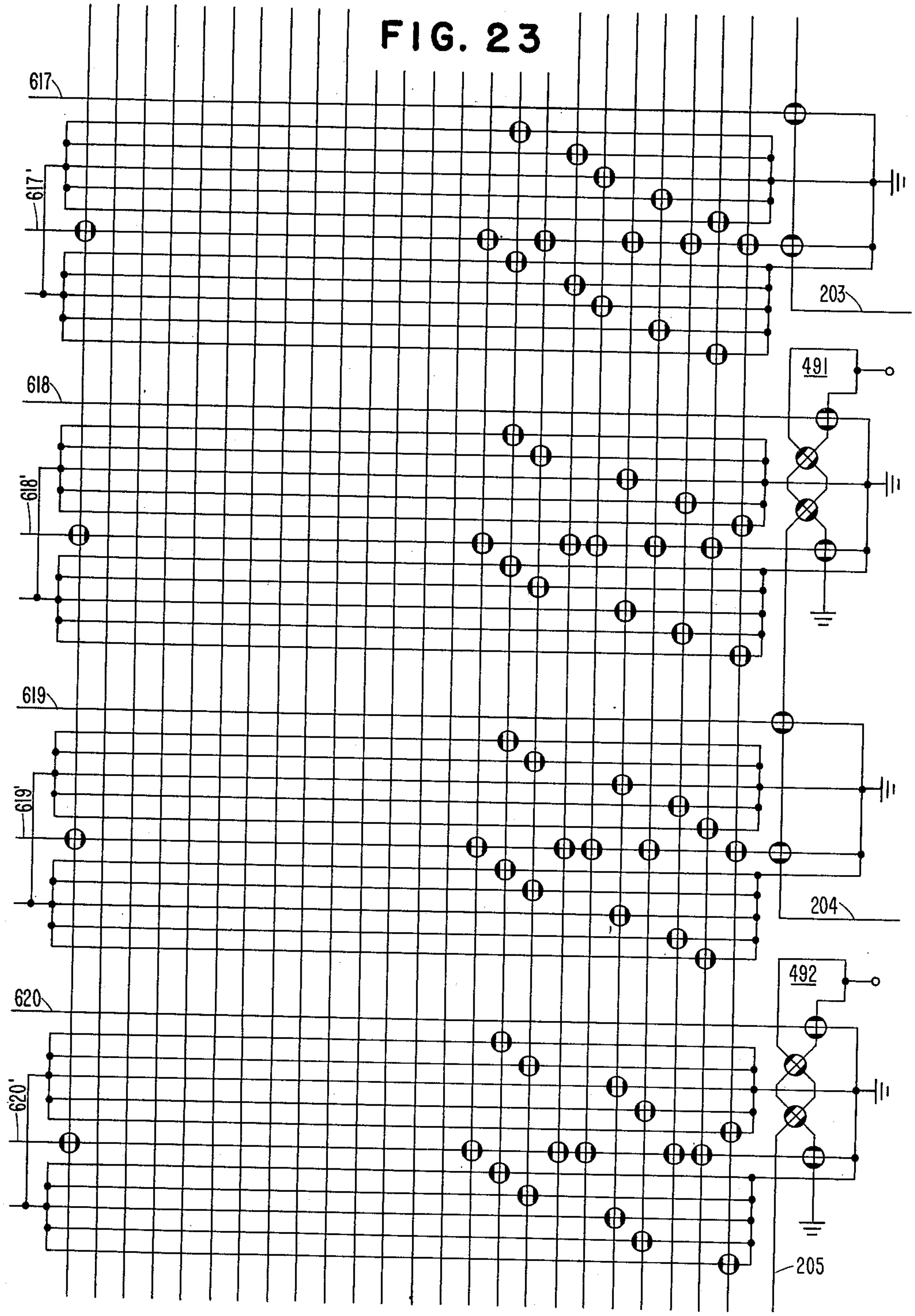

The defective line 63 is removed from the circuit by applying a bias-off signal to line 205, which signal will activate inhibitors 217 and 227 to block current flow through line 63. The bias line 205 originates at flip-flop 492 (FIGS. 23 and 26) which is controlled by function lines 620 and 621. Function line 620 is shown in FIGS. 21, 22 and 23, while function line 621 is shown in FIGS. 24, 25 and 26. To obtain a biasing signal on line 205, the control computer 270 provides coded output signals on the bias-off code lines, which signals correspond to the function set up in function line 620. This allows current to flow from supply line 322 through function line 620 to an inhibitor in the grounded branch of flip-flop 492. This activates the inhibitor and forces the current output of flip-flop 492 to flow through bias line 405, as desired.

Before the spare substitution is made an adjustment must be made in the vertical spare 114. As will be recalled, when spare 114 was inserted in the active circuit in place of line 55, the cell 166 was left to conduct through its left-hand or its right-hand branch at random. This was because the horizontal spare 104 was not part of the active circuit and therefore cell 166 had no effect on the active circuit. Since spare 104 is now to be inserted in the active circuit the cell 166 must be properly set up. The intersection of spares 104 and 114 at cell 166 represents the intersection of original lines 55 and 63 so, as may be seen from array 50, the main inhibitor of cell 166 must be bypassed. This is accomplished by applying a set signal to the set line 714 to activate the control inhibitor in the right-hand branch of cell 166. Set line 714 originates at flip-flop 504 shown in FIG. 38. Flip-flop 504 is controlled by function lines 644 (shown in FIGS. 36, 37 and 38) and 645 (shown in FIGS. 39, 40 and 41). By unblocking function line 645 by means of coded signals from control computer 270, current may flow from supply line 347 to activate an inhibitor in line 715. This will block current flow in line 715 and cause the output of flip-flop 504 to appear at line 714. This output will cause the main inhibitor of cell 166 to be bypassed.

The bias-off signals applied to inhibitors 176 and 176' of the horizontal spare 104 by way of bias-off line 386 may now be removed to place the horizontal spare in the active circuit as a substitute for line 63. To remove this bias signal, which originates in flip-flop 852 of FIG. 83, the function line 775 is unblocked by means of signals applied to the bias-off code lines of computer 270. These signals correspond to the function set up in line 775 and allow current to flow from supply line 825 through function line 775 to an inhibitor in line 386. This current activates the inhibitor in line 386, blocking further current flow therein and causing the output current of flip-flop 852 to be diverted to ground. The flip-flop will continue to conduct to ground and the line 386 will remain blocked off, thus placing the horizontal spare 104 in the active circuit. Current from the $f_2$ driver will now flow through connector line 109, through inhibitor 176, through the upper branch of cell 140 (when no signal appears on vertical line 52), through the lower branches of cells 141, 142 and 143 and through connector line 132 and inhibitor 176' to the output line 72.

Considering finally the case where a defect is discovered in a second vertical conductor such as, for example, the vertical conductor 52, the manner in which the second vertical spare 116 is substituted for the defective conductor will now be set forth. The various cells of the vertical spare 116 are set up so that the current path through spare 116 will correspond to the original current path of conductor 52.

Cell 258 is located at the intersection of spare 116 with the horizontal line 58. Since horizontal line 58 is no longer in the active circuit, it is immaterial how the cell 258 is set up.

Figure 42:
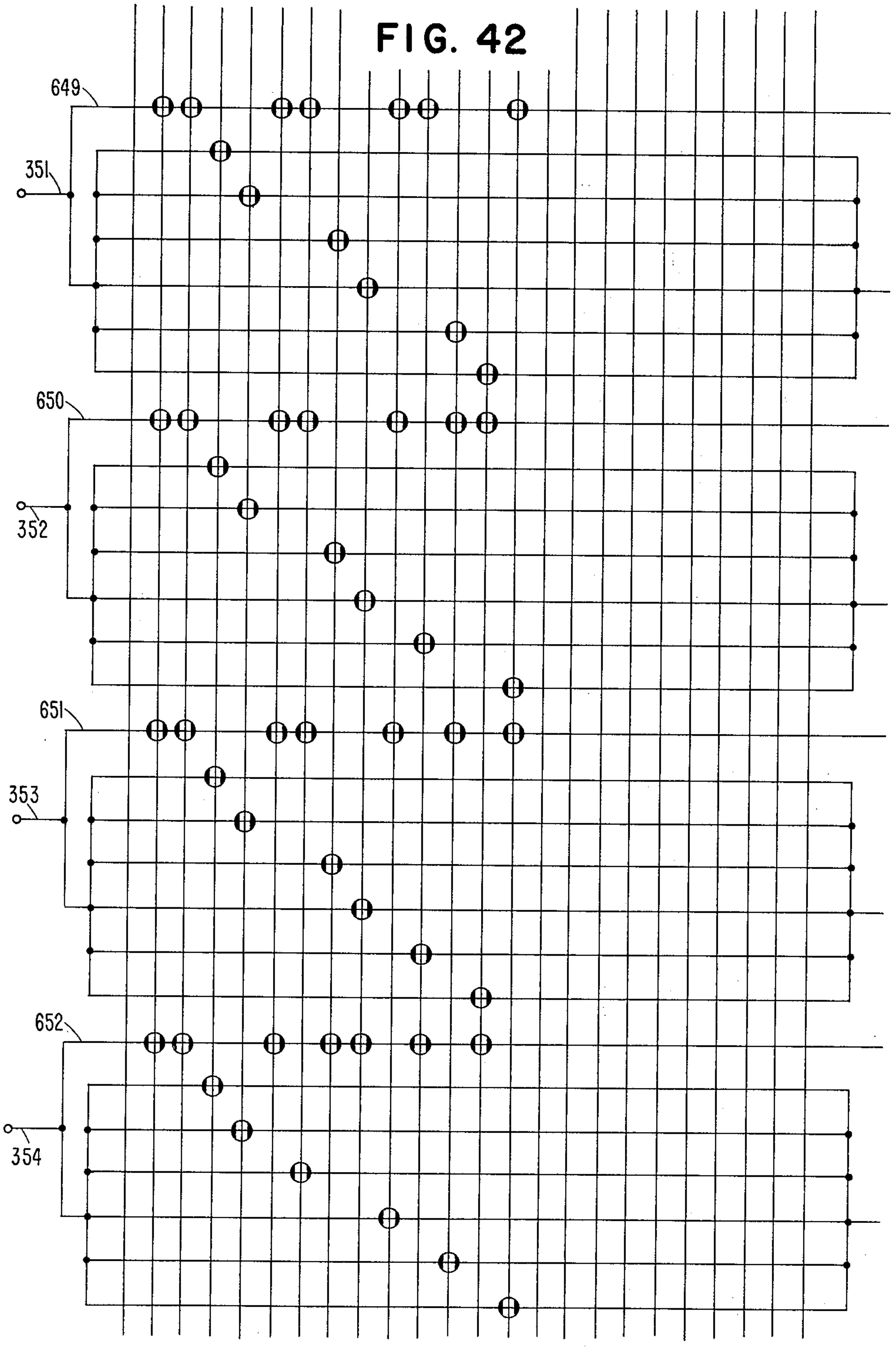
Figure 43:
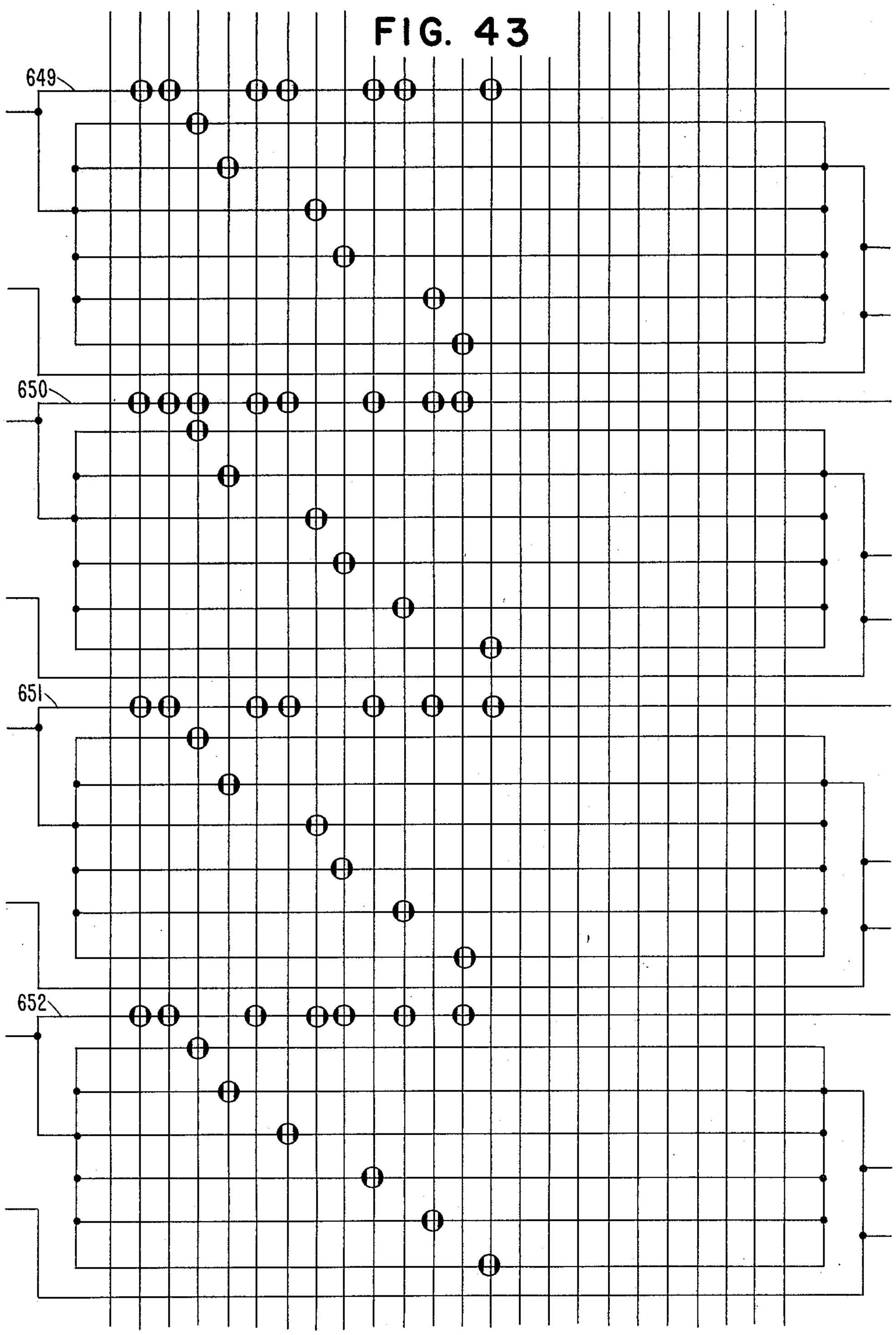
Figure 44:
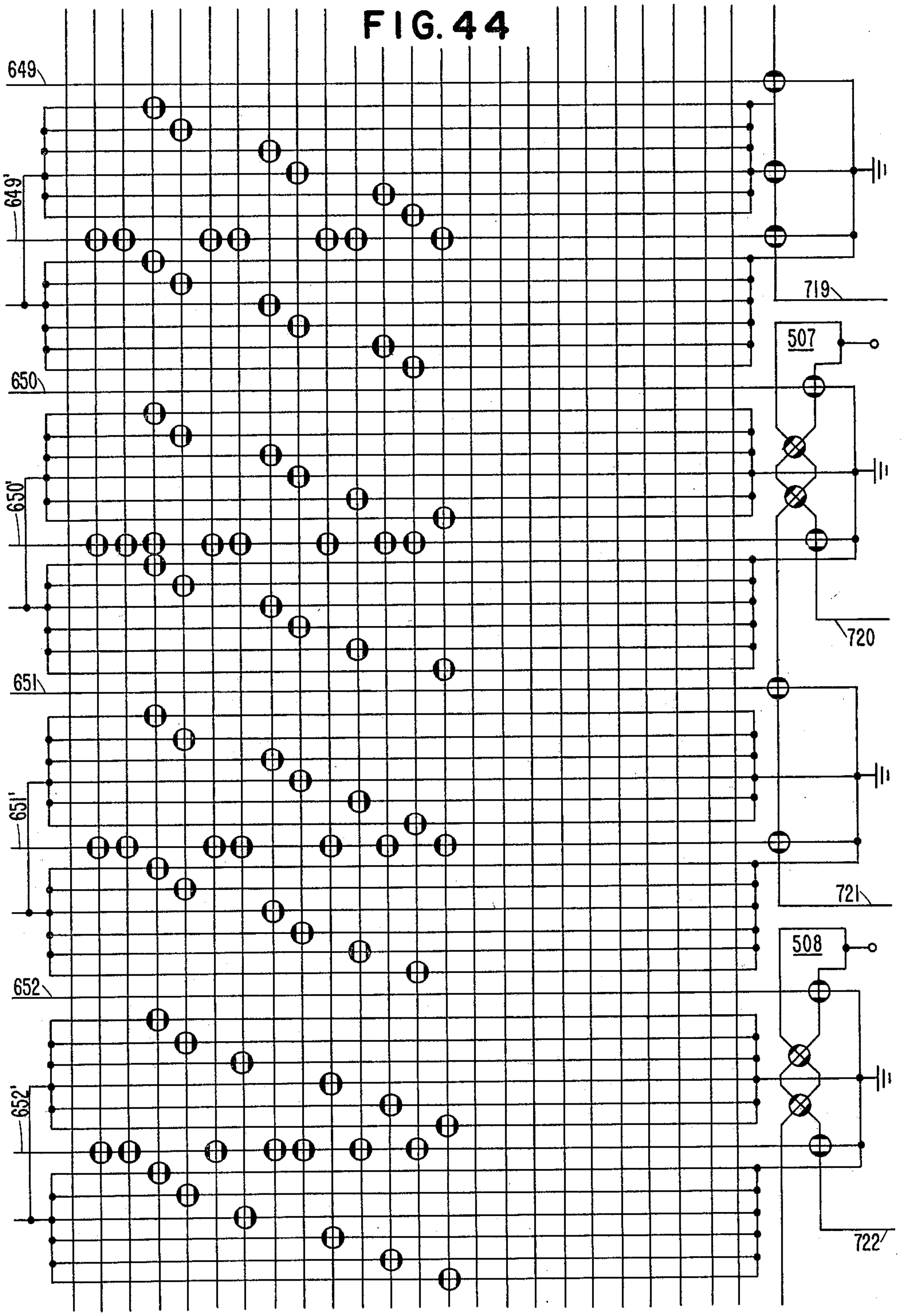
Figure 45:
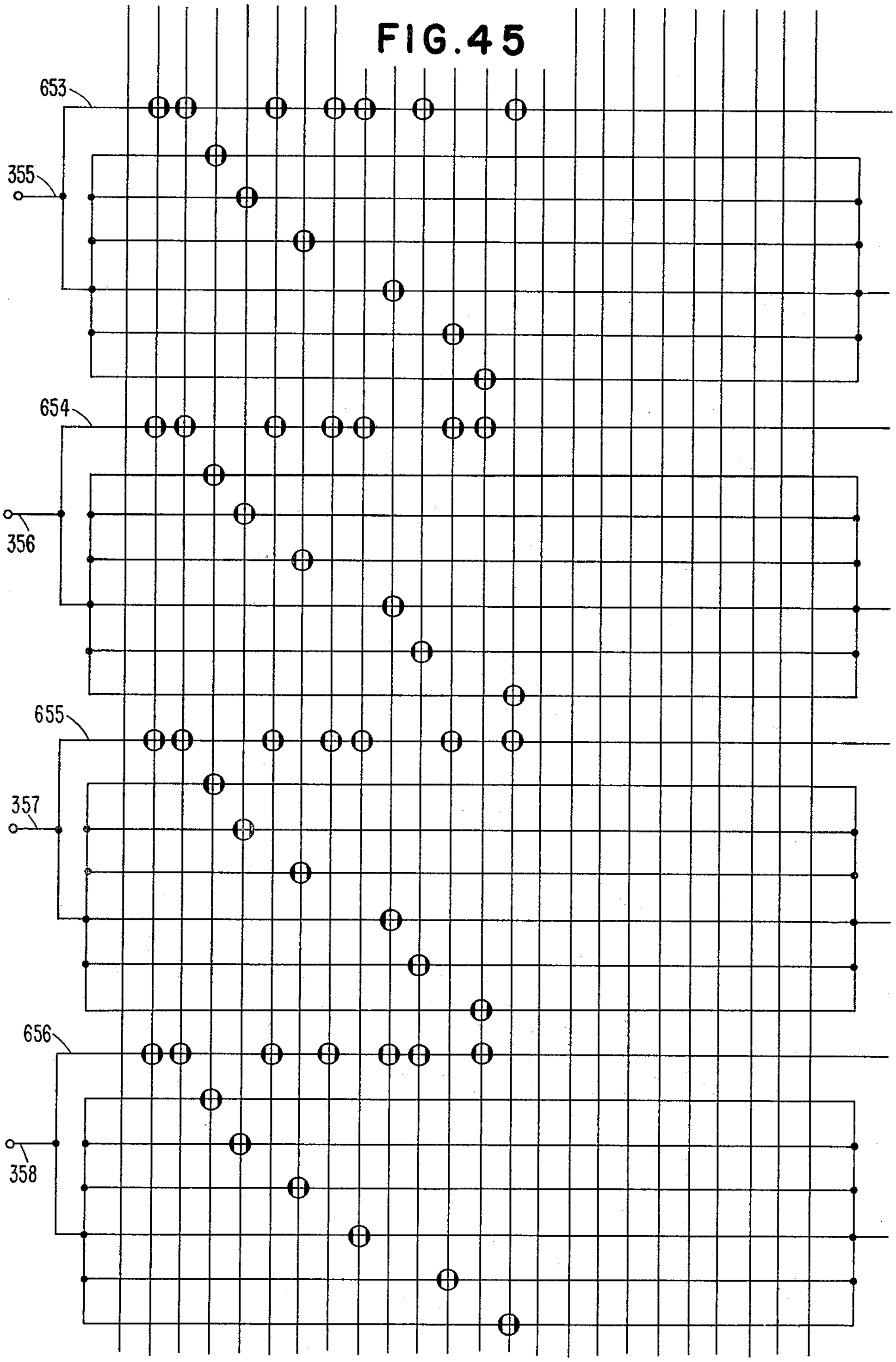
Figure 46:
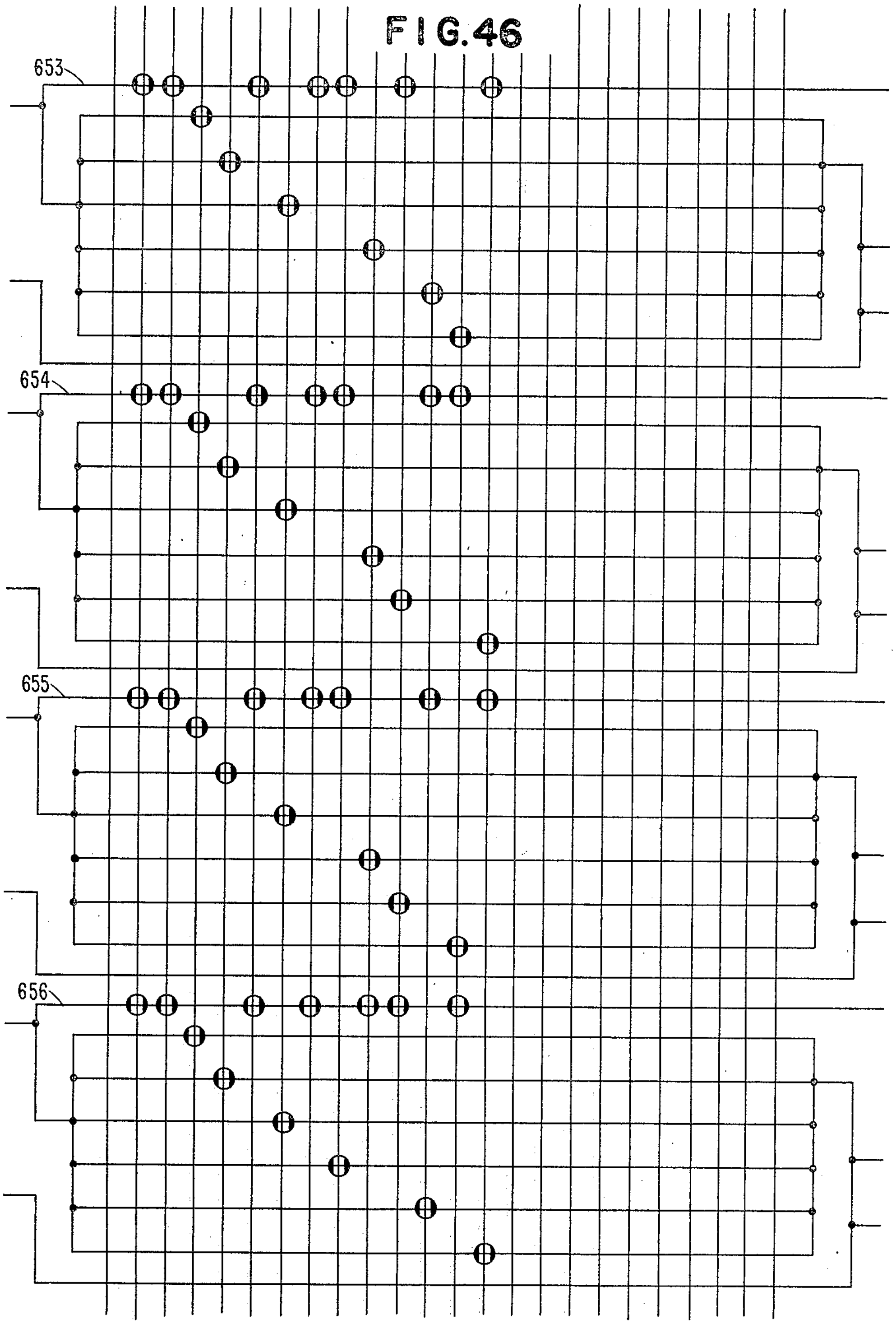
Figure 47:
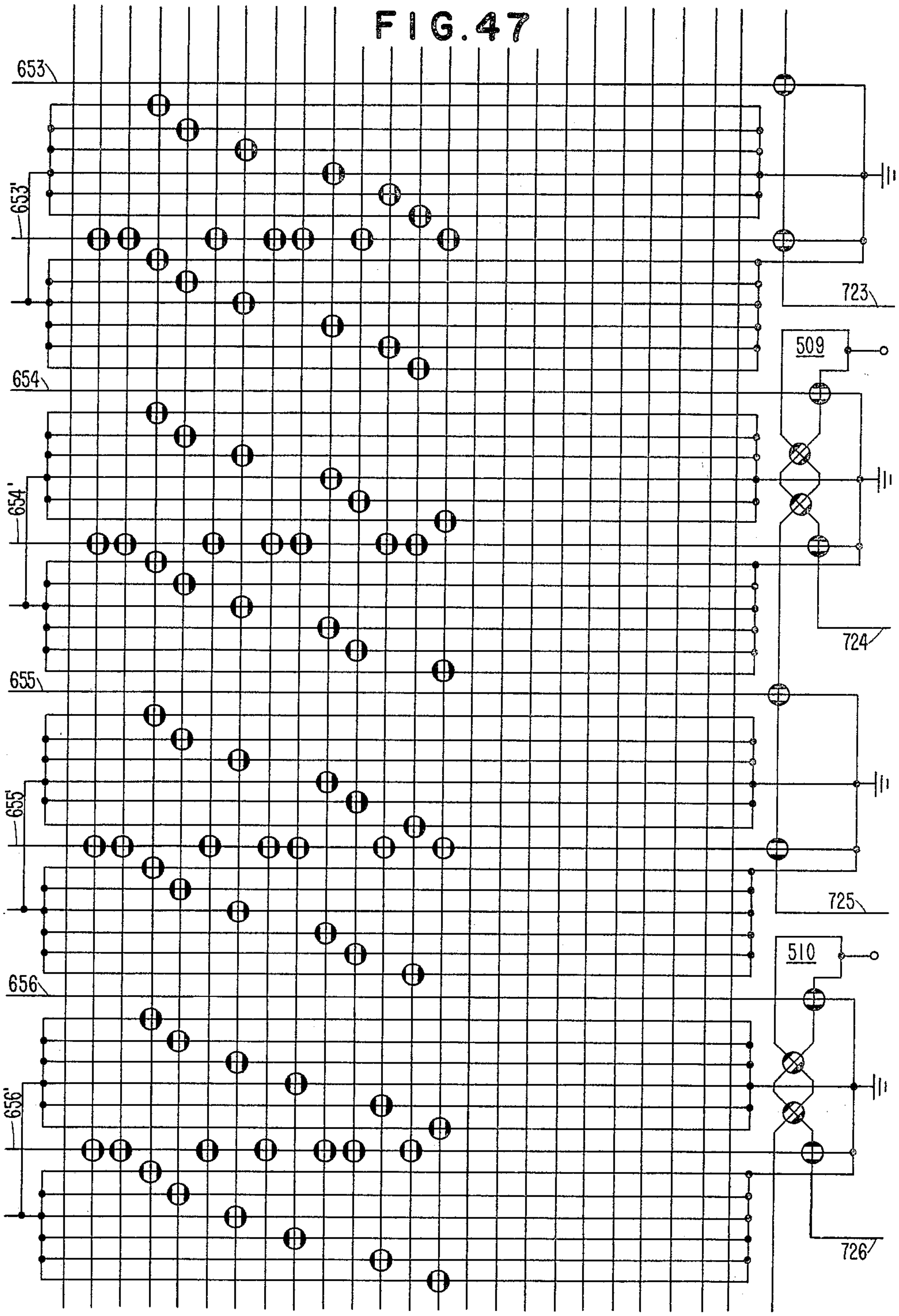
Figure 48:
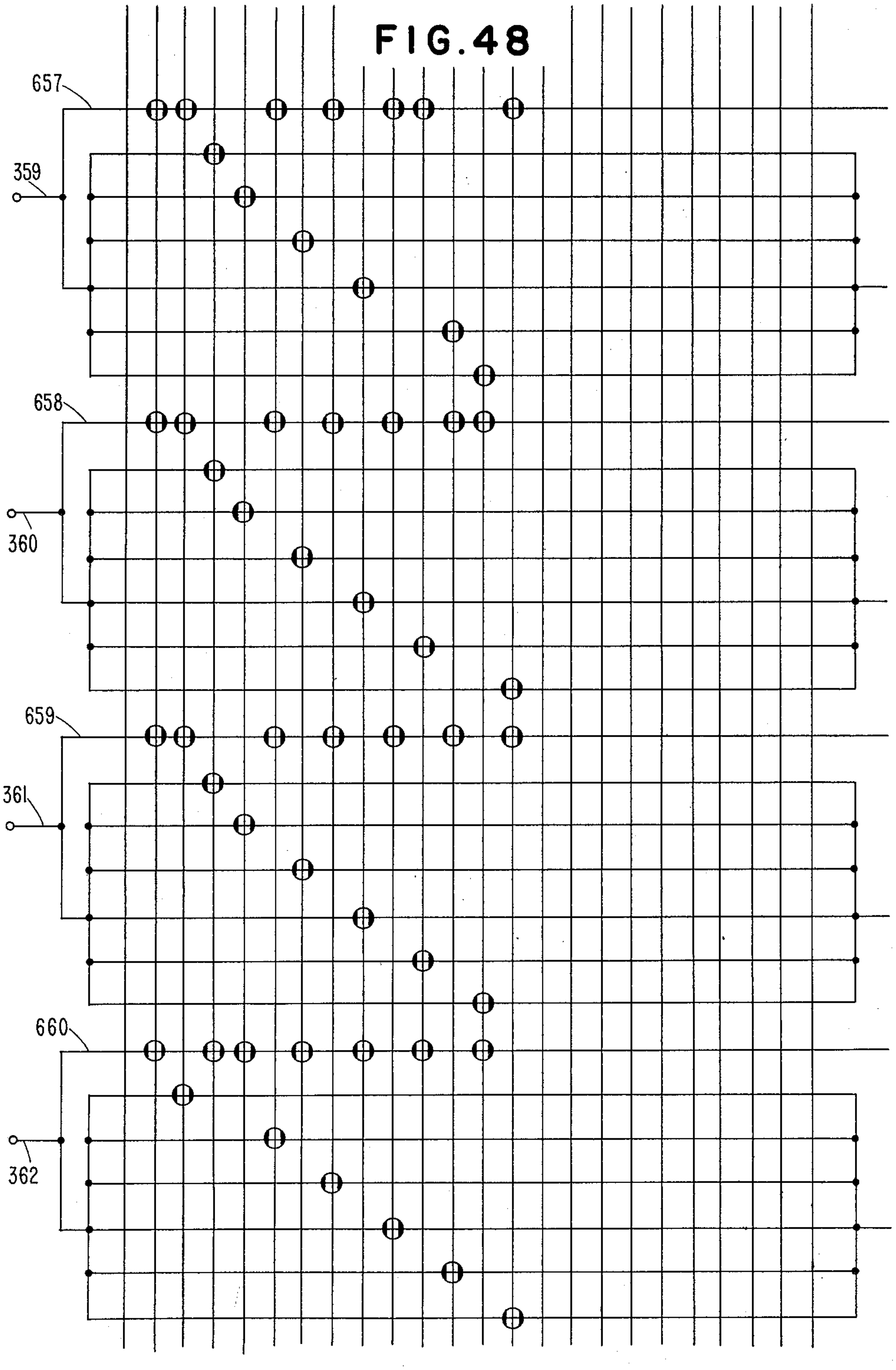
Figure 49:
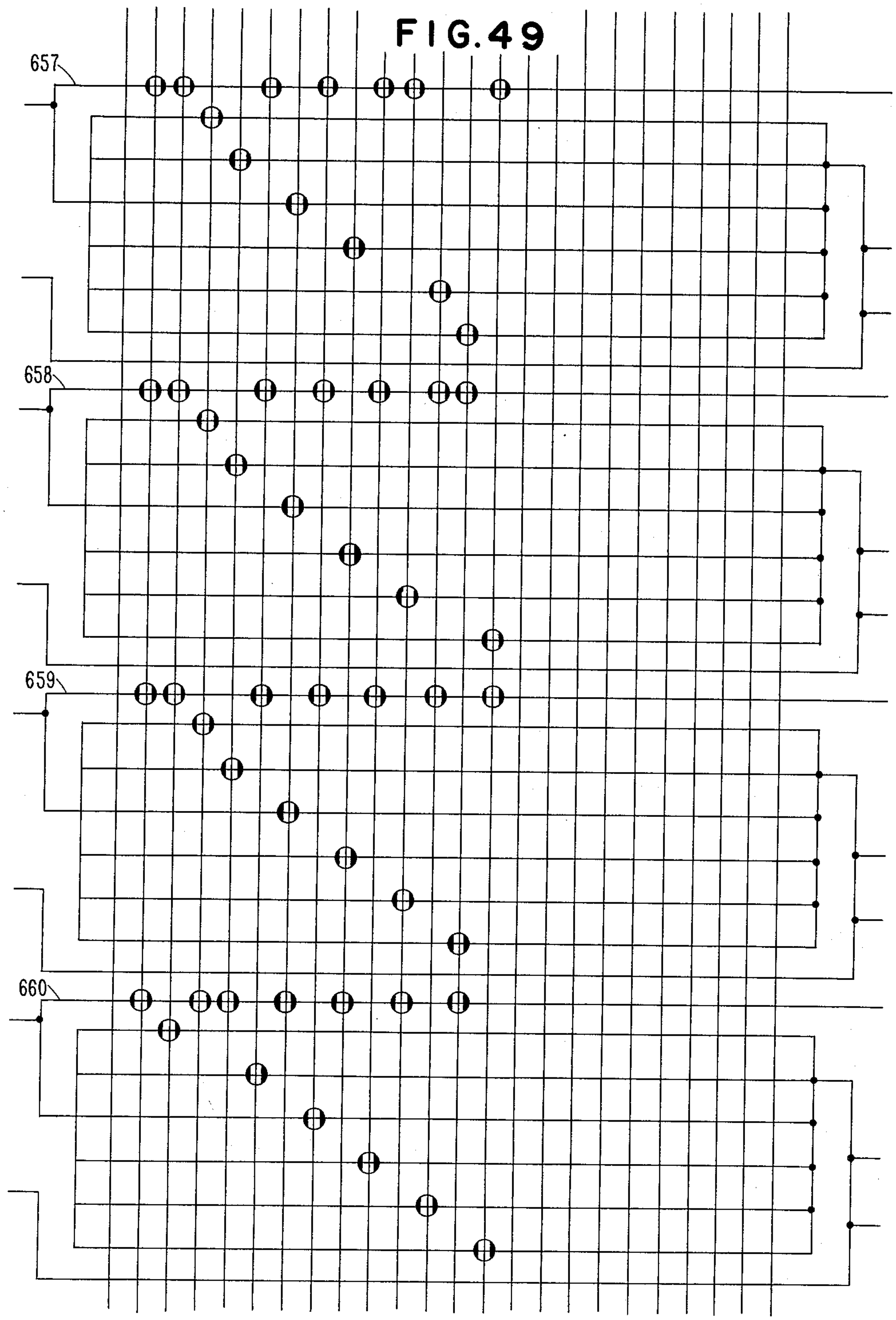
Figure 50:
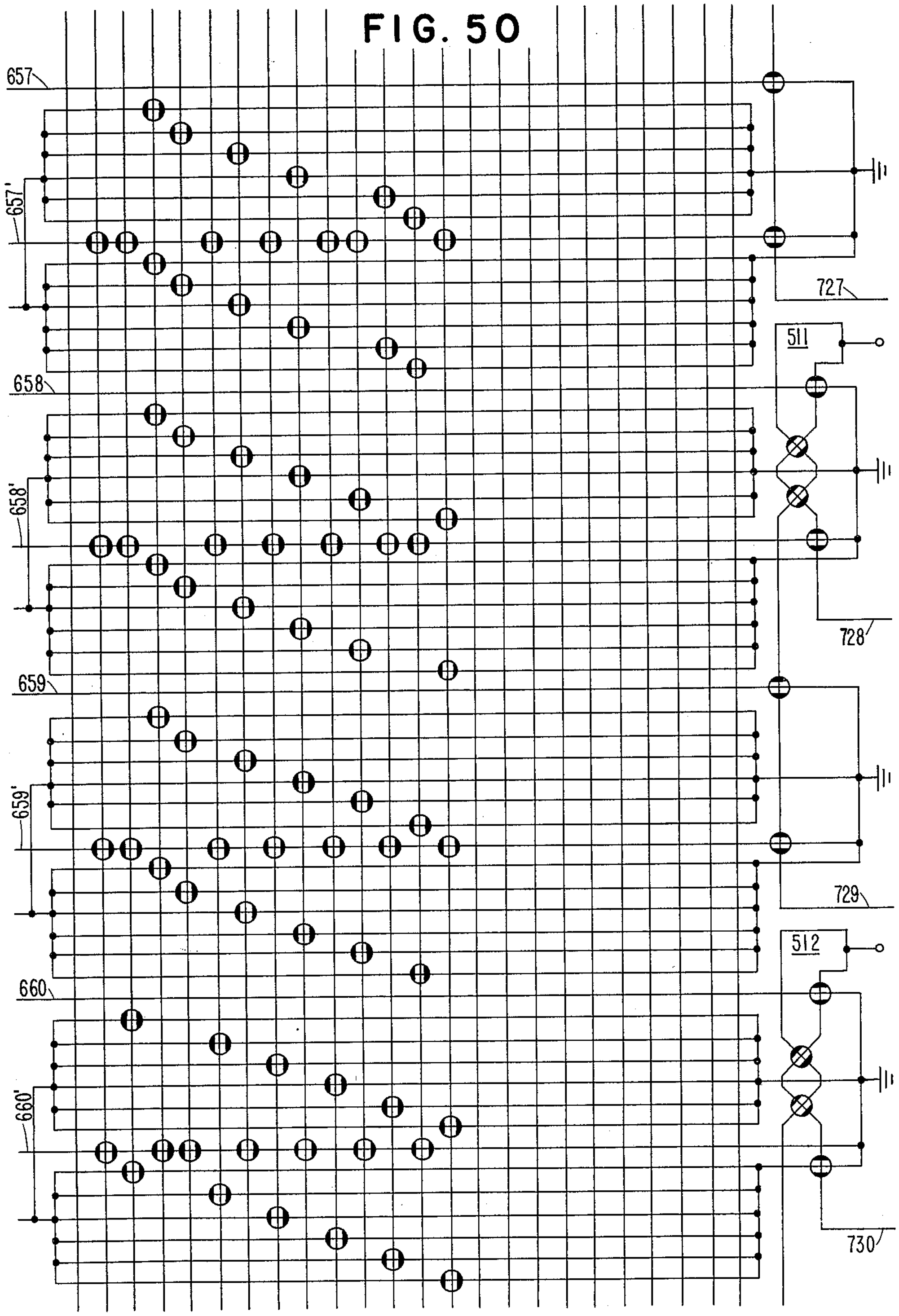

Cell 259 appears at the junction of vertical spare 116 with horizontal conductor 59. By referring to the array 50 it may be seen that the main inhibitor of this cell is to be bypassed. This is accomplished by the application of a set signal to line 718. This line originates at flip-flop 506 and is made conductive by the application to the code lines of computer 270 of signals corresponding to the function set up in function line 649 (FIGS. 42, 43 and 44). These signals will unblock function line 649, allowing current to flow from supply line 351 through the function line 649 to an inhibitor located in set line 719. This current will block current flow through line 719 and force the output of flip-flop 506 to appear on line 718, as desired.

Referring to the array 50 it may be seen that the junction of line 60 with the spare being substituted for conductor 52 must contain an inhibitor; thus the main inhibitor of the cell 260 must be included in the current path of spare 116. A signal applied to line 721 will accomplish this. Line 721 originates in flip-flop 507, shown in FIG. 44. To obtain the desired output the function line 650 (FIGS. 42, 43 and 44) is unblocked by means of coded signals applied to the code lines by control computer 270. The unblocking of function line 650 allows current to flow from supply line 352 to an inhibitor in line 720. The activation of this inhibitor by the current flowing in function line 650 causes the output of flip-flop 507 to appear on line 721. The signal on line 721 activates the control inhibitor in the left-hand branch of cell 260 blocking current flow through this branch and inserting the main inhibitor of that cell into the current path of spare 116.

The main inhibitors of cells 261 and 262 are to be bypassed as may be seen from the array 50. This bypassing is accomplished by the application of set signals to the control inhibitors in the right-hand branches of cells 261 and 262. These signals are supplied by way of set lines 722 and 724, respectively, from the flip-flops 508 and 509, respectively. The current from flip-flop 508 is diverted from line 722 by applying signals to the code lines of the control computer which will unblock the function line 653, allowing current to pass from supply line 355 to an inhibitor in line 723. This current activates the inhibitor and blocks off line 723. Similarly, the output of flip-flop 509 is diverted to line 724 by the application of signals to the code lines of the control computer 270 which unblocks the function line 655. This allows current to flow from supply line 357 to activate an inhibitor and block current flow in line 725.

The cell 263 appears at the intersection of vertical spare 116 with line 63, which is defective. Therefore, the state of cell 263 is immaterial so long as one branch or the other is conductive. Set lines 726 and 727 supply current to the control inhibitors of this cell. These set lines originate at flip-flop 510 shown in FIGS. 47 and 50. This flip-flop is controlled by function line 656 (shown in FIGS. 45, 46 and 47) and by function line 657 (shown in FIGS. 48, 49 and 50). As has been mentioned before, due to the nature of the flip-flops only one of the set lines 726 and 727 will carry the output current from flip-flop 510. Therefore, only one branch of cell 263 will be inhibited and one branch will be able to conduct current.

Set lines 728 and 729 supply signals to the control inhibitors of cell 264 which, as may be seen from array 50, is to have its main inhibitor by-passed. This is accomplished by means of a set signal appearing on line 728, which line originates in flip-flop 511 of FIG. 50. To obtain an output current on line 728, signals corresponding to the function set up in the function line 659 are supplied by the control computer 270. This enables current to pass from supply line 361 to an inhibitor in line 729 to activate that inhibitor. The activation of this inhibitor blocks current flow in line 729 and forces the output of flip-flop 511 to appear at line 728.

Cell 265 is located at the intersection of vertical spare 116 with horizontal spare 102. Since horizontal spare 102 is taking the place of original conductor 58, and since vertical space 116 is taking the place of original line 52, cell 265 must be set to correspond to the intersection of conductors 52 and 58. Thus, the main inhibitor of cell 265 must be included in the current path of the vertical spare 116. This is accomplished by the application of a set signal to the line 731, which line originates in flip-flop 512, shown in FIGS. 50 and 53. This flip-flop is controlled by function lines 660 (FIGS. 48, 49 and 50) and 661 (FIGS. 51, 52 and 53). The output of flip-flop 512 is directed to set line 731 by a current from supply line 362 through function line 660. This may be accomplished when computer 270 supplies output signals corresponding to the function set up in function line 660. The current in line 660 activates an inhibitor in line 730 of the flip-flop thus diverting the output current of flip-flop 512 to line 731. This current in line 731 activates the control inhibitor in the left-hand branch of cell 265, thus inserting the main inhibitor of that cell into the main current path.

Cell 266 represents the intersection between original conductors 52 and 63 and as such must include the main inhibitor in the current path. A set current is supplied to line 733 to accomplish this. Line 733 originates at flip-flop 513 which flip-flop is shown in FIG. 53. Coded signals corresponding to the function set up in line 662 when supplied by the computer 270 will unblock the function line 662 and will allow the current to pass therethrough from supply line 364 to an inhibitor in line 732. This current will activate the inhibitor and prevent current from flowing in line 732, thus forcing the output current of flip-flop 513 to appear on line 733. This current will block off the left-hand branch of cell 266, inserting the main inhibitor in the current path of vertical spare 116.

As before, the third step is to bias-off the defective conductor. In this case this is accomplished by the application of a biasing signal to the line 196, which signal activates inhibitors 180 and 188 to block off current flow through conductor 52. Conductor 196 originates at flip-flop 476, shown in FIG. 11. To obtain an output signal on line 196, bias-off signals corresponding to the function set up in function line 400 are applied to the conduction line of the control computer 270. This allows current to flow from supply line 300 through function line 400 to the inhibitor 424 of branch 478 of the flip-flop 476. Inhibitor 424 is activated by this signal and blocks any further curent flow in line 478, forcing the output of flip-flop 476 to appear on line 196. This signal on line 196 removes conductor 52 from the active circuit.

Having set all the cells of vertical spare 116 so that the spare corresponds to the original conductor being replaced, the spare is now ready for insertion in the active circuit. This is accomplished by removing the bias-off signal from line 207, deactivating the inhibitor 154. Line 207 originates at flip-flop 844, shown in FIGS. 71 and 74. This flip-flop is controlled by function lines 758 and 759 which are shown in FIGS. 69 through 74. To remove the biasing output from line 207, the computer 270 must supply output signals on its coded lines corresponding to the function set up in the function line 759. Such signals allow current to flow from supply line 809 through function line 759 to an inhibitor in line 207, blocking current flow from line 207 and diverting the output of flip-flop 844 to ground. This will remove the biasing-off signal from line 207 and will place the vertical spare 116 in the active circuit. The current path for signals applied to line 52 will now be through connector line 168, inhibitor 154, either branch of cell 258, the left-hand branch of cell 259, the right-hand branch of cell 260, the left-hand branches of cells 261 and 262, either branch of cell 263, the left-hand branch of cell 264, the right-hand branches of cells 265 and 266, and then to ground.

The vertical bias-off lines 197 and 198, the horizontal bias-off lines 201 through 204 and 206, the vertical spare bias-off lines 192 through 194 and 208 through 210 and the horizontal spare bias-off lines 382 through 384 and 387 through 389 were not mentioned in the above discussion since no need was found for these particular lines in the examples chosen for illustration. However, had different vertical or horizontal conductors been selected as defective to illustrate the operations of the system, these lines might have been used. The vertical bias-off lines 197 and 198 are controlled by flip-flops 479 and 483, respectively, which are shown with their accompanying control circuitry in FIGS. 9 through 14. Similarly, the flip-flops 488, 489, 490, 491 and 493 control the signals applied to bias-off lines 201, 202, 203, 204 and 206, respectively. These flip-flops are shown with their accompanying control circuits in FIGS. 15 through 26. The flip-flops 840 through 842 and 845 through 847 control the signals applied to the vertical spare bias-off lines 192 through 194 and 208 through 210, respectively, which flip-flops are shown with their accompanying control circuits in FIGS. 63 through 77. Finally, the control signals applied to the horizontal spare bias-off lines 382 through 384 and 387 through 389 are provided by the flip-flops 848 to 850 and 853 to 855, respectively. These flip-flops are shown with their accompanying control circuits in FIGS. 75 through 89.

With respect to the array 50, it is apparent that defective conductors may be replaced only as long as their are spare lines available. Once a spare line is substituted for an original conductor it is not available for replacement of any conductor in the same array. Thus, in the exemplary array 50 only two horizontal and two vertical conductors may be replaced. If a defect appears in another conductor, the only recourse is to replace the array 50 with the new array, reset the bias lines to their original conditions and begin the operation over again.

What is claimed is:

1. In a data handling system employing coordinate sets of conductors in inhibitor logic array circuitry, error correction means for one of said sets of conductors comprising a spare conductor having a plurality of serially-connected loops, each of said loops providing alternate paths for a current in said spare conductor, inhibitor means disposed in one of said alternate paths in each of said loops, means to direct the current in said spare conductor through desired alternate paths in said loops, and means for substituting said spare conductor for any of the conductors in said one set of conductors.

2. The combination according to claim 1 wherein the circuitry comprises cryogenic elements.

3. The combination according to claim 2 wherein the inhibitor means are cryotrons.

4. In a data handling system employing coordinate sets of conductors in inhibitor logic array circuitry, error correction means for said sets of conductors comprising spare conductors having a plurality of serially-connected loops, each of said loops providing alternate paths for currents in said spare conductors, inhibitor means disposed in one of said alternate paths in each of said loops, control means to direct the currents in said spare conductors through desired alternate paths in said loops, means for substituting spare conductors for defective conductors in said coordinate sets of conductors, and inhibitor means for electrically disconnecting from the array the defective conductors replaced by the spares.

5. The combination according to claim 4 wherein the circuitry comprises cryogenic elements.

6. The combination according to claim 5 wherein the inhibitor means are cryotrons.

7. In a data handling system employing coordinate sets of conductors in inhibitor logic array circuitry, error correction means comprising a spare conductor having a plurality of serially connected loops, each of said loops providing two paths for current in said conductor, a plurality of cryotron devices having gate lines and associated control lines, a single gate line disposed in each of said two paths of said plurality of loops to enable selective determination of the current path in each loop, and a control line disposed in one of said two paths for activating an associated gate line in a conductor other than said spare conductor.

8. In a data handling system employing coordinate sets of conductors in rectangular inhibitor logic circuitry, error correction means for one of said sets of conductors comprising a spare conductor having a plurality of serially-connected cells, each of said cells providing two paths for current in said spare conductor, a plurality of cryotron devices having gate lines and associated control lines, a single gate line disposed in each of said two paths, means for energizing selectively the control line associated with each of said single gate lines to direct the current in said spare conductor through the desired path, and a control line disposed in one of said paths, whereby current through said one path will activate a gate line associated with said control line located in a conductor other than said spare conductor.

9. In a data handling system a circuit for performing logical operations definable as a Boolean function comprising two sets of conductors disposed in crossover relationship to form non-conductive intersections, inhibitor means selectively disposed at the intersections in accordance with the function being realized, error correction means for one of said sets of conductors comprising a spare conductor having a plurality of serially connected loops disposed in crossover relationship with the other of said sets of conductors, each of said loops providing alternate paths for current in said spare conductor, inhibitor means disposed in one of said alternate paths in each of said loops, and means to direct the current in said conductor through desired alternate paths in said loops.

10. In a data handling system a circuit for performing logical operations definable as a Boolean function comprising two sets of conductors disposed in crossover relationship to form non-conductive intersections, inhibitor means selectively disposed at the intersections in accordance with the function being realized, error correction means for one of said sets of conductors comprising a spare conductor having a plurality of serially connected loops disposed in crossover relationship with the other of said sets of conductors, each of said loops providing alternate paths for current in said spare conductor, inhibitor means disposed in one of said alternate paths in each of said loops, means to direct the current in said spare conductor through desired alternate paths in said loops, and means for substituting said spare conductor for any of the conductors in said one set of conductors.

11. In a data handling system a circuit for performing logical operations definable as a Boolean function comprising two sets of conductors disposed in crossover relationship to form non-conductive intersections, inhibitor means selectively disposed at the intersections in accordance with the function being realized, error correction means for said sets of conductors comprising spare conductors having a plurality of serially-connected loops, each of said loops providing alternate paths for currents in said spare conductors, inhibitor means disposed in one of said alternate paths in each of said loops, control means to direct the currents in said spare conductors through desired alternate paths in said loops, means for substituting spare conductors for defective conductors in said sets of conductors, and means for biasing off the defective conductors replaced by the spares.

References Cited in the file of this patent

UNITED STATES PATENTS

| | | |
|---|---|---|
| 2,229,108 | Maggio et al. | Jan. 21, 1941 |
| 2,832,897 | Buck | Apr. 29, 1958 |
| 2,877,448 | Nyberg | Mar. 10, 1959 |
| 2,977,575 | Hagelbarger | Mar. 28, 1961 |

OTHER REFERENCES

"Cryotron Catalog Memory" by Slade et al., Proc. of Eastern Joint Computer Conf., Dec. 10–12, 1956, pp. 115–120.